US012047127B2

(12) United States Patent
Abdelmonem et al.

(10) Patent No.: US 12,047,127 B2
(45) Date of Patent: Jul. 23, 2024

(54) METHOD AND SYSTEM FOR MITIGATING INTERFERENCE IN THE NEAR FIELD

(71) Applicant: ISCO International, LLC, Schaumburg, IL (US)

(72) Inventors: Amr Abdelmonem, Northbrook, IL (US); Igor Goodman, Buffalo Grove, IL (US); Pablo Tacconi, Arlington, TX (US)

(73) Assignee: ISCO International, LLC, Schaumburg, IL (US)

( * ) Notice: Subject to any disclaimer, the term of this patent is extended or adjusted under 35 U.S.C. 154(b) by 414 days.

(21) Appl. No.: 17/407,258

(22) Filed: Aug. 20, 2021

(65) Prior Publication Data

US 2022/0069865 A1    Mar. 3, 2022

Related U.S. Application Data

(60) Provisional application No. 63/231,037, filed on Aug. 9, 2021, provisional application No. 63/071,896, filed on Aug. 28, 2020.

(51) Int. Cl.
   *H04B 1/10*    (2006.01)
   *H01Q 1/52*    (2006.01)
   (Continued)

(52) U.S. Cl.
   CPC .............. *H04B 5/72* (2024.01); *H01Q 1/523* (2013.01); *H01Q 3/36* (2013.01); *H01Q 21/245* (2013.01);
   (Continued)

(58) Field of Classification Search
   None
   See application file for complete search history.

(56) References Cited

U.S. PATENT DOCUMENTS

2,605,413 A    7/1952    Alvarez
2,978,702 A    4/1961    Pakan
(Continued)

FOREIGN PATENT DOCUMENTS

CN    1864302 A    11/2006
CN    202523820 U    11/2012
(Continued)

OTHER PUBLICATIONS

"International Preliminary Report on Patentability", for Application No. PCT/US2021/46881, Feb. 17, 2023, 25 Pages.
(Continued)

*Primary Examiner* — Tuan A Tran
(74) *Attorney, Agent, or Firm* — Guntin & Gust, PLC; Kenneth S. Kwan

(57) ABSTRACT

Aspects of the subject disclosure may include, for example, receiving, via an antenna, a communication signal generated by a communication device, and detecting interference in the communication signal, wherein the interference is generated by one or more interference sources, wherein the interference is detected by monitoring a near field region of the antenna, an intermediate field region of the antenna, a far field region of the antenna, or any combinations thereof, wherein the monitoring excludes monitoring only the far field region of the antenna. Other embodiments are disclosed.

20 Claims, 31 Drawing Sheets

(51) Int. Cl.

| | | |
|---|---|---|
| *H01Q 3/04* | (2006.01) | |
| *H01Q 3/36* | (2006.01) | |
| *H01Q 21/24* | (2006.01) | |
| *H04B 1/04* | (2006.01) | |
| *H04B 1/12* | (2006.01) | |
| *H04B 5/00* | (2024.01) | |
| *H04B 5/72* | (2024.01) | |
| *H04B 7/00* | (2006.01) | |
| *H04B 7/0413* | (2017.01) | |
| *H04B 7/08* | (2006.01) | |
| *H04B 7/10* | (2017.01) | |
| *H04B 7/155* | (2006.01) | |
| *H04B 17/18* | (2015.01) | |
| *H04B 17/336* | (2015.01) | |
| *H04B 17/345* | (2015.01) | |
| *H04B 17/382* | (2015.01) | |
| *H04J 11/00* | (2006.01) | |
| *H04L 5/14* | (2006.01) | |
| *H04L 25/03* | (2006.01) | |
| *H04W 24/08* | (2009.01) | |
| *H04W 72/541* | (2023.01) | |
| *H04B 17/10* | (2015.01) | |

(52) U.S. Cl.
CPC ............. *H04B 1/0475* (2013.01); *H04B 1/10* (2013.01); *H04B 1/12* (2013.01); *H04B 7/002* (2013.01); *H04B 7/0413* (2013.01); *H04B 7/084* (2013.01); *H04B 7/10* (2013.01); *H04B 7/15557* (2013.01); *H04B 7/15571* (2013.01); *H04B 17/18* (2015.01); *H04B 17/336* (2015.01); *H04B 17/345* (2015.01); *H04B 17/382* (2015.01); *H04J 11/0023* (2013.01); *H04L 5/14* (2013.01); *H04L 25/03821* (2013.01); *H04W 24/08* (2013.01); *H04W 72/541* (2023.01); *H04B 17/102* (2015.01)

(56) References Cited

U.S. PATENT DOCUMENTS

| | | |
|---|---|---|
| 3,093,824 A | 6/1963 | Ammerman |
| 3,656,166 A | 4/1972 | Klopach et al. |
| 3,718,935 A | 2/1973 | Ranghelli et al. |
| 3,827,051 A | 7/1974 | Foldes |
| 4,222,017 A | 9/1980 | Foldes |
| 4,434,426 A | 2/1984 | Gaglione et al. |
| 4,723,321 A | 2/1988 | Saleh |
| 5,015,053 A | 5/1991 | Johnson |
| 5,068,667 A | 11/1991 | Mizoguchi |
| 5,929,820 A | 7/1999 | Caulfield et al. |
| 5,940,044 A | 8/1999 | Smith |
| 6,072,439 A | 6/2000 | Ippolito et al. |
| 6,111,542 A | 8/2000 | Day et al. |
| 6,201,801 B1 | 3/2001 | Dent |
| 6,310,585 B1 | 10/2001 | Marino |
| 6,380,903 B1 | 4/2002 | Hayes et al. |
| 6,621,465 B2 | 9/2003 | Teillet et al. |
| 6,631,277 B2 | 10/2003 | Berg et al. |
| 6,703,974 B2 | 3/2004 | White et al. |
| 6,704,557 B1 | 3/2004 | Krishnamurthy et al. |
| 6,717,555 B2 | 4/2004 | Teillet et al. |
| 6,801,160 B2 | 10/2004 | Henderson et al. |
| 6,801,790 B2 | 10/2004 | Rudrapatna |
| 6,960,650 B2 | 11/2005 | Pulst et al. |
| 6,998,908 B1 | 2/2006 | Sternowski |
| 7,023,398 B2 | 4/2006 | Gottl et al. |
| 7,123,194 B2 | 10/2006 | Park et al. |
| 7,196,674 B2 | 3/2007 | Timofeev et al. |
| 7,346,134 B2 | 3/2008 | Smith |
| 7,365,695 B2 | 4/2008 | Thomas et al. |
| 7,729,431 B2* | 6/2010 | Gebara .................. H04B 1/126 |
| | | 375/259 |
| 8,023,984 B2 | 9/2011 | Jin et al. |
| 8,072,384 B2 | 12/2011 | Morrow |
| 8,134,511 B2 | 3/2012 | Koh et al. |
| 8,238,318 B1 | 8/2012 | Negus |
| 8,289,218 B2 | 10/2012 | Payne |
| 8,923,381 B2* | 12/2014 | Rilling ................... H04L 27/38 |
| | | 375/147 |
| 8,934,457 B2* | 1/2015 | Kapoor .................. H04B 7/086 |
| | | 370/465 |
| 8,954,023 B2 | 2/2015 | Hillstrom et al. |
| 8,976,072 B2 | 3/2015 | Lenormand et al. |
| 9,219,508 B1 | 12/2015 | Veysoglu et al. |
| 9,252,865 B2* | 2/2016 | Rilling ................. H04B 1/1081 |
| 9,271,185 B2* | 2/2016 | Abdelmonem ....... H04W 64/00 |
| 9,313,680 B2 | 4/2016 | Galeev et al. |
| 9,461,681 B1* | 10/2016 | Kato ........................ H04B 7/08 |
| 9,472,852 B2 | 10/2016 | Oshea et al. |
| 9,531,482 B2 | 12/2016 | Sobczak et al. |
| 9,548,775 B2 | 1/2017 | Smith |
| 9,571,176 B2 | 2/2017 | Desclos et al. |
| 9,590,313 B2 | 3/2017 | Jan et al. |
| 9,654,158 B2* | 5/2017 | Dafesh ................. H04B 1/7107 |
| 9,712,259 B2 | 7/2017 | Sobczak et al. |
| 9,762,297 B2 | 9/2017 | Lee et al. |
| 9,800,355 B1 | 10/2017 | Lee et al. |
| 9,806,413 B1 | 10/2017 | Chukka et al. |
| 9,847,571 B2 | 12/2017 | Bit-babik et al. |
| 9,887,467 B2 | 2/2018 | Aryanfar |
| 9,887,716 B2* | 2/2018 | Alavi ..................... H04B 1/123 |
| 9,887,717 B2* | 2/2018 | Cyzs ................. H04W 72/0453 |
| 9,923,598 B2* | 3/2018 | Dafesh ................. H04B 1/1027 |
| 9,929,886 B2 | 3/2018 | Amadjikpe et al. |
| 9,960,500 B2 | 5/2018 | Song et al. |
| 9,972,918 B2 | 5/2018 | Lin et al. |
| 9,986,512 B2* | 5/2018 | Abdelmonem ....... H04L 5/0073 |
| 10,027,036 B2 | 7/2018 | Schmidt et al. |
| 10,056,675 B1 | 8/2018 | Dybdal |
| 10,116,048 B2 | 10/2018 | Mielke et al. |
| 10,234,514 B2* | 3/2019 | Leese de Escobar ....................... |
| | | G01R 33/0354 |
| 10,454,185 B1 | 10/2019 | Moran et al. |
| 10,468,781 B1 | 11/2019 | Paulsen et al. |
| 10,530,033 B2 | 1/2020 | Moriguchi |
| 10,581,163 B2 | 3/2020 | Schmutzler et al. |
| 10,608,859 B2 | 3/2020 | Matitsine et al. |
| 10,652,835 B2 | 5/2020 | Tacconi et al. |
| 10,777,894 B2 | 9/2020 | Mcmichael |
| 10,862,518 B2 | 12/2020 | Labadie et al. |
| 10,868,350 B2 | 12/2020 | Oppenlaender et al. |
| 10,868,609 B1 | 12/2020 | Kossin et al. |
| 10,958,312 B2 | 3/2021 | Pollman et al. |
| 10,971,815 B1 | 4/2021 | West et al. |
| 11,025,472 B2 | 6/2021 | Matitsine et al. |
| 11,038,549 B1 | 6/2021 | Harley et al. |
| 11,158,956 B2 | 10/2021 | Le |
| 11,177,582 B2 | 11/2021 | Seo |
| 11,239,886 B2 | 2/2022 | Pollman et al. |
| 11,289,799 B2 | 3/2022 | Everest et al. |
| 11,296,429 B2 | 4/2022 | Biancotto et al. |
| 11,316,258 B2 | 4/2022 | Junttila |
| 11,329,387 B2 | 5/2022 | Da Silveira et al. |
| 11,336,028 B2 | 5/2022 | Shen et al. |
| 11,342,668 B2 | 5/2022 | Chen et al. |
| 11,349,530 B2 | 5/2022 | Frenger et al. |
| 11,349,581 B1 | 5/2022 | Dybdal et al. |
| 11,360,396 B2 | 6/2022 | Bauerschmidt et al. |
| 11,363,678 B2 | 6/2022 | Rosenschild et al. |
| 11,411,323 B2 | 8/2022 | Wu et al. |
| 11,437,701 B2 | 9/2022 | Rai et al. |
| 11,451,274 B2 | 9/2022 | El-keyi et al. |
| 11,509,071 B1 | 11/2022 | Abdelmonem et al. |
| 11,509,072 B1 | 11/2022 | Abdelmonem et al. |
| 11,515,652 B1 | 11/2022 | Abdelmonem et al. |
| 11,594,821 B1 | 2/2023 | Abdelmonem et al. |
| 11,600,920 B2 | 3/2023 | Udagave |
| 11,626,667 B1 | 4/2023 | Abdelmonem et al. |
| 11,670,847 B1 | 6/2023 | Abdelmonem et al. |

(56) References Cited

U.S. PATENT DOCUMENTS

| | | |
|---|---|---|
| 11,705,940 B2 | 7/2023 | Abdelmonem et al. |
| 11,811,127 B2 * | 11/2023 | Lysejko .................. H01Q 3/10 |
| 2002/0193071 A1 | 12/2002 | Waltho |
| 2003/0162566 A1 | 8/2003 | Shapira et al. |
| 2004/0082335 A1 | 4/2004 | Hirayama et al. |
| 2004/0106436 A1 | 6/2004 | Ochi et al. |
| 2005/0226353 A1 | 10/2005 | Gebara et al. |
| 2005/0239403 A1 | 10/2005 | Karabinis |
| 2006/0014491 A1 | 1/2006 | Cleveland et al. |
| 2006/0202906 A1 | 9/2006 | Okubo et al. |
| 2007/0020224 A1 | 1/2007 | Vetter et al. |
| 2007/0060059 A1 | 3/2007 | Kim et al. |
| 2007/0080868 A1 | 4/2007 | Hwang et al. |
| 2007/0205955 A1 | 9/2007 | Korisch et al. |
| 2008/0062062 A1 | 3/2008 | Borau et al. |
| 2008/0150799 A1 | 6/2008 | Hemmi et al. |
| 2008/0253308 A1 | 10/2008 | Ward et al. |
| 2008/0280571 A1 | 11/2008 | Rofougaran et al. |
| 2009/0040127 A1 | 2/2009 | Williams |
| 2009/0189820 A1 | 7/2009 | Saito et al. |
| 2009/0224995 A1 | 9/2009 | Puente et al. |
| 2010/0304680 A1 | 12/2010 | Kuffner et al. |
| 2010/0311353 A1 | 12/2010 | Rabinovich et al. |
| 2011/0057849 A1 | 3/2011 | Naym et al. |
| 2011/0059694 A1 | 3/2011 | Audic |
| 2011/0069633 A1 | 3/2011 | Schmidt et al. |
| 2011/0096812 A1 * | 4/2011 | Hahm .................. H04B 1/7107 375/E1.032 |
| 2011/0116569 A1 | 5/2011 | Vaughan et al. |
| 2011/0134001 A1 | 6/2011 | Sakata et al. |
| 2011/0150118 A1 | 6/2011 | Asplund et al. |
| 2011/0158081 A1 * | 6/2011 | Wang ..................... H03F 1/304 370/201 |
| 2011/0171922 A1 | 7/2011 | Kim et al. |
| 2012/0063529 A1 | 3/2012 | Choi et al. |
| 2012/0108178 A1 | 5/2012 | Lee et al. |
| 2012/0188137 A1 | 7/2012 | Lalezari |
| 2012/0229232 A1 | 9/2012 | Mahon et al. |
| 2013/0157601 A1 | 6/2013 | O'Keeffee et al. |
| 2014/0022125 A1 | 1/2014 | Zhu et al. |
| 2014/0035698 A1 | 2/2014 | Schadler et al. |
| 2014/0035792 A1 | 2/2014 | Schadler et al. |
| 2014/0097987 A1 | 4/2014 | Worl et al. |
| 2014/0191924 A1 | 7/2014 | Payne et al. |
| 2014/0236546 A1 | 8/2014 | Payne |
| 2014/0274094 A1 | 9/2014 | Abdelmonem et al. |
| 2015/0015372 A1 | 1/2015 | Hara et al. |
| 2015/0092621 A1 | 4/2015 | Jalloul et al. |
| 2015/0108210 A1 | 4/2015 | Zhou |
| 2015/0156642 A1 | 6/2015 | Sobczak et al. |
| 2015/0195001 A1 | 7/2015 | Barker et al. |
| 2015/0200709 A1 | 7/2015 | Negus et al. |
| 2015/0340875 A1 | 11/2015 | Prasad |
| 2015/0351103 A1 | 12/2015 | Kim et al. |
| 2016/0036505 A1 | 2/2016 | George et al. |
| 2016/0087348 A1 | 3/2016 | Ko et al. |
| 2016/0088572 A1 | 3/2016 | Bi et al. |
| 2016/0112111 A1 | 4/2016 | Bull |
| 2016/0126633 A1 | 5/2016 | Keller et al. |
| 2016/0142229 A1 | 5/2016 | Bevan et al. |
| 2016/0254595 A1 | 9/2016 | Sobczak et al. |
| 2016/0380690 A1 | 12/2016 | Jidhage |
| 2017/0063410 A1 * | 3/2017 | Cyzs .................. H04W 72/0453 |
| 2017/0077612 A1 | 3/2017 | Aryanfar |
| 2017/0077616 A1 | 3/2017 | Corum et al. |
| 2017/0085398 A1 | 3/2017 | Liu |
| 2017/0093048 A1 | 3/2017 | Chen et al. |
| 2017/0156119 A1 | 6/2017 | Neves et al. |
| 2017/0237484 A1 | 8/2017 | Heath et al. |
| 2017/0353929 A1 | 12/2017 | Tacconi et al. |
| 2018/0034164 A1 | 2/2018 | Jang et al. |
| 2018/0083368 A1 | 3/2018 | Teillet et al. |
| 2018/0167148 A1 | 6/2018 | Vannucci et al. |
| 2018/0176802 A1 | 6/2018 | Rosenhouse et al. |
| 2018/0219636 A1 | 8/2018 | Gale et al. |
| 2019/0007078 A1 | 1/2019 | Tsui et al. |
| 2019/0052381 A1 | 2/2019 | Abdelmonem |
| 2019/0074864 A1 | 3/2019 | Henry et al. |
| 2019/0074865 A1 | 3/2019 | Henry et al. |
| 2019/0103309 A1 | 4/2019 | Lin |
| 2019/0103909 A1 | 4/2019 | Bengtsson et al. |
| 2019/0165822 A1 | 5/2019 | Chen |
| 2019/0212699 A1 | 7/2019 | Waldern et al. |
| 2019/0222329 A1 | 7/2019 | Abdelmonem |
| 2019/0252801 A1 | 8/2019 | Mahanfar et al. |
| 2019/0273315 A1 | 9/2019 | Hu et al. |
| 2019/0273326 A1 | 9/2019 | Sanford et al. |
| 2019/0334636 A1 | 10/2019 | Li et al. |
| 2019/0372237 A1 | 12/2019 | Yman et al. |
| 2019/0393598 A1 | 12/2019 | Logothetis et al. |
| 2020/0052388 A1 | 2/2020 | Jang et al. |
| 2020/0136247 A1 | 4/2020 | Ai et al. |
| 2020/0145032 A1 | 5/2020 | Ayala et al. |
| 2020/0185825 A1 | 6/2020 | Palud |
| 2020/0236630 A1 | 7/2020 | Tacconi et al. |
| 2020/0321697 A1 | 10/2020 | Zimmerman et al. |
| 2020/0373663 A1 | 11/2020 | Xu |
| 2021/0028829 A1 | 1/2021 | Rios |
| 2021/0098896 A1 | 4/2021 | Wang et al. |
| 2021/0127284 A1 | 4/2021 | Abdelmonem et al. |
| 2021/0175622 A1 | 6/2021 | Jing et al. |
| 2021/0226315 A1 | 7/2021 | Liu |
| 2021/0227400 A1 | 7/2021 | Jia |
| 2021/0320413 A1 | 10/2021 | Wu et al. |
| 2021/0344122 A1 | 11/2021 | Kaistha et al. |
| 2021/0359406 A1 | 11/2021 | Yang et al. |
| 2022/0006167 A1 | 1/2022 | P |
| 2022/0037753 A1 | 2/2022 | Tang et al. |
| 2022/0069463 A1 | 3/2022 | Abdelmonem et al. |
| 2022/0069853 A1 | 3/2022 | Abdelmonem et al. |
| 2022/0069855 A1 | 3/2022 | Abdelmonem et al. |
| 2022/0069897 A1 | 3/2022 | Abdelmonem et al. |
| 2022/0069898 A1 | 3/2022 | Abdelmonem et al. |
| 2022/0069927 A1 | 3/2022 | Abdelmonem et al. |
| 2022/0109977 A1 | 4/2022 | Zander et al. |
| 2022/0123821 A1 | 4/2022 | Sakhnini et al. |
| 2022/0131269 A1 | 4/2022 | Choi et al. |
| 2022/0200139 A1 | 6/2022 | Ryu et al. |
| 2022/0209428 A1 | 6/2022 | Raghavan et al. |
| 2022/0279520 A1 | 9/2022 | Tsui et al. |
| 2022/0311477 A1 | 9/2022 | Sun et al. |
| 2022/0320756 A1 | 10/2022 | Hassan et al. |
| 2022/0321241 A1 | 10/2022 | Bennett et al. |
| 2022/0322321 A1 | 10/2022 | Dai et al. |
| 2022/0352942 A1 | 11/2022 | Kalantari et al. |
| 2022/0365224 A1 | 11/2022 | Rose et al. |
| 2023/0318174 A1 | 10/2023 | Abdelmonem et al. |
| 2023/0318175 A1 | 10/2023 | Abdelmonem et al. |
| 2023/0318197 A1 | 10/2023 | Abdelmonem et al. |
| 2023/0318198 A1 | 10/2023 | Abdelmonem et al. |
| 2023/0327708 A1 | 10/2023 | Abdelmonem |
| 2023/0387605 A1 | 11/2023 | Abdelmonem et al. |
| 2023/0387606 A1 | 11/2023 | Abdelmonem et al. |
| 2023/0387608 A1 | 11/2023 | Abdelmonem et al. |
| 2024/0014883 A1 | 1/2024 | Schmidt et al. |
| 2024/0047891 A1 | 2/2024 | Abdelmonem et al. |
| 2024/0055777 A1 | 2/2024 | Abdelmonem et al. |

FOREIGN PATENT DOCUMENTS

| | | |
|---|---|---|
| CN | 108631055 A | 10/2018 |
| CN | 209910515 U | 1/2020 |
| CN | 209963261 U | 1/2020 |
| CN | 112103653 A | 12/2020 |
| CN | 213637748 U | 7/2021 |
| CN | 113451764 A | 9/2021 |
| CN | 113922101 A | 1/2022 |
| WO | 2009120237 A1 | 10/2009 |
| WO | 2020064914 A1 | 4/2020 |

(56) References Cited

OTHER PUBLICATIONS

"International Preliminary Report on Patentability", For Application PCT/US2021/046807, Aug. 20, 2021, 28 Pages.
"Notification of Transmittal of International Preliminary Report on PA Tentability", PCT/US2021/046875, May 2, 2022, 16 pages.
Amendment Under Article 34/Response to Written Opinion for PCT/US2021/046881 filed Jun. 16, 2022, 16 pages.
Amendment Under Article 34 / Response to Written Opinion filed for PCT/US2021/046807 on Jun. 15, 2022, 19 pages.
PCT/US2021/046804, Amendment under Article 34 and response to Written Opinion, filed May 31, 2022, 19 pages.
PCT/US2021/046804, International Preliminary Report on Patentability, mailed Sep. 13, 2022, 31 pages.
"Amendment Under Article 34 / Response to Written Opinion", for application No. PCT/US2021/046806, Feb. 8, 2022, 8 pages.
"International Preliminary Report on Patentability", PCT/US2021/046872, May 4, 2022, 12 pgs.
"International Search Report and Written Opinion", for Application No. PCT/US2021/046875, Nov. 23, 2021, 10 pages.
"International Search Report and Written Opinion", for Application No. PCT/US2021/46881, Dec. 3, 2021, 12 pages.
"International Search Report and Written Opinion", for Application No. PCT/US2021/046872, Nov. 23, 2021, 13 pages.
"International Search Report and Written Opinion", for Application No. PCT/US2021/046804, Dec. 3, 2021, 14 pages.
"International Search Report and Written Opinion", for Application No. PCT/US2021/46805, Nov. 8, 2021, 15 pages.
"International Search Report and Written Opinion", For Application No. PCT/US2021/046807, Dec. 3, 2021, 15 pages.
"International Search Report and Written Opinion", for Application No. PCT/US2021/046806, Nov. 8, 2021, 9 pages.
"Notification of Transmittal of International Preliminary Report on Patentability", PCT/US2021/046806 mailed May 4, 2022, May 4, 2022, 16 pages.
"PCT/US2021/046872—Article 34 Amendment", Feb. 10, 2022, 8 pgs.
"PCT/US2021/046875—Article 34 Amendments", Apr. 13, 2022, 8 pgs.
"International Preliminary Report", for Application PCT/US2021/046805, Mar. 9, 2023, 9 pgs.
"International Search Report and Written Opinion", PCT/US2023/015534, Apr. 19, 2023, 7 pages.
"PCT/US2023/015538", International Search Report, Mailed Apr. 17, 2023, Apr. 17, 2023, 6 pgs.
"Examination Report for India Application No. 202347019825", Sep. 12, 2023, 7 Pages.
"International Search Report and Written Opinion", Appln. No. PCT/US2023/023403, Sep. 15, 2023, 10 pages.
"International Search Report and Written Opinion for PCT/US2023/023402", Sep. 15, 2023, 11 Pages.
"International Search Report and Written Opinion for PCT/US2023/023405", Sep. 18, 2023, 10 Pages.
International Search Report & Written Opinion for PCT/US2023/015540 mailed Jun. 14, 2023, 15 pp.
International Search Report and Written Opinion for PCT/US2023/076674, mailed Nov. 17, 2023, 3 pp.
"International Search Report and Written Opinion for Application No. PCT/US2023/076650", Nov. 16, 2023, 7 pages.
Amendment Under Article 34 / Response to Written Opinion for PCT/US23/15540 filed Jan. 26, 2024., 11 pp.
"Amendment Under Article 34 / Response to Written Opinion", PCT/US2023/015534, Jan. 26, 2024, 7 pages.
Clenet, M., et al., "Laminated Waveguide as Radiating Element for Array Applications", IEEE Transactions on Antennas and Propagation, vol. 54, No. 5, pp. 1481-1487, May 2006. (Year: 2006).

* cited by examiner

216

230

388

METHOD AND SYSTEM FOR MITIGATING INTERFERENCE IN THE NEAR FIELD

CROSS-REFERENCE TO RELATED APPLICATIONS

This application claims priority to U.S. Provisional Ser. No. 63/071,896, filed Aug. 28, 2020, and to U.S. Provisional Ser. No. 63/231,037, filed Aug. 9, 2021. The contents of each of the foregoing are hereby incorporated by reference into this application as if set forth herein in full.

FIELD OF THE DISCLOSURE

The subject disclosure relates to detecting interference and/or passive intermodulation (PIM) in a communications system, and performing action(s), such as polarization adjusting and/or phase shifting/delaying, that result in mitigation/cancellation of the interference and/or PIM.

BACKGROUND

The deployment of fifth generation (5G) networks has made component requirements for cellular systems more stringent and sophisticated. In addition to capacity, throughput, latency, speed, and power consumption requirements, there is a need for multiple wireless services, bands, and networks to coexist and operate without impacting one another. Antennas are a key component in all wireless networks whether they are on the base station side or the handset side. Antenna designs have evolved over the past twenty years to meet the increasingly complex requirements of cellular standards. For example, almost all antennas now have multiple functions that create conflicting antenna design requirements. This antenna design evolution needs to continue to meet the growing demands of 5G networks as well as future demands of higher generation networks.

BRIEF DESCRIPTION OF THE DRAWINGS

Reference will now be made to the accompanying drawings, which are not necessarily drawn to scale, and wherein.

DETAILED DESCRIPTION

Figure 1A:
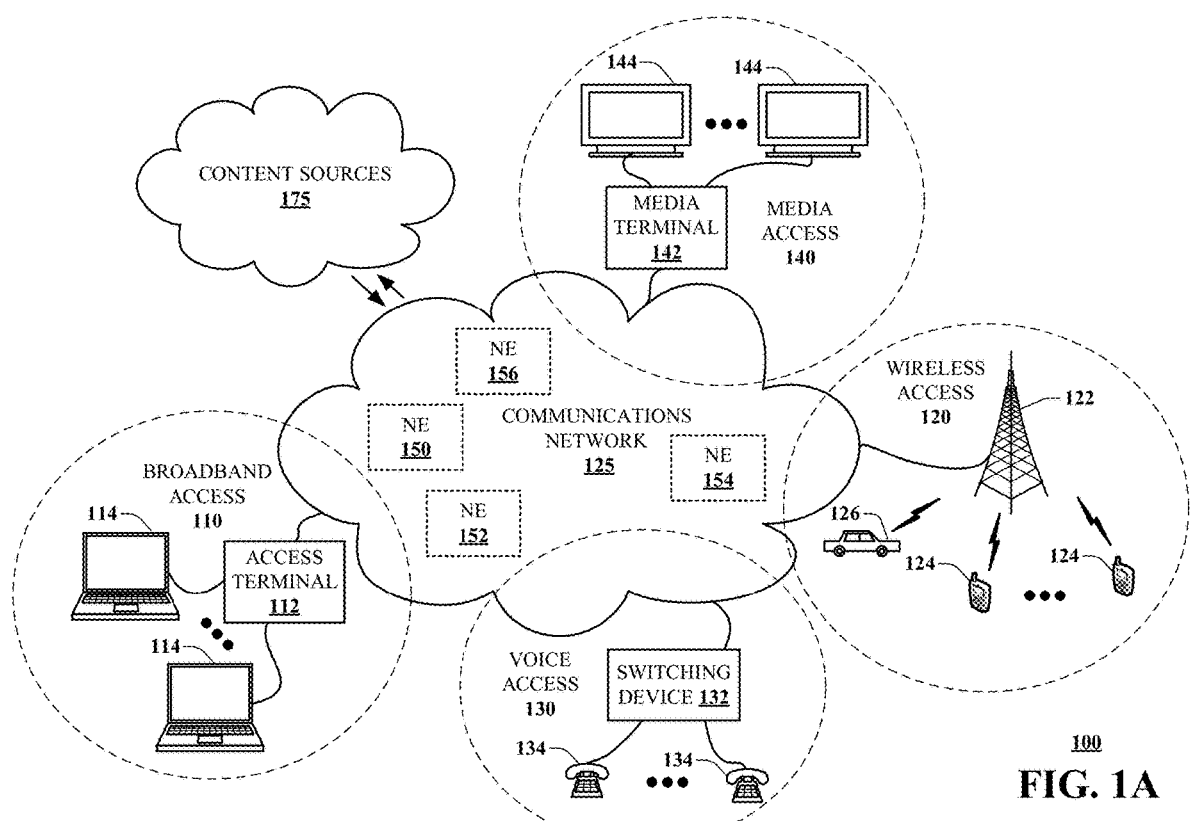
FIG. 1A is a block diagram illustrating an exemplary, non-limiting embodiment of a communications network in accordance with various aspects described herein.

Early antennas were mostly single-input, single-output (SISO), but currently, the majority are multiple-input, multiple-output (MIMO). MIMO is a key antenna technology for wireless communications in which multiple antennas are used at both the source (transmitter) and the destination (receiver), where the antennas at each end of the communication circuit are combined to enhance data speed. In MIMO, each spatial stream is transmitted from a different radio/antenna in the same frequency channel as the transmitter. The receiver receives each stream on each of its identical radios/antennas, and reconstructs the original streams.

The first MIMO specifications appeared in 3rd Generation Partnership Project (3GPP) standards at the tail end of the 3G Universal Mobile Telecommunications System (UMTS) era, but it was of limited use as it was not built into the design from the beginning. It was only with the introduction of Long-Term Evolution (LTE) in 2008 that MIMO started to be mainstream. The goal of MIMO is to increase data rates by sending multiple data streams at the same time in the same frequency, known as spatial multiplexing. In a single antenna system, one cannot send multiple streams of data, but with MIMO, the signals transmitted from each antenna take different paths to the receivers. By applying the right mix of each data stream to each transmit antenna, the signals received at each receiving antenna only "see" one of the original data streams. In effect, MIMO systems use a combination of multiple antennas and multiple signal paths to gain knowledge of the communications channel. By using the spatial dimension of a communications link, MIMO systems can achieve significantly higher data rates than traditional SISO channels.

In a communication system, a main objective for a communication channel is to increase signal to interference plus noise ratio (SINR). Let's take a 2×2 MIMO case as an example. For the same total transmitted power, the signal power has to be shared between the two transmitters, reducing SINR by 3 dB. This implies that MIMO gains over SISO is achieved when the SINR of the channel gets higher than is necessary to support the maximum SISO data rate. Such high SINR conditions occur when the user is near the cell center, or when interference from adjacent cells is low. When practical field deployments are taken into account, in a typical urban macro environment, it is estimated that 2×2 MIMO only provides approximately 20% gain over SISO. The 2×2 MIMO configuration can be increased by adding more antennas at each end of the link. In the original 3GPP Release 8 LTE standard in 2008, 2× and 4× operation was specified, and 8×8 was added later in Release 10. As the number of antennas increases, it becomes less likely that the channel will support orthogonal transmission paths. These orthogonal paths are known as Eigenmodes.

For user equipment (UEs, such as smartphones, etc.), it can be difficult to support higher order MIMO due to the space limitations for the required number of receive antennas. For example, it took eight years after Release 8 specified 4× single-user (Su)-MIMO for UEs with four receivers to start appearing on the market. And to take full advantage of that, networks would have to upgrade their base stations with 4 transmit (Tx)/receive (Rx) antennas.

There are alternative forms of MIMO, including Su-MIMO, where multiple streams of data can be transmitted to one user to increase peak data rates, and multi-user (Mu)-MIMO, where the same number of streams can be transmitted towards multiple users, each getting one or more streams. Mu-MIMO has the effect of increasing cell capacity, but not increasing peak data rates to any one user over the SISO case.

Physically, an antenna can include radiating elements (or antenna elements (AEs)) arranged in interconnected columns and sharing the same radio frequency (RF) connector. Most low frequency bands (e.g., 600 megahertz (MHz)) up to 2.5 gigahertz (GHz)) antennas in the marketplace today are multi-band (two or more bands), with each band having its own remote electronic/electrical tilt for separate optimization capability. The radiating elements can also be combined into an antenna array capable of creating multiple, steerable beams by utilizing a beamforming feed network (e.g., a butler matrix feed). Antennas for high frequency bands or millimeter (mm) waves are usually integrated with the receiver.

An antenna's radiation has a pattern (power distribution) in the horizontal direction (an azimuth direction) and a pattern in the vertical direction usually referred to as the elevation. Antennas comprise a number of radiating elements, which may each be an orthogonally-polarized element pair, such as a dipole (e.g., a crossed-dipole) with certain properties and a particular structure. Radiating elements can be arranged in columns, and antennas that have multiple columns can form arrays. While each radiation array may have its own radiation pattern, the RF effect of the entire array can depend on the spacing, phase shifts, and amplitude variations between its radiating elements. Together, these three variables can be used to describe the array factor pattern. Multiplying the array factor pattern and the element pattern can yield the overall radiation pattern of the array antenna and define the far field.

There are various types of radiating antenna elements, such as those with wire and aperture elements that include dipole and monopole elements. Aperture elements can also include slot elements. Some designs incorporate combinations of both types and can also be built over printed circuit boards (PCBs) or micro strip patches. Each antenna element has a radiation pattern, usually referred to as an element pattern, whose characteristics are determined by the overall design of the element. Some or all of the principles, embodiments, and/or aspects described herein can apply equally to the various types of antennas.

A dipole radiating element transmits electromagnetic waves that result in radiation around it. Near the dipole antenna, the radiated energy is oscillating as it is flowing outwards. At any instant of time, the magnetic field is "behind" the electric field by half of a period (or half of the wavelength). The near field is composed of two regions: the reactive near field and the radiating near field (also called the Fresnel zone or region). In the far-field region (also called the Fraunhofer zone or region), the field components are transverse to the radial direction of the antenna. The far-field E (electric) and H (magnetic) strength decrease by inverse law 1/r, where r is the distance from the antenna. Embodiments described herein define and account for a new region between/overlapping the Fresnel region and the Fraunhofer region, namely an "intermediate" (or intermediate-field) region.

The subject disclosure describes, among other things, illustrative embodiments of an interference/PIM cancellation system (or block) that is capable of detecting interference/PIM in RF networks and/or mitigating (or cancelling) the interference/PIM. As the majority of interference/PIM generally exists in an intermediate (or intermediate-field) region (described in more detail below) that overlaps the near-field and far-field regions, in exemplary embodiments, the interference/PIM cancellation system is capable of cancelling interference/PIM not based on (e.g., not based at all on or not based only on) nulling of far-field energy, but rather by effecting polarization adjusting and/or phase adjusting (e.g., via electronic or physical adjustments of signals and/or component(s) of an antenna system) based on the detected impact of the interference/PIM in the intermediate region. In exemplary embodiments, the interference/PIM cancellation system may be configured to account (e.g., detect, cancel, or otherwise compensate) for the presence of interference/PIM in some or all of the far-field region, the intermediate region, and the near-field region.

In various embodiments, polarization adjusting and/or phase adjusting (or shifting/delaying) may include performing one or more (e.g., mechanical) adjustments to one or more components included in, or associated with, an antenna system. In exemplary embodiments, the interference/PIM cancellation system may include, or be included in, an adjusting mechanism or system, which may be configured to perform polarization adjusting and/or phase shifting/delaying electronically, mechanically, electromechanically, and/or the like. The one or more components may include radiating elements (which may, e.g., include crossed-dipole antenna elements, MIMO-type antenna elements, and/or other types of radiating elements) of the antenna system, or more generally, any structural portion of radiating elements, such as, for example, feed port(s), ground/base plane(s), and/or the like.

As one example, one or more embodiments of the interference/PIM cancellation system may be configured to control physical movements of one or more radiating elements of one or more antennas based on the detected interference/PIM.

In embodiments where the interference/PIM cancellation system controls physical movements of radiating elements, the interference/PIM cancellation system can do so by causing radiating elements to be physically rotated (e.g., without adjusting or moving an antenna housing). This can include, for example, causing radiating elements in a first column of radiating elements to be rotated by a certain amount in a certain direction (e.g., from a default polarization configuration, such as +45/−45 degrees, to a different polarization configuration, such as a +30/−60 degree orientation or the like) and either keeping radiating elements in a second column of radiating elements unchanged or causing radiating elements in the second column to be rotated by a certain amount in a certain direction, which may provide a polarization adjusting (e.g., mixing) effect where signals are projected in a different set of axes. This may result in one column receiving the interference/PIM and the other column receiving little to none of the interference/PIM, thereby enabling mitigation or cancellation of the interference/PIM (e.g., via selective signal/antenna extraction/usage).

In one or more embodiments, the interference/PIM cancellation system may control the physical movements of radiating elements by additionally, or alternatively, causing the radiating elements to be shifted along a radial axis of the antenna (e.g., without adjusting or moving an antenna housing). This can include, for example, causing radiating elements in a first column of radiating elements to be shifted or displaced by a certain amount in a first direction along the radial axis, and either leaving radiating elements in a second column of radiating elements unmoved or causing radiating elements in the second column to be shifted or displaced by a certain amount in a second direction opposite the first direction, which may result in phase shifts or delays between signals associated with the radiating elements in the first column and signals associated with the radiating elements in the second column. This may similarly result in one column receiving the interference/PIM and the other column receiving little to none of the interference/PIM, thereby enabling mitigation or cancellation of the interference/PIM (e.g., via selective signal/antenna extraction/usage).

In some embodiments, the interference/PIM cancellation system may be integrated in a radio (e.g., a remote radio head (RRH) or remote radio unit (RRU)), and may be configured to effect some or all of the polarization adjusting functionality and/or phase shifting/delaying functionality described herein. In certain embodiments, the interference/PIM cancellation system may be integrated in an antenna system (e.g., as part of smart antenna functionality), and may be configured to effect some or all of the polarization adjusting functionality and/or phase shifting/delaying functionality described herein independently of a radio (e.g., a remote radio head (RRH) or remote radio unit (RRU)) and/or based on commands from the radio.

In various embodiments, the interference/PIM cancellation system may be configured to effect the polarization adjusting and/or phase shifting/delaying by additionally, or alternatively, performing (e.g., electronic) processing on (or adjustments to) signals associated with radiating elements. In such embodiments, the interference/PIM cancellation system may perform signal processing operations that define polarizations/projections or radiation patterns for signals associated with the various radiating elements, which may provide the aforementioned polarization adjusting (e.g., mixing) effect where signals may be projected in a different set of axes. This may similarly result in some radiating elements receiving the interference/PIM and other radiating elements receiving little to none of the interference/PIM, thereby enabling mitigation or cancellation of the interference/PIM (e.g., via selective signal/antenna extraction/usage). In certain embodiments, the processing may be implemented in cases where the antennas are integrated with a radio (e.g., an RRH or an RRU). For example, as described herein, such processing may be implemented in MIMO antennas, where the radio has access to each radiating element in each column/row of the antenna via a respective controller/transceiver.

In various embodiments, the interference/PIM cancellation system may additionally, or alternatively, include, or be implemented, in one or more RF devices (e.g., RF circuits or the like) configured to perform polarization adjusting and/or phase shifting/delaying by altering/combining, in the RF domain, phase(s) and/or amplitudes of signals to be transmitted and/or signals that are received. The polarization adjusting and/or phase shifting/delaying can be based on the level(s)/characteristic(s) of determined PIM combination(s) that need to be addressed.

In certain exemplary embodiments described herein, the polarization adjusting and/or phase shifting/delaying can be additionally, or alternatively, provided by configuring or adapting one or more properties of certain radiating elements of an antenna (e.g., without adjusting or moving an antenna housing). In one or more embodiments, different shapes (or combination(s) of shapes), dimensions, electrical/magnetic properties, or a combination thereof may be selected or defined for radiating elements of a first set (or column) of radiating elements of an antenna relative to radiating elements of a second set (or column) of radiating elements of the antenna. As an example, the structure of each of a selected set of radiating elements of an antenna system may be altered (e.g., shifted, folded, bypassed, and/or the like). As another example, the structure of each of a selected set of radiating elements of an antenna system may be substituted with a different structure. By virtue of the difference in properties between the first and second columns of radiating elements (which can, for example, provide a polarization adjusting and/or phase shifting/delaying effect), the amount of interference/PIM that is received, or whether interference/PIM is received at all, may be selectively controlled. For example, this may similarly result in some radiating elements receiving the interference/PIM and other radiating elements receiving little to none of the interference/PIM, thereby enabling mitigation or cancellation of the interference/PIM (e.g., via selective signal/antenna extraction/usage).

As also described herein, one or more embodiments of the interference/PIM cancellation system may include monitoring elements that are distinct from the main radiating elements of an antenna, and that are configured to detect interference/PIM in the far-field region, the intermediate region, and/or the near-field region. In some implementations, the main radiating elements of an antenna may additionally, or alternatively, be configured to detect interference/PIM in one or more of these regions.

In various embodiments, the interference/PIM cancellation system may include hardware and/or software components (which may, for example, be integrated in the antenna or located externally to the antenna) configured to effect polarization adjusting and/or phase shifting/delaying by performing signal conditioning of uplink signals in a manner that (partially or fully) cancels interference/PIM therefrom.

It is to be appreciated and understood that various embodiments described herein may address interference/PIM in the near-field or intermediate-field regions, and may have minimal to no impact to downlink signals in the far-field region (e.g., in a portion of the far-field region that excludes the intermediate-field region).

It is also to be appreciated and understood that the various embodiments that provide polarization adjusting and/or phase shifting/delaying (for example, by performing adjustments for component(s) associated with an antenna system, such as radiating elements, structural portions of radiating elements, etc., by processing of signals associated with radiating elements, by defining of different (e.g., structural) properties for different sets of radiating elements of antenna(s), etc.) and/or signal conditioning to cancel detected interference/PIM may be combined in any manner and used together in any way (e.g., physical rotation of radiating elements and processing of signals associated with radiating elements may be performed together; physical shifting of radiating elements, signal conditioning, and defining of different structural properties for different sets of radiating elements may be performed together; etc.).

In some implementations, in the various embodiments in which adjustments are made for component(s) associated with an antenna system (e.g., adjustments for structural portion(s) of radiating elements, physical rotation/shifting of radiating elements, etc.) and/or processing of signals associated with radiating elements is performed, some or all of these adjustments and/or signal processing may be performed automatically—e.g., by one or more smart detection/cancellation devices/systems/algorithms-based on the detected interference/PIM.

In other implementations, in the various embodiments in which adjustments are made for component(s) associated with an antenna system (e.g., adjustments for structural portion(s) of radiating elements, physical rotation/shifting of radiating elements, etc.) and/or processing of signals associated with radiating elements is performed, some or all of these adjustments and/or signal processing may be performed manually—e.g., by one or more operators or administrators in light of the detected interference/PIM. In such implementations, one or more preset conditions or settings (e.g., relating to particular adjustments, such as rotation angles, shifting displacement values, polarizations/projections, etc.) may be available for user selection, and may, when selected, cause the appropriate polarization adjustments and/or phase shifts/delays to be effected accordingly.

Based on an analysis of known or likely interference/PIM levels, characteristics, and/or combinations, proper selection of polarization adjusting parameters/values, phase shifts/delays, and/or the like may be determined and utilized to manipulate antenna systems. By providing polarization adjusting and/or phase shifting/delaying (e.g., via adjustments to structural portion(s) of radiating elements of the antenna system, physical rotation/shifting of radiating elements of the antenna system, processing of signals associated with radiating elements, and/or defining of different (e.g., structural) properties for different sets of radiating elements), as described herein, downlink signals can be manipulated or otherwise influenced in a way that minimizes or reduces the amount of interference/PIM that is received in the uplink, which can improve overall uplink performance and coverage. Radiating elements, and more generally, an antenna system may, therefore, be designed, configured, and/or controlled in order to optimize (or improve) the near-field and far-field regions for interference/PIM reduction. The principle of orthogonality between the different modes of transmission can also be taken into account, where interference/PIM source(s) minimally interact with transmissions, thereby reducing the level of interference/PIM detected/received by a communications system.

While the distinction between field components is clear mathematically, the fields overlap (e.g., the demarcation of the spatial field regions may be subjective), and thus there may be substantial far-field and near-field radiative components in the closest-in near-field reactive region. In various implementations, alternative methodologies or approaches may be employed, including approaches that focus on minimizing reflected energy based on the summation of the near field, the intermediate field, and the far field. This can be achieved, for example, by simulating an antenna's near field and optimizing (or improving) its properties.

In exemplary embodiments, various techniques described herein, including methods for polarization adjusting and/or phase shifting/delaying and the like, can be exploited in time-division duplex (TDD) systems and/or frequency-division duplex (FDD) systems to relax, loosen, or otherwise decrease the number of system implementation requirements, such as those relating to guard times/bands in TDD and frequency separation in FDD.

Various techniques described herein for manipulating/altering/adjusting signal transmission/reception and/or component(s) of an antenna system (e.g., radiating elements, structural portion(s) of radiating elements, etc.) may be applied to the uplink and/or downlink in a TDD communications system in order to reduce or eliminate the guard band. In exemplary embodiments, the polarization of the uplink can be adjusted relative to the polarization of the downlink, or vice versa, such that the uplink polarization and the downlink polarization are different from one another. For instance, in cases where one or more MIMO antennas that provide parallel transmissions are employed in a TDD system, polarization adjusting may be applied for some or all of the radiating elements utilized during downlink operations such that the polarization thereof is in a first polarization, and may be similarly applied for some or all of the radiating elements utilized during uplink operations such that the polarization thereof is in a different (e.g., orthogonal) polarization. Doing so creates an additional dimension of separation that permits a smaller guard band to be used, which can provide improved network speeds. In extreme cases, guard bands can even be eliminated, where downlink and uplink transmissions may overlap or coexist without interference by virtue of the use of different, orthogonal polarizations.

Various techniques described herein for manipulating/altering/adjusting signal transmission/reception and/or component(s) of an antenna system (e.g., radiating elements, structural portion(s) of radiating elements, etc.) may also be applied to the uplink in a TDD communications system in order to address any direct interference with FDD system signals and/or any PIM generated by mixing of FDD system signals. In exemplary embodiments, polarization adjusting can be employed in the TDD system to separate the TDD uplink from FDD system signals. Here, the TDD uplink may be deployed in particular polarization(s) that enable the TDD uplink to avoid receiving signals from the FDD systems and/or any PIM generated by mixing of FDD system signals.

Various techniques described herein for manipulating/altering/adjusting signal transmission/reception and/or component(s) of an antenna system (e.g., radiating elements, structural portion(s) or radiating elements, etc.) may also be applied to the uplink and/or downlink in an FDD communications system in order to reduce or eliminate the need for duplexers (e.g., by relaxing or loosening duplexer requirements). In exemplary embodiments, for example, polarization adjusting, can be employed in an FDD system (e.g., as an additional way) to separate the downlink and uplink frequencies. Here, the downlink and the uplink may be deployed in different (e.g., orthogonal) polarizations. That is, for example, the polarization of the uplink can be adjusted relative to the polarization of the downlink, or vice versa, such that the uplink polarization and the downlink polarization are different from one another. Doing so creates an additional dimension of separation that permits the use of fewer or less sophisticated duplexers (e.g., duplexers with fewer stages), since signal gain (in dB) that might otherwise be offered through the use of more duplexer stages can instead be provided via polarization adjusting. This can advantageously enable massive MIMO implementations in FDD. In extreme cases, duplexers can even be eliminated altogether by virtue of the use of different, orthogonal polarizations.

One or more aspects of the subject disclosure include a method. The method can comprise receiving, via an antenna, a communication signal generated by a communication device. Further, the method can include detecting interference in the communication signal, wherein the interference is generated by one or more interference sources, wherein the interference is detected by monitoring a near field region of the antenna, an intermediate field region of the antenna, a far field region of the antenna, or any combinations thereof, wherein the monitoring excludes monitoring only the far field region of the antenna.

One or more aspects of the subject disclosure include a device, comprising a circuit coupled to an antenna and facilitating operations. The operations can include receiving, via the antenna, a signal generated by a communication device. Further, the operations can include detecting interference in the signal, wherein the interference is generated by one or more sources, wherein the interference is detected by monitoring a near field region of the antenna, an intermediate field of the antenna, a far field region of the antenna, or any combinations thereof, wherein the monitoring excludes monitoring only the far field region of the antenna.

One or more aspects of the subject disclosure include a non-transitory machine-readable medium, comprising executable instructions that, when executed by a processing system including a processor, facilitate performance of operations. The operations can include receiving, via an antenna, a communication signal generated by a communication device. Further, the operations can include detecting interference in the communication signal, wherein the interference is generated by one or more interference sources, wherein the interference is detected by monitoring a near field region of the antenna, an intermediate field region of the antenna, or both with or without monitoring a far field region of the antenna.

Other embodiments are described in the subject disclosure.

Referring now to FIG. 1A, a block diagram is shown illustrating an example, non-limiting embodiment of a system 100 in accordance with various aspects described herein. For example, system 100 can facilitate, in whole or in part, detection of interference/PIM in a communications system and performing of action(s), such as polarization adjusting and/or phase shifting/delaying, as described herein, that result in mitigation/cancellation of the interference/PIM. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
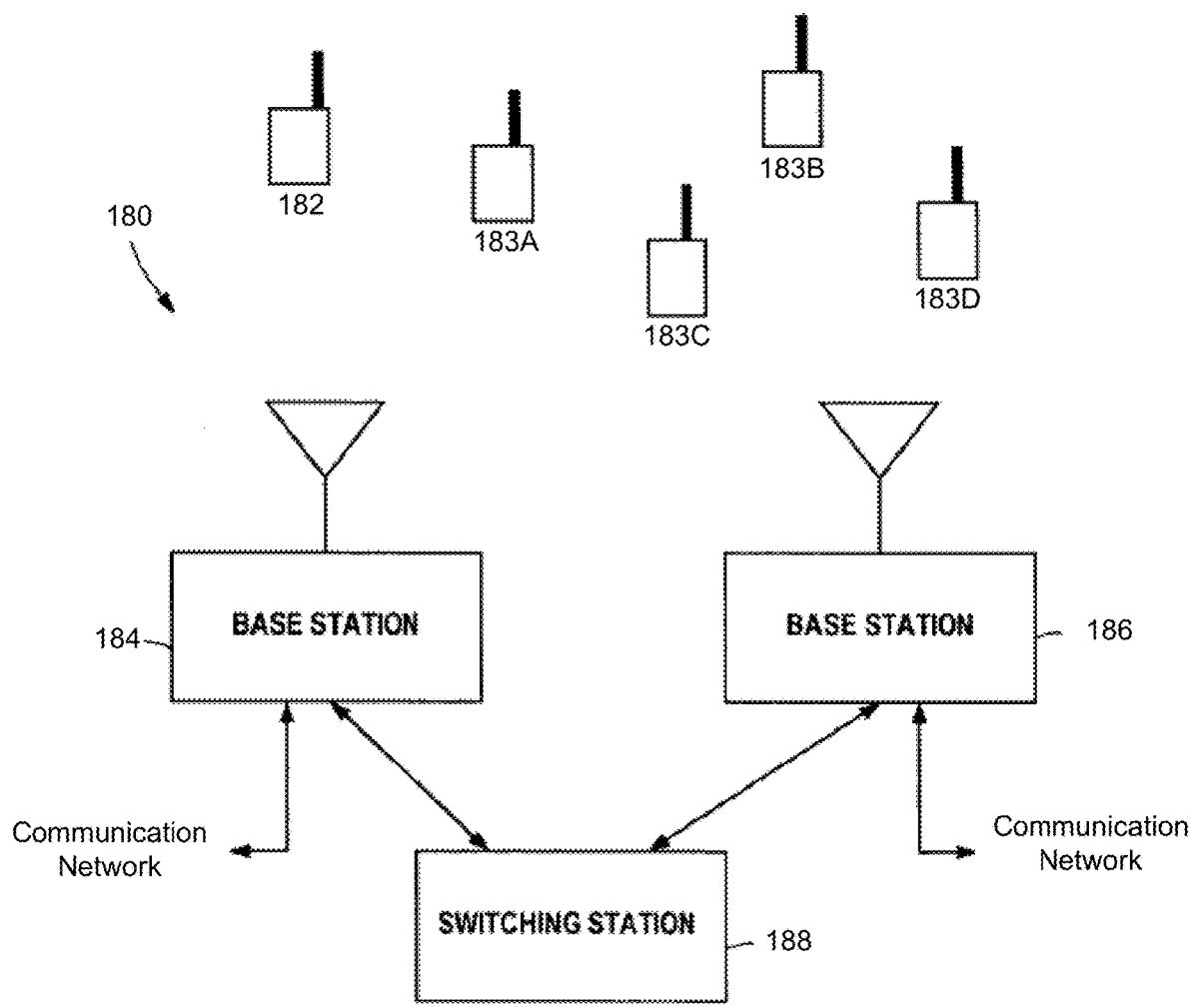
FIG. 1B depicts an exemplary, non-limiting embodiment of a communications system functioning within, or operatively overlaid upon, the communications network of FIG. 1A in accordance with various aspects described herein.

FIG. 1B depicts an exemplary, non-limiting embodiment of a telecommunication communications system 180 functioning within, or operatively overlaid upon, the communications network 100 of FIG. 1A in accordance with various aspects described herein. For example, system 180 can facilitate, in whole or in part, detection of interference/PIM in a communications system and performing of action(s), such as polarization adjusting and/or phase shifting/delaying, as described herein, that result in mitigation/cancellation of the interference/PIM. As shown in FIG. 1B, the telecommunication system 180 may include mobile units 182, 183A, 183B, 183C, and 183D, a number of base stations, two of which are shown in FIG. 1B at reference numerals 184 and 186, and a switching station 188 to which each of the base stations 184, 186 may be interfaced. The base stations 184, 186 and the switching station 188 may be collectively referred to as network infrastructure.

During operation, the mobile units 182, 183A, 183B, 183C, and 183D exchange voice, data or other information with one of the base stations 184, 186, each of which is connected to a conventional land line communication network. For instance, information, such as voice information, transferred from the mobile unit 182 to one of the base stations 184, 186 is coupled from the base station to the communication network to thereby connect the mobile unit 182 with, for example, a land line telephone so that the land line telephone may receive the voice information. Conversely, information, such as voice information may be transferred from a land line communication network to one of the base stations 184, 186, which in turn transfers the information to the mobile unit 182.

The mobile units 182, 183A, 183B, 183C, and 183D and the base stations 184, 186 may exchange information in either narrow band or wide band format. For the purposes of this description, it is assumed that the mobile unit 182 is a narrowband unit and that the mobile units 183A, 183B, 183C, and 183D are wideband units. Additionally, it is assumed that the base station 184 is a narrowband base station that communicates with the mobile unit 182 and that the base station 186 is a wideband digital base station that communicates with the mobile units 183A, 183B, 183C, and 183D.

Narrow band format communication takes place using, for example, narrowband 200 kilohertz (KHz) channels. The Global system for mobile phone systems (GSM) is one example of a narrow band communication system in which the mobile unit 182 communicates with the base station 184 using narrowband channels. Alternatively, the mobile units 183A, 183B, 183C, and 183D communicate with the base station 186 using a form of digital communications such as, for example, 3GPP Long Term Evolution (LTE), code-division multiple access (CDMA), Universal Mobile Telecommunications System (UMTS), or other next generation wireless access technologies. LTE, for instance, is a wireless broadband communication standard that covers many different frequency bands depending on the geographical region. The terms narrowband and wideband referred to above can be replaced with sub-bands, concatenated bands, bands between carrier frequencies (carrier aggregation), and so on, without departing from the scope of the subject disclosure.

The switching station 188 is generally responsible for coordinating the activities of the base stations 184, 186 to ensure that the mobile units 182, 183A, 183B, 183C, and 183D are constantly in communication with the base station 184, 186 or with some other base stations that are geographically dispersed. For example, the switching station 188 may coordinate communication handoffs of the mobile unit 182 between the base station 184 and another base station as the mobile unit 182 roams between geographical areas that are covered by the two base stations.

In various circumstances, the telecommunication system 180, and more particularly, one or more of the base stations 184, 186 can be undesirably subjected to interference. Interference can represent emissions within band (narrowband or wideband), out-of-band interferers, interference sources outside cellular (e.g., TV stations, commercial radio or public safety radio), interference signals from other carriers (inter-carrier interference), interference signals from UEs operating in adjacent base stations, PIM, and so on. Interference can represent any foreign signal that can affect communications between communication devices (e.g., a UE served by a particular base station).

Figure 2A:
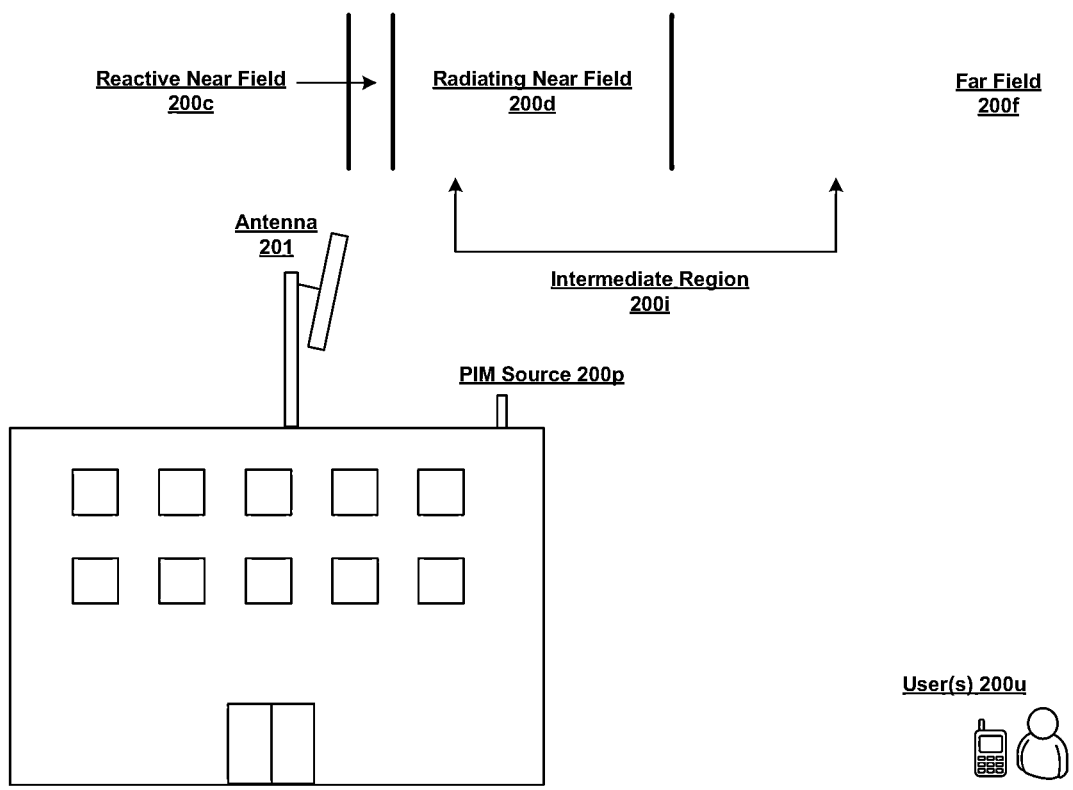
FIG. 2A is a block diagram illustrating an example, non-limiting embodiment of a system functioning within, or operatively overlaid upon, the communications network of FIG. 1A and/or the communications system of FIG. 1B in accordance with various aspects described herein.

FIG. 2A is a block diagram illustrating an example, non-limiting embodiment of a system 200 functioning within, or operatively overlaid upon, the communications network 100 of FIG. 1A and/or the communications system 180 of FIG. 1B in accordance with various aspects described herein. As depicted, the system 200 can include an antenna (or antenna system) 201. In various embodiments, the antenna 201 may include multiple radiating elements. In one or more embodiments, the antenna 201 may include multiple columns and/or rows of radiating elements, forming an antenna array. In certain embodiments, the antenna 201 may include multiple arrays or panels. As shown in FIG. 2A, the antenna 201 can be associated with various spatial regions, including a reactive near-field region 200c, a radiating near-field region 200d, a far-field region 200f, and an intermediate region 200i. One or more UEs/users 200u may be located in the far-field region 200f. The intermediate region 200i may include a zone that overlaps a portion of the radiating near-field region 200d and a portion of the far-field region 200f.

In various antenna deployments, antennas (or more particularly, the uplink) may be subject to interference and/or PIM—e.g., a PIM source 200p. PIM interference may be due to nonlinearities external to antennas that, when subjected to electromagnetic waves emitted by antenna elements in the downlink frequency band, generate reflections at frequencies in the uplink frequency band. PIM interference may also be due to antenna(s) of a base station transmitting and receiving in downlink and uplink frequency bands that are close to one another, or due to different antennas of different base stations transmitting in frequency bands that are close to one another. In these cases, intermodulation of signals transmitted in different (but sufficiently close) frequencies can result in passive signals falling into an uplink frequency band. In any case, interference/PIM decreases uplink sensitivity and thus negatively impacts uplink coverage, reliability, performance, and data speeds.

As depicted in FIG. 2A, the antenna 201 can be disposed or deployed on a structure, such as a building rooftop. It is to be appreciated and understood that the antenna 201 can be deployed in any suitable manner. As one example, the antenna 201 may be mounted on one or more towers where few or no objects may be located nearby (e.g., an unobstructed antenna on a tower), and thus a far-field representation may be adequate. As another example, multiple antennas 201 may be located within close proximity to one another (e.g., within a threshold distance from one another), where the antennas 201 may or may not have overlapping degrees of coverage, and thus the near-field region may have an impact on antenna performance. As yet another example, one or more antennas 201 may be deployed on building rooftop(s) in densely-populated areas (e.g., towns or cities). In this example, the antennas 201 may be located within close proximity to one another and may have overlapping degrees of coverage and/or be obstructed by nearby external objects, such that the near-field and intermediate field regions may have an impact on antenna performance.

The far field (e.g., the far-field region 200f) may be defined by a distance $r \gg 2L^2/(\lambda)$, where L is the length of the antenna and A is the wavelength of a transmitted signal. Antenna specifications are generally based on the far-field region. In the far-field region, the electric and magnetic fields are perpendicular to each other, the ratio of E/H is the free space propagation, and the antenna pattern is not a function of the distance r. The near field, and more particularly the reactive near-field (e.g., the reactive near-field region 200c), can be defined by $r<\lambda/2\pi$. In the radiating near-field region (or the Fresnel region) (e.g., the radiating near-field region 200d), for $\lambda/2\pi < r < 2L^2/(\lambda)$, the radiated power density is greater than the reactive power density and $1/r^3$ is very small, but the $1/r$ and $1/r^2$ terms are still dominant. For the intermediate region (e.g., the intermediate region 200i), where $r > 2L^2/(\lambda)$, the term $1/r$ is larger than the other terms but not yet dominant. In all of the regions other than the far-field region, the electric and magnetic fields are not perpendicular. Various exemplary embodiments described herein account for the transition region—i.e., the intermediate region-between/overlapping the near-field and far-field regions, which can be represented differently, mathematically.

The electric and magnetic field equations for a dipole, such as a dipole antenna element of the antenna 201 (e.g., in a case where the antenna 201 includes dipole elements) may include:

$$Er = \frac{I_o\ L\ \cos\theta\ e^{-j\omega[t-\frac{r}{c}]}}{2\pi\varepsilon_o}\left(\frac{1}{cr^2} + \frac{1}{j\omega r^3}\right); \quad \text{(EQ 1)}$$

$$E_\theta = \frac{I_o\ L\ \sin\theta\ e^{-j\omega[t-\frac{r}{c}]}}{4\pi\varepsilon_o}\left(\frac{j\omega}{c^2 r} + \frac{1}{cr^3} + \frac{1}{j\omega r^3}\right); \quad \text{(EQ 2)}$$

$$E_\varphi = 0; \quad \text{(EQ 3)}$$

$$H\varphi = \frac{I_o\ L\ \sin\theta\ e^{-j\omega[t-\frac{r}{c}]}}{4\pi}\left(\frac{j\omega}{c\ r} + \frac{1}{r^2}\right); \text{ and} \quad \text{(EQ 4)}$$

$$H_r = 0 \text{ and } H_\theta = 0, \quad \text{(EQ 5)}$$

where $E_r$ and $H_r$ are the radial electric and magnetic fields components, where $E_\varphi$ and $H_\varphi$ are the azimuth electric and magnetic fields components, and where $E_\theta$ and $H_\theta$ are the polar electric and magnetic components.

Here, $I_o$ is the peak value of the current flowing in the radiating element (e.g., dipole), $\varepsilon_o$ is the permittivity or dielectric constant of free space, $\omega=2\pi f$, where f is the frequency, c is the speed of light, L is the length of the dipole, and r is the distance from the dipole.

For the intermediate region, when $r > L^2/(\lambda)$, the second and the third terms in $E_\theta$ become zero, and the second term in $H_\varphi$ becomes zero, resulting in the following equations:

$$Er \cong \frac{I_o\ L\ \cos\theta\ e^{-j\omega[t-\frac{r}{c}]}}{2\pi\varepsilon_o cr^2}; \quad \text{(EQ 6)}$$

$$E\theta \cong \frac{j\omega I_o\ L\sin\theta\ e^{-j\omega[t-\frac{r}{c}]}}{4\pi\varepsilon_o c^2 r}; \text{ and} \quad \text{(EQ 7)}$$

$$H\varphi \cong \frac{j\ \omega I_o\ L\sin\theta\ e^{-j\omega[t-\frac{r}{c}]}}{4\pi cr}. \quad \text{(EQ 8)}$$

For the far-field region, when $r \gg L^2/(\lambda)$, $E_r$ becomes zero, the second and third terms in $E_\theta$ become zero, and the second term in $H_\varphi$ becomes zero, resulting in the following equations:

$$E\theta \cong \frac{j\omega Io\ L\sin\theta\ e^{-j\omega t[t-\frac{r}{c}]}}{4\pi\varepsilon_o c^2 r}; \text{ and} \quad \text{(EQ 9)}$$

$$H\varphi \cong \frac{j\ \omega Io\ L\sin\theta\ e^{-j\omega t[t-\frac{r}{c}]}}{4\pi cr}. \quad \text{(EQ 10)}$$

Figure 2B:
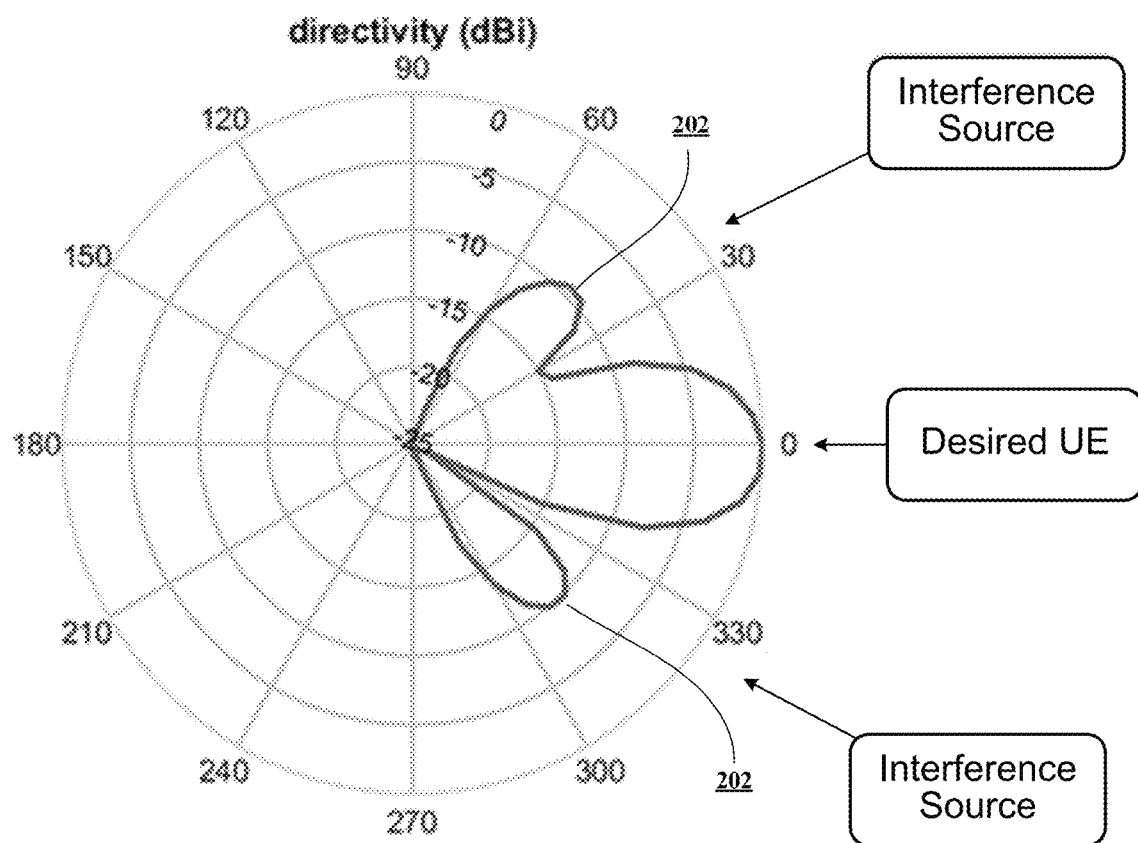
FIG. 2B depicts example null patterns for interference sources in accordance with various aspects described herein.

Antennas are typically designed based on the desired behavior in the far-field region—i.e., in accordance with certain design goals relating to beamwidth, half-power bandwidth, directivity, and back lobe radiation. Antennas are also designed not to generate PIM. Smart antennas are configured to minimize interference, generally by identifying the direction of the interference and creating nulls in that direction to avoid reception and transmission. For example, FIG. 2B depicts example null patterns 202 for interference sources in accordance with various aspects described herein. In certain embodiments, the antenna 201 may be operated using nulling techniques in which the energy reflected from the far-field is detected and used for optimization decisions. In such embodiments, the performance of the antenna(s) may thus be optimized (or improved) based on (e.g., based only on) the far field and not on the near field or the intermediate field.

Because the majority of interference/PIM is usually in the intermediate region, it can be advantageous to adapt/adjust antenna configurations and/or perform signal processing that enables such interference/PIM to be accounted for (i.e., detected, cancelled, or otherwise compensated for). Take, for example, a typical signal, which may be a sum of desired uplink signal(s) and undesired signal(s). A desired signal may be a signal originating from an end user device that is typically in the far field of an antenna. PIM, on the other hand, may be generated from a combination of far-field, intermediate-field, and/or near-field interfering signals, a substantial portion of which may originate from the intermediate-field region of the antenna. Thus, in a case where the far-field region for a 700 MHz, 2 meter (m) long antenna starts at about 19 m (e.g., about 120 feet) from the antenna, and the radiating near field starts at about 2.8 m (e.g., about 10 feet) from the antenna, most of the interference/PIM signals originate from sources located in the radiating near field or the intermediate region (e.g., 10 to 120 feet from the antenna). In exemplary embodiments, therefore, the antenna 201 may be configured to perform optimization based on near-field, intermediate-field, and/or far-field regions rather than the far-field region alone. In various embodiments, the antenna 201 may be capable of cancelling or mitigating interference/PIM as described herein.

Figure 2C:
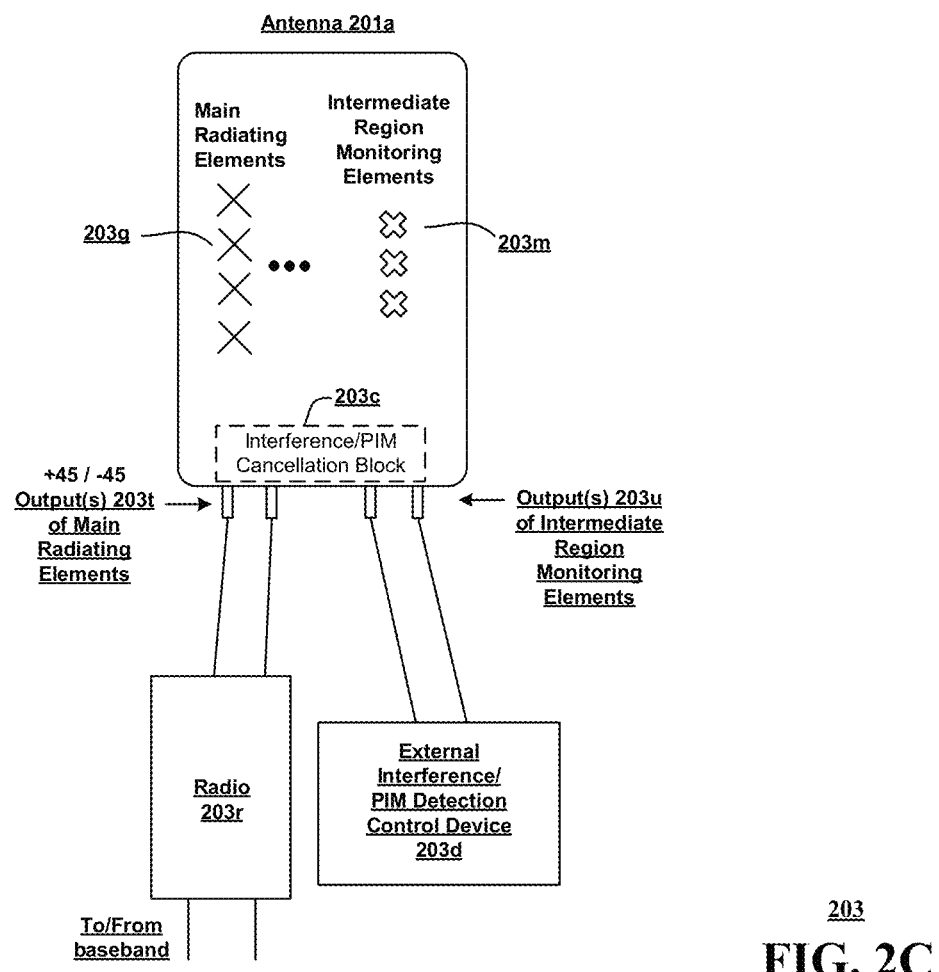
FIG. 2C is a block diagram illustrating an example, non-limiting embodiment of a communications system having an antenna with monitoring port(s) for interference/PIM detection, and functioning within, or operatively overlaid upon, the communications network of FIG. 1A and/or the communications system of FIG. 1B in accordance with various aspects described herein.

FIG. 2C is a block diagram illustrating an example, non-limiting embodiment of a communications system 203 having an antenna 201a with monitoring port(s) for interference/PIM detection, and functioning within, or operatively overlaid upon, the communications network 100 of FIG. 1A and/or the communications system 180 of FIG. 1B in accordance with various aspects described herein. The communications system 203 may include a radio 203r (e.g., a remote radio head or unit) and an interference/PIM detection control device 203d. Although not shown in FIG. 2C, in one or more embodiments, the radio 203r may be communicatively coupled to the interference/PIM detection control device 203d. In various embodiments, the antenna 201a may be the same as, may be similar to, or may otherwise correspond to the antenna 201 of FIG. 2A. As shown in FIG. 2C, the antenna 201a may include multiple columns of (e.g., main) radiating elements 203g and one or more columns of monitoring antenna elements 203m, which may be referred to herein as "patches." It will be appreciated and understood that the term patch, as used herein, may not imply and/or may not be limited to patch antennas—that is, patches described herein can be constructed from any suitable antenna design, including but not limited to patch antennas, and can represent one or more antennas that form a patch. In various embodiments, the monitoring elements 203m may be included in, incorporated into, or otherwise built into, the antenna 201a, and may be configured to detect interference/PIM signals originating from the intermediate-field region. The monitoring elements 203m may be configured to maximize the reception of such signals from the intermediate-field region, and minimize the reception of signals from the far-field region of the antenna 201a.

The antenna 201a and/or the main radiating elements 203g therein may be any shape or combination of shapes with any suitable dimensions, polarizations, etc. The antenna 201a may also include any suitable number of columns and rows of radiating elements 203g. The monitoring elements 203m may also be any shape or combination of shapes with any suitable dimensions, polarizations, etc., and can be configured based on interference/PIM cancellation needs. The monitoring elements 203m can be disposed amongst the radiating element 203g in any suitable manner, such as between various columns of the radiating elements 203g, between radiating elements of the same column of radiating elements 203g, and/or the like.

As shown in FIG. 2C, the antenna 201a may include, for the main radiating elements 203g, one or more outputs 203t on the antenna 201a's housing that can be communicatively coupled (e.g., via analog/RF line(s)) to the radio 203r. The antenna 201a may also include, as monitoring port(s) for the monitoring elements 203m, one or more outputs 203u on the housing that can be communicatively coupled (e.g., via analog/RF line(s) or other line(s) suitable to carry data from the monitoring elements 203m) to the interference/PIM detection control device 203d. In various embodiments, the interference/PIM detection control device 203d may, through the use of digital signal processing, analyze and/or examine the interference/PIM signals received from the monitoring elements 203m, and determine appropriate cancellation measures/decisions. Although FIG. 2C shows the interference/PIM detection control device 203d as being an external device, in certain embodiments, the interference/PIM detection control device 203d (e.g., some or all of the functionality thereof) may instead be included, or integrated, in the antenna 201a or the radio 203r.

In various embodiments, and as shown in FIG. 2C, the antenna 201a may (e.g., optionally) include an interference/PIM cancellation block 203c integrated therein. The interference/PIM cancellation block 203c may be configured to provide mitigation or cancellation of undesired interference/PIM signals, such as by performing signal conditioning on signals received by the radiating elements 203g. In some embodiments, the output of the monitoring elements 203m can be utilized within the antenna (e.g., by the interference/PIM cancellation block 203c) to address the interference/PIM. In these embodiments, the interference/PIM cancellation block 203c may include some or all of the functionalities of the interference/PIM detection control device 203d (and/or other related cancellation devices) for detecting interference/PIM in the output of the monitoring elements 203m and/or for determining and applying cancellation measures. Alternatively, the interference/PIM cancellation block 203c may (e.g., after the output of the monitoring elements 203m is provided to the interference/PIM detection control device 203d for analysis) obtain data/command(s) from the interference/PIM detection control device 203d with regard to interference/PIM mitigation or cancellation, and effect the mitigation/cancellation based on the data/command(s).

In certain embodiments, the output of the monitoring elements 203m can additionally, or alternatively, be routed externally to one or more other ports (e.g., on the antenna 201a's housing) coupled to one or more other systems/devices to obtain additional benefits, such as determining additional cancellation measures, obtaining insight into characteristics/location of the PIM source, performing additional signal analyses and data collection, and/or the like.

Cancellation measures may include dynamic modification of antenna parameters, control of multiple antennas as a cluster, and/or informing other cancellation devices in the RF or digital path (including, for example, a Common Public Radio Interface (CPRI) or enhanced CPRI (eCPRI)) of the interference/PIM conditions, which may enable such other cancellation devices to cancel with greater efficiency and accuracy. Crest Factor Reduction (CFR) algorithms are focused on reducing the dynamic range of a power amplifier without sacrificing too much error vector magnitude (EVM). CFR can help the amplifier operate more efficiently. In one or more embodiments, one or more CFR algorithms can be used—e.g., within a radio or remote radio head—for interference/PIM cancellation. In certain embodiments, the parameters/control of the CFR algorithm(s) can be coupled with (e.g., provided to) the interference/PIM cancellation block 203c and/or the interference/PIM detection control device 203d for use in determining/applying cancellation measures. Alternatively, the CFR algorithm(s) can be coupled with (e.g., provided to) other interference/PIM cancellation devices disposed in the RF or digital path to achieve increased cancellation performance.

It is to be appreciated and understood that the interference/PIM cancellation block 203c may be a high-level representative block that provides one or more functions of various embodiments described herein, including, for example, embodiments that enable mitigation/cancellation of interference/PIM by causing adjustment(s) to be made to one or more component(s) of an antenna system (such as adjustments to structural portions of radiating elements, physical rotation/shifting of radiating elements, and/or the like) and/or by processing signals associated with radiating elements.

In various embodiments, the antenna 201a may include different sets of main radiating elements. For example, the antenna 201a may include a first set of radiating elements configured to operate in a first frequency band, and a second set of radiating elements configured to operate in a second frequency band (see, for example, FIG. 2G, where an antenna may include a first set of radiating elements 207g, 207h configured to operate in one frequency band, and a second set of radiating elements 207g', 207h' configured to operate in a different frequency band). In certain embodiments, some or all of the monitoring elements 203m may be incorporated in the second set of radiating elements and configured for interference/PIM detection in the second frequency band.

In various embodiments, some or all of the first set of radiating elements and/or the second set of radiating elements may be configured for interference/PIM detection in the first/second frequency bands. In these embodiments, the monitoring elements 203m (and thus the outputs 203t) may or may not be included or needed. In implementations where the monitoring elements 203m and outputs 203u are not included or needed, the detected interference/PIM signals may be routed via the outputs 203t; alternatively, the detected interference/PIM signals may nevertheless be routed via the outputs 203t, but the outputs 203t may be communicatively coupled to the first/second set of main radiating elements (rather than to the monitoring elements 203m).

Figure 2D:
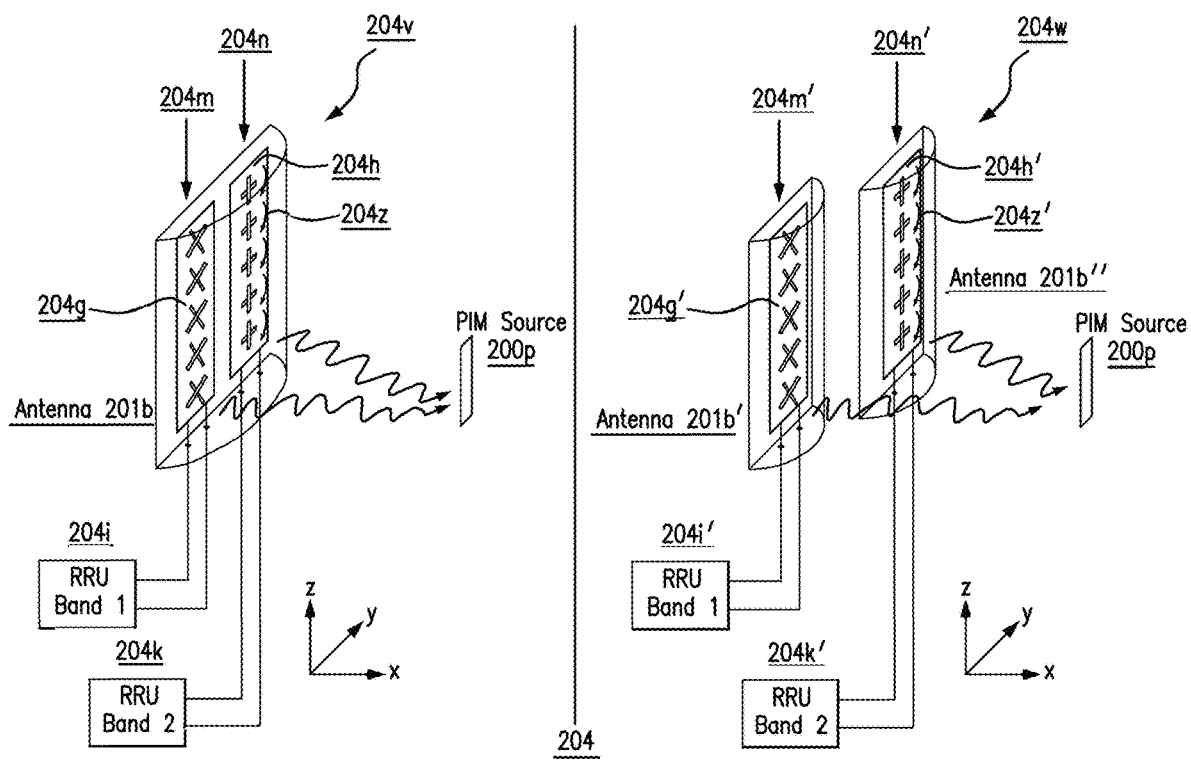
FIG. 2D is a block diagram illustrating example, non-limiting embodiments of two communications systems, including a first communications system having a single antenna, and a second communications system having two antennas, where each of the communications systems may be functioning within, or operatively overlaid upon, the communications network of FIG. 1A and/or the communications system of FIG. 1B in accordance with various aspects described herein.

FIG. 2D is a block diagram 204 illustrating example, non-limiting embodiments of two communications systems, including a first communications system 204v having a single antenna 201b, and a second communications system 204w having two antennas 201b' and 201b", where each of the communications systems 204v and 204w may be functioning within, or operatively overlaid upon, the communications network 100 of FIG. 1A and/or the communications system 180 of FIG. 1B in accordance with various aspects described herein. As shown in FIG. 2D, the antenna 201b of the first communications system 204v may include a column 204m of radiating elements 204g communicatively coupled to an RRU 204i (for a certain frequency band, such as Band 1), and a column 204n of radiating elements 204h communicatively coupled to an RRU 204k (for a certain frequency band, such as Band 2). As also depicted, the antenna 201b' of the second communications system 204w may include a column 204m' of radiating elements 204g' communicatively coupled to an RRU 204i' (for a certain frequency band, such as Band 1), and the antenna 201b" of the second communications system 204w may include a column 204n' of radiating elements 204h' communicatively coupled to an RRU 204k' (for a certain frequency band, such as Band 2). In various embodiments, one or more of the antennas 201b, 201b', 201b" may be the same as, may be similar to, or may otherwise correspond to the antenna system 201 of FIG. 2A.

In some embodiments, in the first communications system 204v, the antenna 201b may include multiple columns of radiating elements (e.g., multiple columns 204m and/or multiple columns 204n) and/or there may be additional antennas 201b communicatively coupled to the RRUs 204i, 204k or to additional RRUs. Additionally, in some embodiments, in the second communications system 204w, the antenna 201b' may include multiple columns of radiating elements (e.g., multiple columns 204m'), the antenna 201b" may include multiple columns of radiating elements (e.g., multiple columns 204n'), and/or there may be additional antennas 201b' and/or 201b" communicatively coupled to the RRUs 204i', 204k' or to additional RRUs. Furthermore, while the radiating elements 204g, 204h, 204g', and 204h' are shown as crossed-dipole elements, it is to be appreciated and understood that each of the antennas 201b, 201b', and 201b" may additionally, or alternatively, include one or more other types of elements.

In either of the first communications system 204v and the second communications system 204w, mixing of Band 1 and Band 2 downlink signals (DL1 and DL2, respectively) can result in interference/PIM. For example, PIM can produce energy in (e.g., that "lands" in) either the Band 1 uplink channel (UL1) or the Band 2 uplink channel (UL2), causing interference. In exemplary embodiments, various radiating elements of the first and second communications systems 204v and 204w may be capable of being physically rotated. In various embodiments, for example, the radiating elements 204h of column 204n of the antenna 201b may be configured to physically rotate (204z) (e.g., about a radial axis of the antenna 201b, shown as the X-axis) and/or the radiating elements 204g of column 204m of the antenna 201b may be configured to physical rotate (e.g., about the X-axis). Similarly, in various embodiments, the radiating elements 204h' of column 204n' of the antenna 201b" may be configured to physically rotate (204z') (e.g., about the X-axis) and/or the radiating elements 204g' of column 204m' of the antenna 201b' may be configured to physically rotate (e.g., about the X-axis). Physical rotation of orthogonal dipoles in one column relative to orthogonal dipoles in another column can be equivalent to, or result in, polarization adjusting (e.g., mixing), where signals are projected in a different set of axes, which can impact the near-field (and/or intermediate-field) signal strength in (e.g., each of) the orthogonal dipole transmitting/receiving antennas, thereby enabling interference/PIM mitigation or cancellation.

In the first communications system 204v, the RRUs 204i and 204k and the antennas (i.e., columns of radiating elements) may be 2Tx and 2Rx. Both bands (Bands 1 and 2) may be transmitted using separate crossed-dipole columns 204m and 204n within a single antenna 201b, where the separate RRUs 204i and 204k share the antenna 201b, where Band 1 is associated with two ports of the antenna 201b and with the first column 204m of crossed-dipole elements 204g, and where Band 2 is associated with another two ports of the antenna 201b and with the second column 204n of crossed-dipole elements 204h. Here, by rotating the crossed-dipole elements associated with Band 1 (e.g., some or all of the radiating elements 204g in the column 204m), the crossed-dipole elements associated with Band 2 (e.g., some or all of the radiating elements 204h in the column 204n), or both (e.g., some or all of the radiating elements 204g in the column 204m and some or all of the radiating elements 204h in the column 204n), the receipt/detection of PIM by the antenna 201b (or by the first communications system 204v overall) can be altered. Similarly, in the second communications system 204w, separate 2Tx and 2Rx RRUs 204i' and 204k' and antennas (i.e., antennas 201b' and 201b") may be employed. Here, by rotating the crossed-dipole elements associated with Band 1 (e.g., some or all of the radiating elements 204g' in the column 204m' of the antenna 201b'), the crossed-dipole elements associated with Band 2 (e.g., some or all of the radiating elements 204h' in the column 204n' of the antenna 201b"), or both (e.g., some or all of the radiating elements 204g' in the column 204m' of the antenna 201b' and some or all of the radiating elements 204h' in the column 204n' of the antenna 201b"), the receipt/detection of PIM by the antennas 201b' and/or 201b" (or by the second communications system 204w overall) can be altered.

In exemplary embodiments, an interference/PIM cancellation block (an interference/PIM cancellation block 204c of FIG. 2E, which may be the same as, may be similar to, or may correspond to the interference/PIM cancellation block 203c of FIG. 2C) may be configured to provide rotational control of the radiating elements of the first and/or second communications systems 204v and 204w. In various embodiments, the choice of which column of radiating elements to rotate and/or the rotational amount or angle can be based on determined interference/PIM levels or characteristics, which may be detected by monitoring elements (e.g., the monitoring elements 203m of FIG. 2C and/or an interference/PIM detection control device similar to the interference/PIM detection control device 203d) or may be known to exist or determined to likely exist (e.g., in accordance with historical and/or measurement data). Based on such interference/PIM information, the interference/PIM cancellation block may cause various radiating elements (or column(s) of radiating elements) to rotate accordingly. For example, in the first communications system 204v, the interference/PIM cancellation block may cause (e.g., each of) the radiating elements 204h in the column 204n of the antenna 201b to rotate from a default polarization (e.g., of +45/−45 degrees) to a different polarization (e.g., of +30/−60 degrees or another orthogonal combination), while the radiating elements 204g in the column 204m may remain in the default polarization (e.g., of +45/−45 degrees). In any case, antenna configurations with a variety of differently polarized columns of radiating elements (e.g., a mix of vertically-polarized radiating elements and cross-polarized radiating elements; or columns of radiating elements with different orthogonal polarization combinations) can, therefore, be obtained.

Appropriate rotation of select radiating elements (or columns of radiating elements) may result in, for example, one or more columns of radiating elements receiving or detecting some or all of the interference/PIM and one or more other columns of radiating elements receiving or detecting little to none of the interference/PIM, with minimal to no impact to the far field pattern. In exemplary cases, therefore, interference/PIM may be eliminated (zeroed out) or near eliminated with respect to a first column of orthogonal dipoles, and a second column of orthogonal dipoles may receive/detect some or all of the interference/PIM, thus enabling a receiving system to select the signal from the first column of orthogonal dipoles (the "clean" signal) for use. Here, while diversity may be lost (e.g., about 3 dB), interference/PIM cancelation of 15+dB can be achieved, resulting in a net 12+dB benefit. Configuring the communications systems such that certain column(s) of radiating elements are essentially interference/PIM free can also enable selective use thereof for certain types of traffic (e.g., high priority traffic or the like).

It is to be appreciated and understood that the interference/PIM cancellation block may be configured to cause rotation of radiating elements in any suitable manner. In exemplary embodiments, for example, an antenna (e.g., the antennas 201b, 201b', and/or 201b") may include one or more motor assemblies (e.g., a shaft and linear motor or other gear and rod mechanism, such as the motor(s) 207w and/or 207y and shaft(s) 207x and/or 207z shown in diagram 207 of FIG. 2G) communicatively coupled to radiating elements and configured to control rotary motion thereof (e.g., to fractions of a degree in accuracy and with minimal to no overshoot, or the like). In some embodiments, each column of radiating elements may be (e.g., independently) controllable by a respective motor assembly. In one or more embodiments, the interference/PIM cancellation block may be configured to cause radiating elements to rotate via remote electronic/electrical tilt.

Figure 2E:
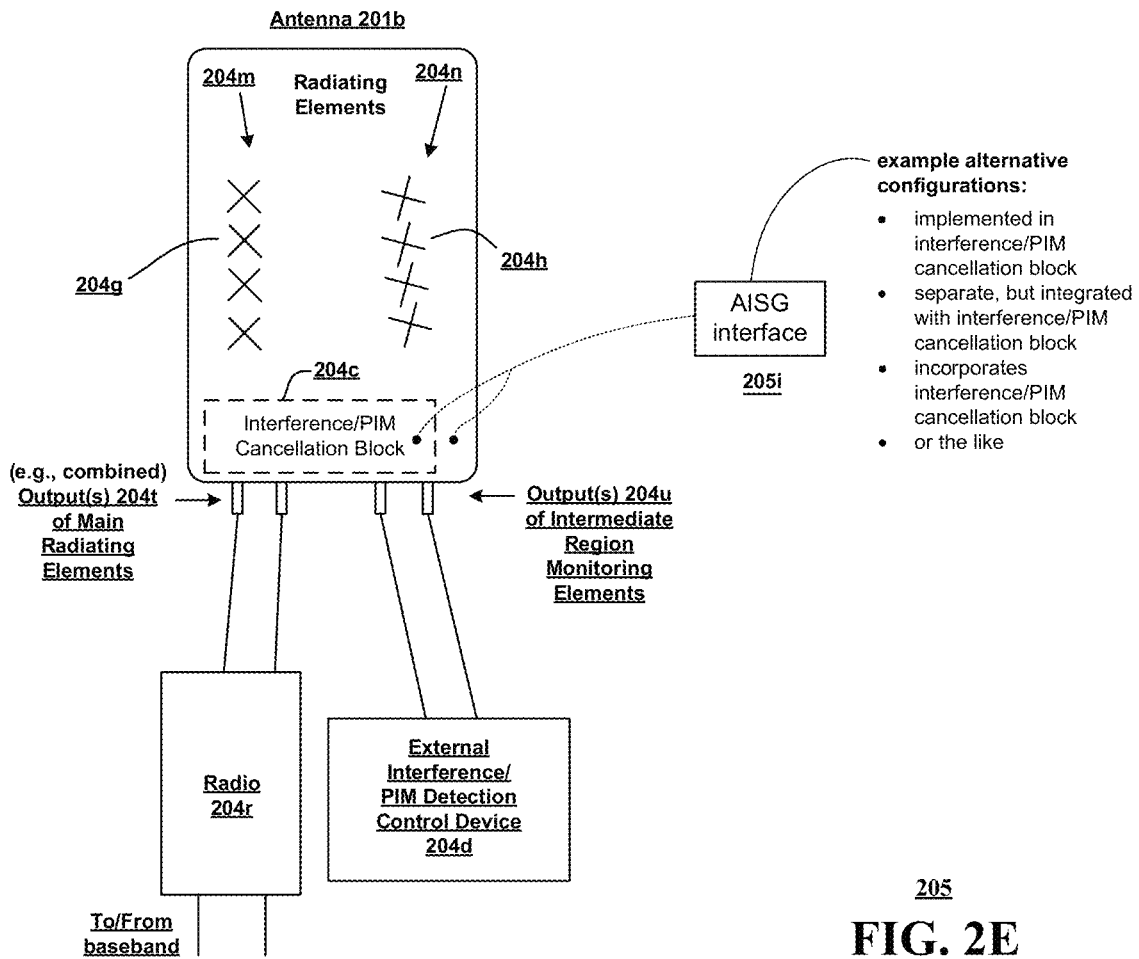
FIG. 2E is a block diagram illustrating an example, non-limiting embodiment of a communications system that includes the single antenna of FIG. 2D and that functions within, or is operatively overlaid upon, the communications network of FIG. 1A and/or the communications system of FIG. 1B in accordance with various aspects described herein.

FIG. 2E is a block diagram illustrating an example, non-limiting embodiment of a communications system 205 that includes the single antenna 201b of FIG. 2D and that functions within, or is operatively overlaid upon, the communications network 100 of FIG. 1A and/or the communications system 180 of FIG. 1B in accordance with various aspects described herein. As shown in FIG. 2E, the antenna 201b may (e.g., similar to the antenna 201a of FIG. 2C) include an interference/PIM cancellation block (e.g., an interface/PIM cancellation block 204c), and may be communicatively coupled to a radio (e.g., a radio 204r) via outputs (e.g., outputs 204t) and to an interference/PIM detection control device (e.g., an interference/PIM detection control device 204d) via other outputs (e.g., outputs 204u). Here, and as described above with respect to FIG. 2D, either or both of the column 204m of radiating elements 204g and the column 204n of radiating elements 204h may be rotatably controllable by the interference/PIM cancellation block 204c based on detected levels/characteristics of interference/PIM.

Figure 2F:
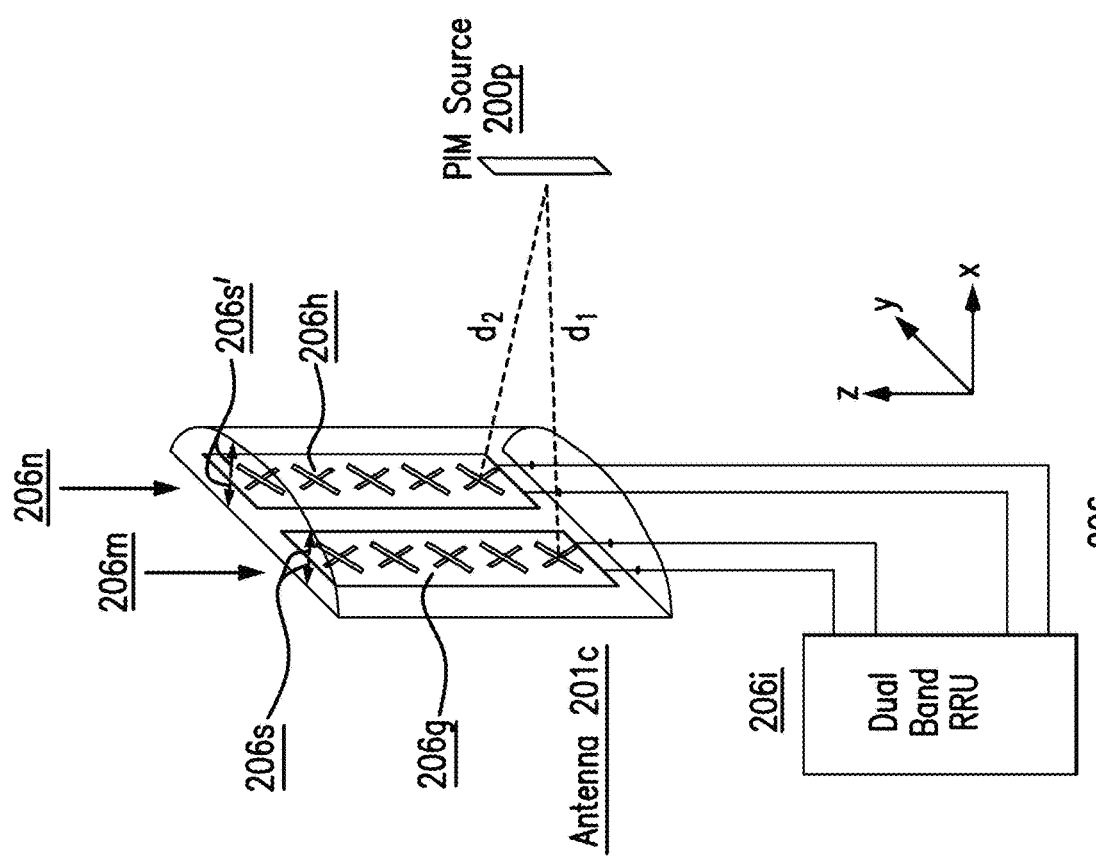
FIG. 2F is a block diagram illustrating an example, non-limiting embodiment of a communications system having an antenna and functioning within, or operatively overlaid upon, the communications network of FIG. 1A and/or the communications system of FIG. 1B in accordance with various aspects described herein.
Figure 2G:
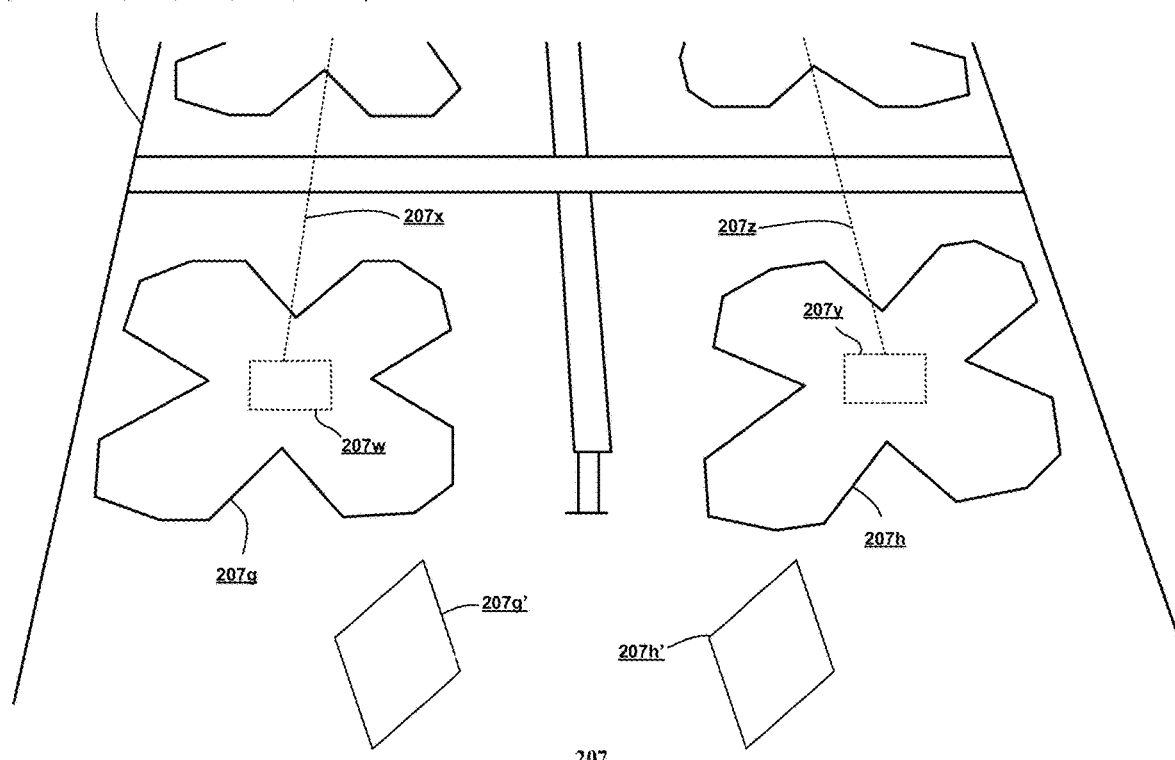
FIG. 2G is a block diagram illustrating an example, non-limiting embodiment of an antenna functioning within, or operatively overlaid upon, the communications network of FIG. 1A and/or the communications system of FIG. 1B in accordance with various aspects described herein.

FIG. 2F is a block diagram illustrating an example, non-limiting embodiment of a communications system 206 having an antenna 201c, and functioning within, or operatively overlaid upon, the communications network 100 of FIG. 1A and/or the communications system 180 of FIG. 1B in accordance with various aspects described herein. As shown in FIG. 2F, the antenna 201c may include a column 206m of radiating elements 206g communicatively coupled to a dual band RRU 206j, and a column 206n of radiating elements 206h communicatively coupled to the dual band RRU 206j. In various embodiments, the antenna 201c may be the same as, may be similar to, or may otherwise correspond to the antenna system 201 of FIG. 2A. The dual band RRU 206j and dual band antennas (i.e., columns of radiating elements) may be 4Tx and 4Rx. While FIG. 2F shows a single RRU and a single antenna, it is to be appreciated and understood that, in alternate embodiments, separate RRUs and separate antennas may be employed for Band 1 and Band 2.

In exemplary embodiments, the crossed-dipole elements (e.g., one or more of the radiating elements 206g of the column 206m) associated with one band, such as Band 1, may be linearly shiftable (206s) along the X-axis and/or the crossed-dipole elements (e.g., one or more of the radiating elements 206h of the column 206n) associated with the other band, such as Band 2, may be linearly shiftable (206s') along the X-axis. Shifting one column of radiating elements relative to the other column of radiating elements can alter the reception/detection of PIM by the antenna 201c (or by the communications system 206 overall). In particular, when a distance $d_1$ between the column 206m and the PIM source 200p is equal to a distance $d_2$ between the column 206n and the PIM source 200p, the downlink carriers may sum constructively. In contrast, if the difference between the distances $d_1$ and $d_2$ is half of the wavelength, the downlink carriers may sum deconstructively, reducing or eliminating the PIM.

In exemplary embodiments, an interference/PIM cancellation block (not shown in FIG. 2F, but that may be the same as, may be similar to, or may correspond to the interference/PIM cancellation block 203c of FIG. 2C and/or the interference/PIM cancellation block 204c of FIG. 2E) may be configured to control physical shifting (206s, 206s') of radiating elements of the antenna 201c. In various embodiments, the choice of which column of radiating elements to shift and/or the displacement amount and direction of shifting can be based on determined interference/PIM levels or characteristics, which may be detected by monitoring elements (e.g., the monitoring elements 203m of FIG. 2C and/or an interference/PIM detection control device similar to the interference/PIM detection control device 203d) or may be known to exist or determined to likely exist (e.g., in accordance with historical and/or measurement data). Based on such interference/PIM information, the interference/PIM cancellation block may cause various radiating elements (or column(s) of radiating elements) to displace along the X-axis accordingly. For example, the interference/PIM cancellation block may cause (e.g., each of) the radiating elements 206h of the column 206n of the antenna 201c to shift in the X-direction by a certain amount, and may cause (e.g., each of) the radiating elements 206g of the column 206m of the antenna 201c to shift in the opposite direction by a certain amount, and/or the like.

Appropriate (e.g., linear) displacement of select radiating elements (or columns of radiating elements) may result in, for example, one or more columns of radiating elements receiving or detecting some or all of the interference/PIM and one or more other columns of radiating elements receiving or detecting little to none of the interference/PIM, with minimal to no impact to the far field pattern. Similar to the embodiments described above with respect to FIGS. 2D and 2E, for example, in exemplary cases, interference/PIM may be eliminated (zeroed out) or near eliminated with respect to a first column of orthogonal dipoles, and a second column of orthogonal dipoles may receive/detect some or all of the interference/PIM, thus enabling a receiving system to select the signal from the first column of orthogonal dipoles (the "clean" signal) for use.

It is to be appreciated and understood that the interference/PIM cancellation block may be configured to cause shifting of radiating elements in any suitable manner. In exemplary embodiments, for example, an antenna (e.g., the antenna 201c) may include one or more motor assemblies communicatively coupled to radiating elements and configured to control motion thereof along the radial axis of the antenna. In some embodiments, each column of radiating elements may be (e.g., independently) controllable by a respective motor assembly.

In some embodiments, physical rotation/shifting of monitoring elements, such as the monitoring elements 203m of FIG. 2C, may also be effected in order to adjust interference/PIM detection parameters of those elements.

Figure 2H:
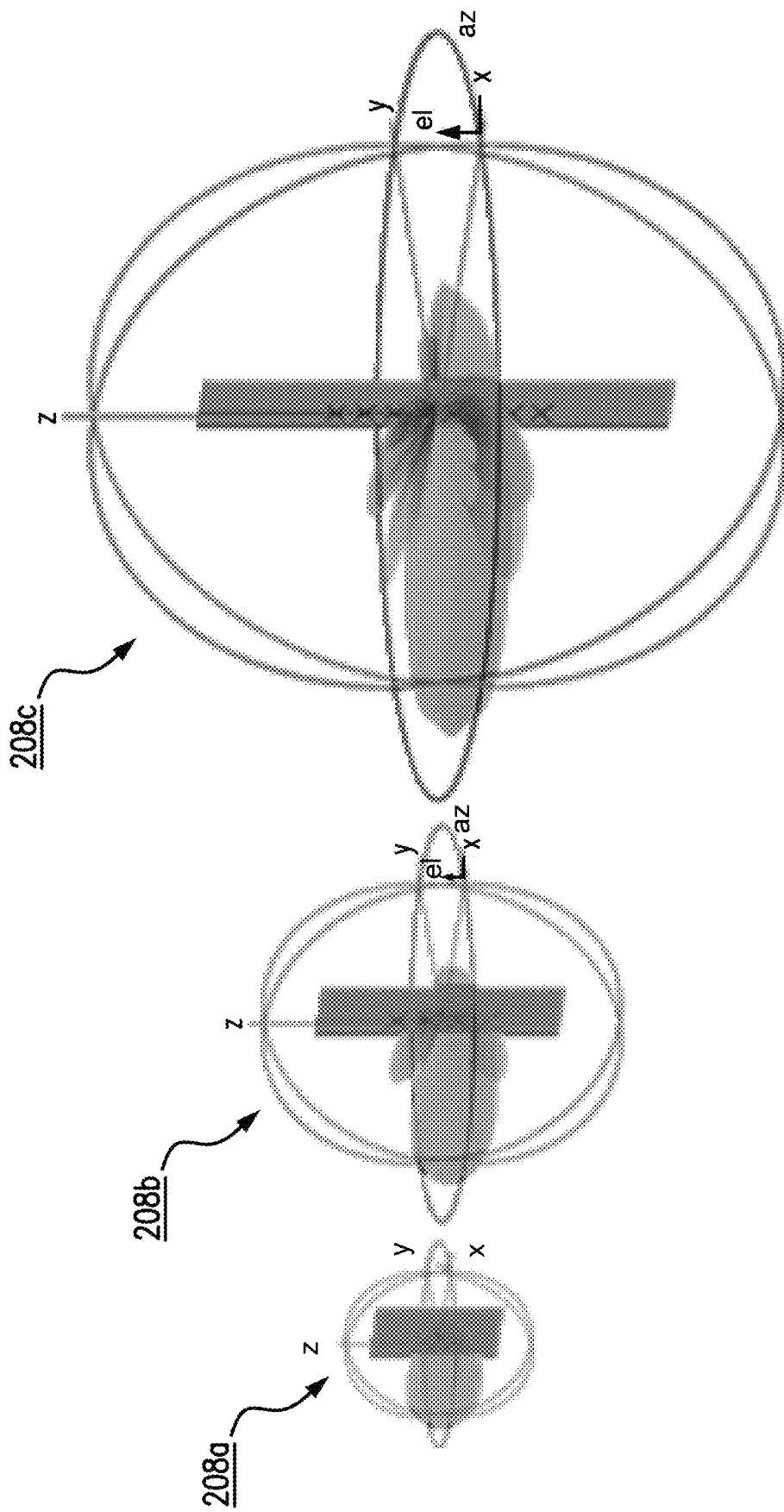
FIG. 2H depicts example radiation patterns of various single column antennas in accordance with various aspects described herein.

Some antennas include columns of 2, 4, and (sometimes) 8 radiating elements. As the number of radiating elements increases, the beam width in the elevation pattern decreases. In other words, adding more radiating elements in the same column of an antenna can permit narrower beamwidths in the elevation direction. An antenna may generally have less than 10 degrees in the elevation plane. In some instances, and in various embodiments described herein, a single column antenna may have a radiation pattern in the azimuth plane of about 65 to 90 degrees of half-power beamwidth. FIG. 2H depicts example radiation patterns 208a, 208b, and 208c of various single column antennas (e.g., a 2-radiating element antenna, a 4-radiating element antenna, and an 8-radiating element antenna, respectively) in accordance with various aspects described herein. In some embodiments, one or more of the single column antennas shown in FIG. 2H may be the same as, may be similar to, or may otherwise correspond to the antenna 201 of FIG. 2A.

Figure 2J:
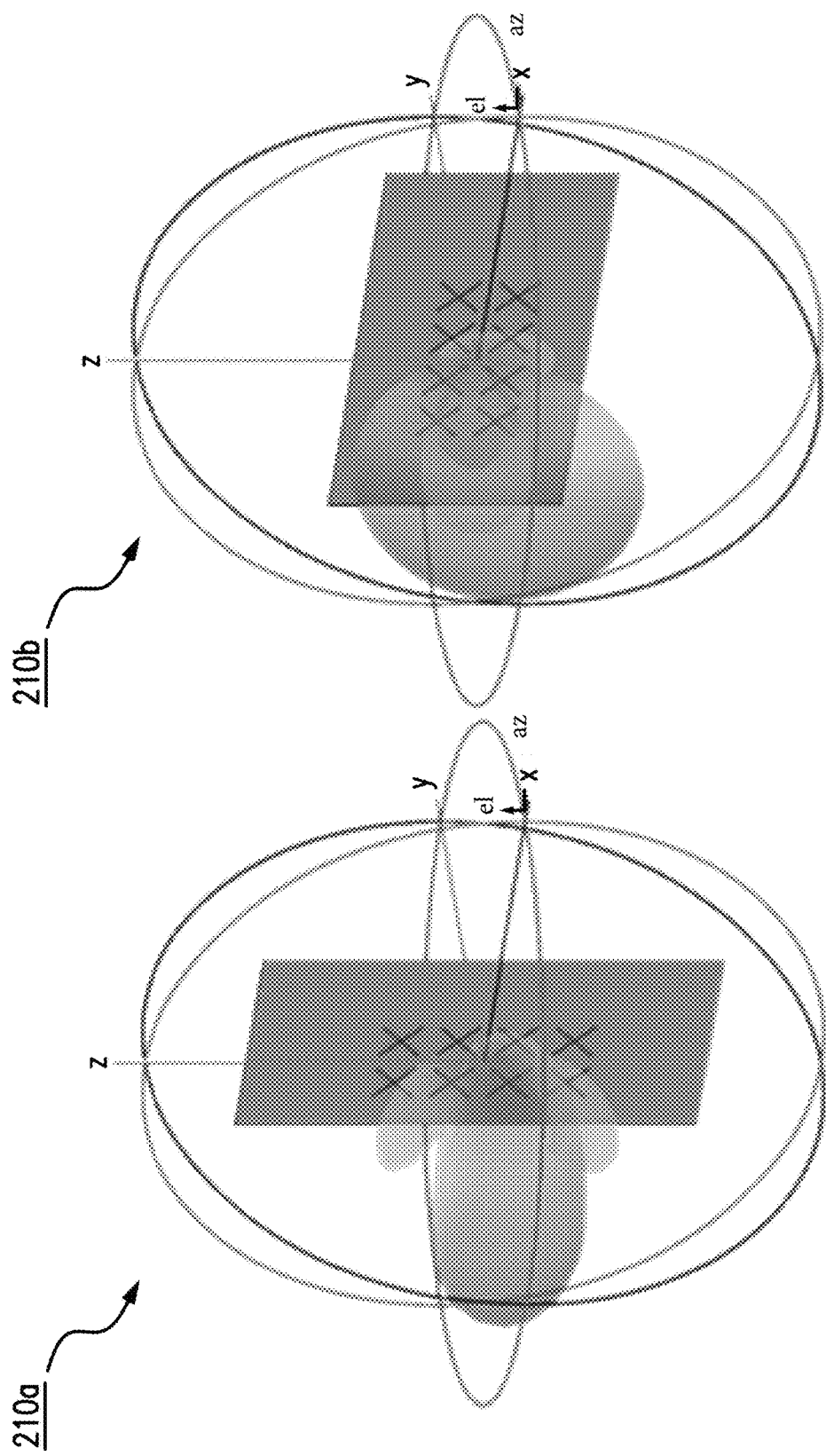
FIG. 2J depicts example radiation patterns of an antenna with two columns of radiating elements and an antenna with two rows of radiating elements in accordance with various aspects described herein.

In certain instances, an antenna may include multiple columns or rows of radiating elements, where each of the radiating elements may be connected to a respective transceiver. In such instances, longitudinal or azimuth beamforming scenarios may depend on the phase and amplitude of the signal at the input of the antenna. FIG. 2J depicts example radiation patterns 210a and 210b of an antenna with two columns of radiating elements and an antenna with two rows of radiating elements, respectively, in accordance with various aspects described herein. In some embodiments, one or more of the antennas shown in FIG. 2J may be the same as, may be similar to, or may otherwise correspond to the antenna 201 of FIG. 2A.

Beamforming enables the creation of sophisticated radiation patterns with increased signal strength or sensitivity in a certain direction and/or reduced interference to and from another direction. The quantity of radiating elements in the beamforming array may affect the complexity of the beamforming patterns. For example, an antenna array consisting of eight elements may allow for a higher degree of pattern shaping as compared to a four-element array.

Figure 2K:
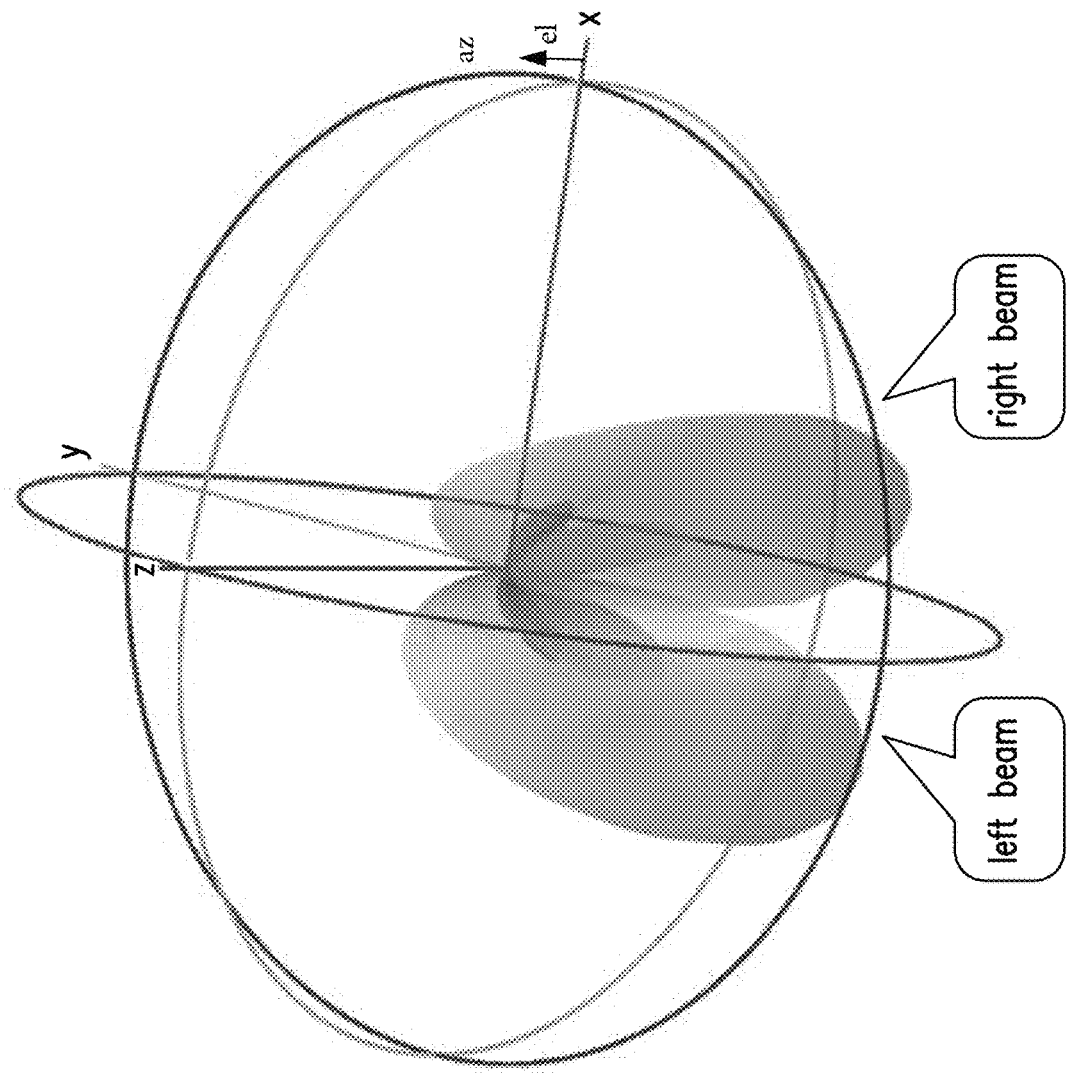
FIG. 2K depicts an example fixed twin beam pattern in accordance with various aspects described herein.

Different amplitude and phase values may result in beamforming. In various embodiments, a matrix network can create fixed beam forming. In certain embodiments, the antenna 201 of FIG. 2A, for example, may include one or more fixed twin beam antennas. A fixed beam antenna can provide pre-set alignment of the main beams while providing optimal overlap, which has multiple applications in cell splitting. FIG. 2K depicts an example fixed twin beam radiation pattern 211 in accordance with various aspects described herein. Implementation of antenna configurations in which multiple (e.g., twin) beams or the like are provided/utilized are described herein. The antenna configurations of FIGS. 2D and 2F, for example, may enable port monitoring and beam switching to selectively identify/capture "clean" and/or interference/PIM signals.

For an M-element equally-spaced linear array that uses variable amplitude element excitations and phase scanning, the array factor can be represented by:

$$AF(\Phi) = \sum_{m=0}^{M-1} A_m \, e^{jm\left(\frac{\omega d \cos(\phi_m)+\delta}{c}\right)}, \quad \text{(EQ 11)}$$

where $$\delta = \frac{\omega}{c} d \cos(\varphi_o), \, \omega = 2\pi f,$$

f is the frequency, and d is the spacing between the radiating elements.

In exemplary embodiments, one or more properties of certain radiating elements of an antenna may be configured or adapted to effect polarization adjusting and/or phase shifting/delaying, and thereby achieve interference/PIM mitigation or cancellation. In one or more embodiments, different shapes, dimensions, electrical/magnetic properties, or a combination thereof may be selected or defined for radiating elements of a first column of radiating elements of an antenna relative to radiating elements of a second column of radiating elements of the antenna. By virtue of the difference in properties between the first and second columns of radiating elements, the amount of interference/PIM that is received, or whether interference/PIM is received at all, may be selectively controlled. Take, for example, an 8-radiating element antenna. Designing or adapting half (4) of the 8 radiating elements in one configuration and the other four in a different configuration can provide a degree of freedom for optimizing (or improving) near-field and intermediate-field regions. In other words, with 4 radiating elements of each kind, the far field may "appear" similar to a case where all 8 radiating elements are identical, but the near-field and intermediate-field regions of the "mix" of 4 radiating elements of one configuration and 4 radiating elements of another configuration may "appear" differently, thereby enabling mitigation/cancellation of interference/PIM in the near-field and/or intermediate-field regions without impacting the far field. Processing requirements may include the need to update amplitude and phase beam weight values (e.g., on the order of 1 millisecond (ms)). Additionally, complex algorithms (which may be implemented in the radio, a baseband processing unit, and/or a third-party device) may be utilized to support pattern synthesis.

In various embodiments, the interference/PIM cancellation block may be configured to cause one or more properties, such as a structure, of one or more radiating elements to be changed or altered, in any suitable manner. In exemplary embodiments, for example, one or more motor assemblies may be communicatively coupled to radiating element(s) (or one or more structural portions thereof) and/or other structural component(s), and configured to control motion of such radiating element(s) and/or structural portion(s)/component(s) such that an overall structure of the radiating element(s) or each of the radiating element(s) is altered. In some embodiments, each column of radiating element(s) and/or associated structural portion(s)/component(s) may be (e.g., independently) controllable by a respective motor assembly.

Therefore, in a general case, having radiating elements in a first column of an antenna with structures/properties that are different from the structures/properties of radiating elements in a second column of the antenna, can provide signal phase manipulation, enabling generation of different (e.g., left/right) radiation patterns, such as two or more lobes.

For an M-element not equally spaced linear array that uses variable amplitude element excitations and phase scanning, the array factor can be represented by:

$$AF(\Phi) = \sum_{m=0}^{M-1} A_m \, e^{jm\left(\frac{\omega d \cos(\phi_m)+\delta}{c}\right)}. \quad \text{(EQ 12)}$$

Here, in exemplary embodiments, each radiating element may be made to be slightly different (e.g., in structure or other property) from its neighboring radiating element and/or the radiating elements may be arranged in an interleaved 2 equally spaced array pattern or other suitable pattern, such that different or desired near-field properties are obtained. Optimizing the configuration of radiating elements in this way can enable PIM reduction without impacting the far field.

In various embodiments, beamforming by phase shifting can be achieved using ferrite phase shifters at RF or intermediate frequency (IF). In certain embodiments, phase shifting can be additionally, or alternatively, implemented via digital signal processing at baseband.

In this way, whether antenna embodiments described herein passively or actively (e.g., based on feedback from an integrated or external device, such as the interference/PIM detection control device 203d of FIG. 2C, the interference/PIM detection control device 204d of FIG. 2E, or other detection device(s)) treat legitimate signals (e.g., free, or near-free, of interference/PIM) differently from non-legitimate signals, interference/PIM can be reduced or cancelled (e.g., via selective signal/antenna extraction/usage, such as via selection of radiating elements of the antenna).

In some embodiments, altering of one or more properties of monitoring element(s), such as the monitoring elements 203m of FIG. 2C, may also be effected in order to adjust interference/PIM detection parameters of those elements.

The Antenna Interface Standards Group (AISG) defines and maintains standards for controlling/monitoring the interface between a base station and various equipment at a tower top, such as antennas with remote electrical tilt, amplifiers, RRHs, etc. Various versions of base communication standards have been released, including version 3 (AISG v3.0). AISG v3.0 provides for device control ports connectable to different base station controllers, as well as controller mapping of RF system interconnections of devices connected to a central bus. AISG v3.0 specifies the interface between a base station and antenna line devices (ALDs), which may be manageable units (e.g., subunits, such as remote electrical tilt, top-mounted amplifiers, antenna sensors, etc.) associated with base station antenna systems, and describes the common behavior of ALDs with AISG interfaces. An ALD may have one or more AISG interfaces controllable by a base station.

In exemplary embodiments, the AISG interface can be leveraged to facilitate overall control of interference monitoring/detection, and/or polarization adjusting and/or phase shifting/delaying (such as via physical movement/alteration of radiating elements (or structural portions) thereof and/or via electronic-based adjustments). An AISG interface may be included in an antenna (e.g., antenna 201b or the like, as shown in FIG. 2E by reference numeral 205i; although AISG interface(s) may be included in other antenna embodiments, such as the antenna 201 of FIG. 2A, the antenna 201a of FIG. 2C, the antenna 201c of FIG. 2F, etc.), and may be communicatively coupled to an interference/PIM cancellation block (e.g., the interference/PIM cancellation block 204c or the like) and/or an interference/PIM detection control device (e.g., the interference/PIM detection control device 204d or the like). The AISG interface may be incorporated in an antenna in any suitable manner—e.g., the AISG interface may be implemented in an interference/PIM cancellation block; the AISG interface may be separate from, but integrated with, an interference/PIM cancellation block; the AISG interface may include an interference/PIM cancellation block; or the like. In exemplary embodiments, the AISG interface may be controllable (e.g., by the interference/PIM cancellation block) to cause the physical movements (e.g., rotation, shifting, etc.) of radiating elements and/or changes or alterations to properties/structures of radiating elements described herein. In some embodiments, for example, the AISG interface may be coupled to one or more motors or the like for effecting such movements/alterations, and may provide appropriate signal(s) thereto based on data/commands from the interference/PIM cancellation block. In this way, one or more standard interfaces, such as AISG interface(s), can be employed to facilitate polarization adjusting and/or phase shifting/delaying to mitigate/cancel interference/PIM in a communication system.

Smart antenna system technology relates to intelligent antennas, phased arrays, Spatial Division Multi Access (SDMA), spatial processing, digital beamforming, adaptive antenna systems, and others. Smart antenna systems are customarily categorized as either switched beam with a finite number of fixed, predefined patterns or combining strategies (sectors) or as adaptive arrays with an infinite number of patterns (scenario-based) that are adjusted in real-time. The dual purpose of a smart antenna system is to augment the signal quality of the radio-based system through more focused transmission of radio signals, while enhancing capacity through increased frequency reuse. In exemplary embodiments, the newly-identified intermediate-field region can be leveraged to optimize (or improve) antenna performance.

Active Antenna Systems (AAS) use flexible cell splits (e.g., vertical or horizontal) and/or beamforming to provide increased system flexibility and performance. An AAS base station uses multiple transceivers on an antenna array to produce a radiation pattern that can be dynamically adjusted. Spatial selectivity in both the transmit and receive directions is important. For example, compared to fixed beam antennas, an AAS may experience different spatial selectivity since it does not achieve full spatial selectivity until after digital baseband processing of the multiple elements in the array.

With recent advances in active antenna technology, it is possible to deploy base stations with a large number of antenna elements to enhance cell capacity and coverage. Antenna elements can be deployed in two-dimensional (2D) arrays, providing horizontal (azimuth) as well as vertical beamforming. In urban environments, with high rise buildings, this can improve indoor coverage and increase capacity. Wireless networks with base stations having a large number of antenna elements are known as massive MIMO, or Elevation Beamforming/Full Dimension (EB/FD) MIMO systems. Beamforming can rely on some or all of the techniques described herein to further optimize (or improve) performance.

For a 2D array of M by N elements not equally spaced and that uses variable amplitude element excitations and phase scanning, the array factor can be represented by:

$$AF(\Phi) = \sum_{m=0}^{M-1} \sum_{n=0}^{N-1} A_{mn}\, e^{jm\left(\frac{\omega\, \hat{r}\cdot\bar{r}_{mn} + \delta_{mn}}{c}\right)}, \quad (EQ\ 13)$$

where $\hat{r}\cdot\bar{r}_{mn}$=d sin(θ) cos(φ)+d sin(ω) sin(φ)+d cos(θ).

Figure 2L:
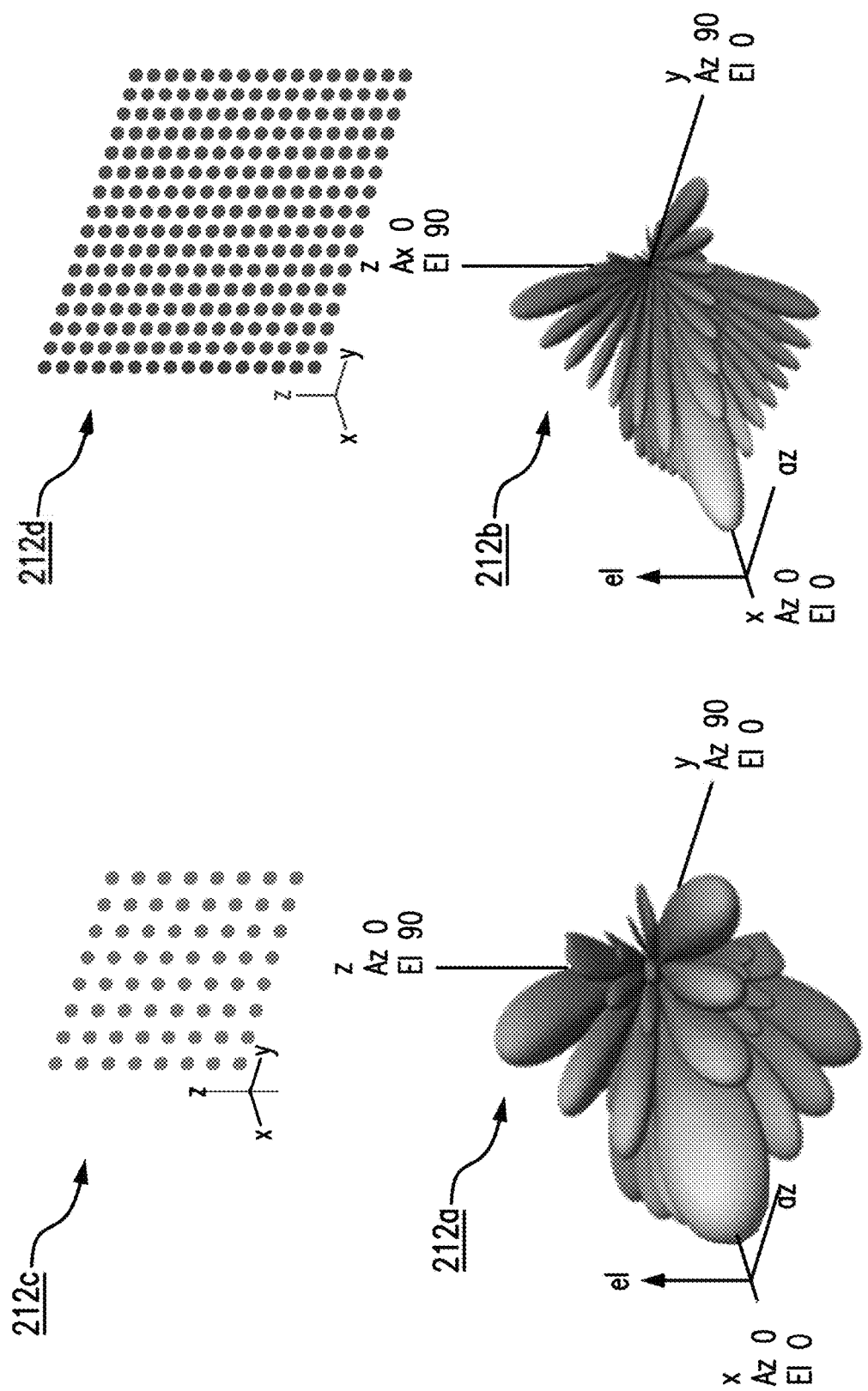
FIG. 2L depicts an example radiation pattern of a first antenna array and an example radiation pattern of a second antenna array in accordance with various aspects described herein.

FIG. 2L depicts an example radiation pattern 212a of a first antenna array 212c (i.e., an 8×8 array) and an example radiation pattern 212b of a second antenna array 212d (e.g., a 16×16 array) in accordance with various aspects described herein. In various embodiments, one or more of the antenna arrays 212c and 212d may correspond to the antenna 201 of FIG. 2A.

Examples of fixed beam techniques include butler matrix, Blass matrix and Wullenweber array. Adaptive beam forming methods include the block adaptive method and the sample-by-sample method. Block implementation of the adaptive beamformer uses a block of data to estimate the adaptive beamforming weight vector, and is known as sample matrix inversion (SMI). The sample-by-sample method updates the adaptive beamforming weight vector with each sample. Sample-by-sample methods include the least mean square (LMS) algorithm, the constant modulus algorithm (CMA), the least square CMA, and the recursive least square (RLS) algorithm. In various embodiments, some or all of these methods/algorithms may be adapted and utilized. For example, some or all of these methods/algorithms may be modified to account for variations in antenna array elements.

FD-MIMO systems are distinct from the MIMO systems of LTE and LTE-Advanced standards in that a large number of antennas is employed at the eNodeB (eNB). As the number of eNB antennas M by N increases, cross-correlation of two random channel realizations becomes zero such that inter-user interference in the downlink can be controlled via a simple linear precoder. Such a benefit can be realized, however, only when perfect channel state information (CSI) is available at the eNB. While CSI acquisition in TDD systems is relatively simple due to the channel reciprocity, such is not the case for FDD systems, where the time variation and frequency response of the channel are measured via downlink reference signals (RS) and returned to the eNB after the quantization. Identifying potential issues of CSI acquisition and developing the proper solutions are, therefore, important for successful commercialization of FD-MIMO systems. Interference/PIM minimization or cancellation, as described herein, can have a direct impact thereto that be exploited using non-symmetrical elements.

FD-MIMO systems also employ active antennas with 2D planar arrays. In active antenna-based systems, gain and phase are controlled by the active components, such as a power amplifier (PA) and a low noise amplifier (LNA) attached to each antenna element. In a 2D-structured antenna array, the radio wave can be controlled on both the vertical (elevation) and horizontal (azimuth) directions such that control of the transmit beam in three-dimensional (3D) space is possible. This type of wave control mechanism is also referred to as 3D beamforming. 2D AAS can accommodate a large number of antennas without increasing deployment space.

In smart antenna beamforming, when 64 linear antenna arrays, for example, are deployed in a horizontal direction, under the assumption that the antenna spacing is half of the wavelength ($\lambda/2$) and the system is using an LTE carrier frequency (e.g., 2 GHz), horizontal spacing of 3 m may be required. Due to the limited space on a rooftop or mast, such a spacing requirement might be burdensome for most cell sites. In contrast, when antennas are arranged in a square array, relatively small spacing is needed for a 2D antenna array (e.g., 1.0 m×0.5 m with a dual-polarized 8×8 antenna array). Embodiments for interference/PIM minimization or cancellation, described herein, can enable further reductions in the sizes of such arrays.

Smart antenna systems (which can leverage the SDMA method) employ adaptive algorithm(s) that enable signal extraction. While an antenna by itself is capable of converting electrical signals into electromagnetic waves or vice versa, the adaptive algorithm(s) provide the intelligence of a smart antenna system. An adaptive algorithm can be designed to account for challenges that prevent an antenna from combining bands. Embodiments for interference/PIM minimization or cancellation, described herein, can enable further enhancements to adaptive algorithm(s).

In exemplary embodiments, an interference/PIM cancellation system may be configured to effect polarization adjusting and/or phase shifting/delaying by performing processing (e.g., mathematically) on (or adjustments to) signals associated with (e.g., to be transmitted by) various radiating elements, based on detected interference/PIM. In various embodiments, methods employed by a MIMO 2D array antenna for beamforming and nulling (of interference at certain points in space), for example, can be modified or otherwise replaced with advanced algorithm(s) configured to effect rotation of certain group(s) of radiating elements of the antenna. Whereas embodiments described above with respect to FIGS. 2D and 2E involve physical rotation of radiating elements to effect polarization adjusting, here, "electronic" rotation can be employed to create polarization selective nulling patterns. Changing the polarization of certain radiating elements' transmissions and receptions, while maintaining orthogonality, can reduce/eliminate interference/PIM (e.g., in the near-field or intermediate-field regions), with minimal to no effect to downlink signal patterns at user equipment (UEs) (e.g., in the far field). In various embodiments, the polarization of signals to be transmitted and the polarization of received signals may be different from one another.

Figure 2M:
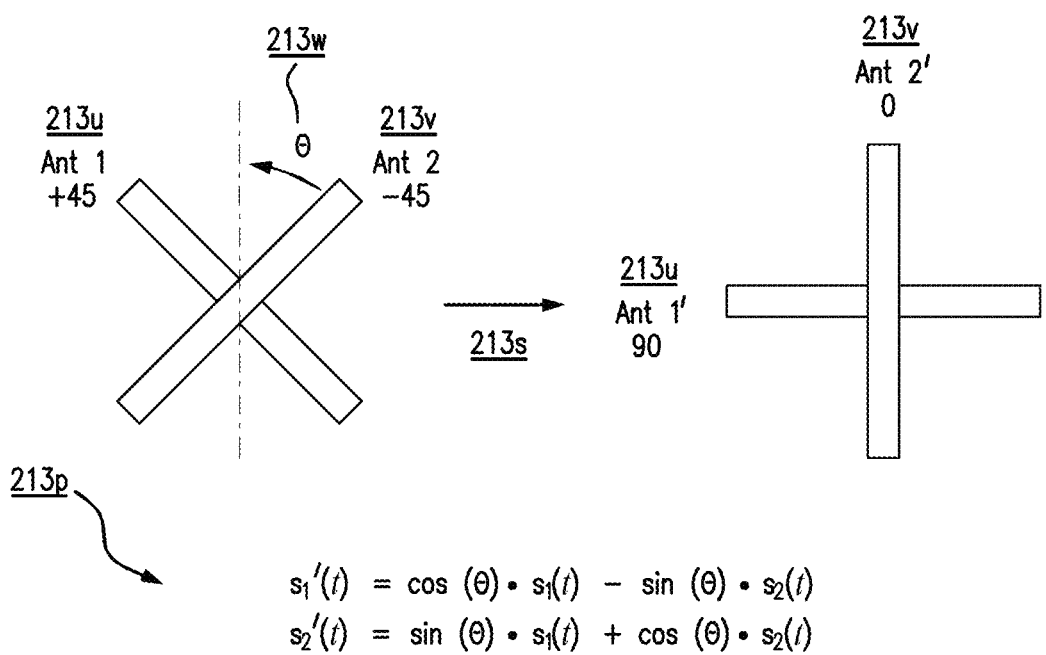
FIG. 2M is a block diagram illustrating an example, non-limiting embodiment of polarization adjusting and associated equations in accordance with various aspects described herein.

FIG. 2M is a block diagram illustrating an example, non-limiting embodiment 213 of polarization adjusting and associated equations in accordance with various aspects described herein. As shown in FIG. 2M, the polarization of signals transmitted by an orthogonally-polarized pair of elements, such as a crossed-dipole antenna 213u, 213v, may be changed. Here, suppose signals $s_1(t)$ and $s_2(t)$ are transmitted by the +45 degree dipole 213u and the −45 degree dipole 213v, respectively—that is, where signal $s_1(t)$ may be transmitted with a +45 degree polarization and signal $s_2(t)$ may be transmitted with a −45 degree polarization. In a case where (e.g., based on a desire to mitigate or cancel interference/PIM, such as likely PIM combinations) there is a need to "rotate" or modify the polarization of the signal $s_1(t)$ to 90 degrees (e.g., horizontal) and the polarization of the signal $s_2(t)$ to 0 degrees (e.g., vertical), equations 213p can be applied to derive new signals $s_1'(t)$ and $s_2'(t)$. As shown, the new signals can be computed by mixing (e.g., gain mixing) the original signals $s_1(t)$ and $s_2(t)$, which is equivalent to a "rotation" of the crossed-dipole antenna by an angle 213w (here, for example, 45 degrees in the counter-clockwise direction). In this way, when signals $s_1'(t)$ and $s_2'(t)$ are transmitted from the +45 dipole and the −45 dipole, it is equivalent to transmitting $s_1(t)$ and $s_2(t)$ from dipoles oriented at 90 degrees and 0 degrees. Selection of certain polarizations and/or radiation patterns can be viewed as a projection of signals in different axes.

It is to be appreciated and understood that the weights in polarization adjusting are real values (rather than complex values), and operate by "mathematically" rotating receive antenna dipoles to match the polarization of a desired signal. It is also to be appreciated that selection of radiating elements (e.g., which columns of radiating elements) for which polarization adjusting is to be applied may be based on the level(s)/characteristic(s) of determined PIM combination(s) that need to be addressed. Additionally, polarization adjusting can be effected for transmit only, for receive only, or for both transmit and receive. In cases where polarization adjusting is effected for both transmit and receive, in one or more embodiments, the polarizations selected for the transmit and the receive may be the same, similar, or different and/or the polarization adjusting may be performed in the same manner, in a similar manner, or differently for the transmit and the receive. In one or more embodiments, a radio, such as an RRH or RRU (which may have individual access to each radiating element of the antenna), may be configured to perform the electronic/mathematic rotation. For example, a MIMO 2D array antenna may be integrated with the radio. In some respects, this may be advantageous over implementations where a radio is not integrated with the antenna(s), such as where one vendor supplies the radio and a different vendor supplies the antenna(s), which may be the case in some or all of the systems described above with respect to FIGS. 2D, 2E, and 2F, and which may require a concerted effort between the vendors to arrive at the desired technical implementation.

It is further to be appreciated and understood that, since beamforming scanning generally occurs in the azimuth plane and beam narrowing generally occurs in the elevation plane, algorithms that rely on the near field and the intermediate-field may result in tighter relations between azimuth and elevation antenna performance.

In various embodiments, the interference/PIM cancellation system may additionally, or alternatively, include, or be implemented, in one or more RF devices (e.g., RF circuits or the like) configured to perform polarization adjusting and/or phase shifting/delaying by altering/combining, in the RF domain, phase(s) and/or amplitudes of signals to be transmitted and/or signals that are received. The polarization adjusting and/or phase shifting/delaying can be based on the level(s)/characteristic(s) of determined PIM combination(s) that need to be addressed.

Figure 2N:
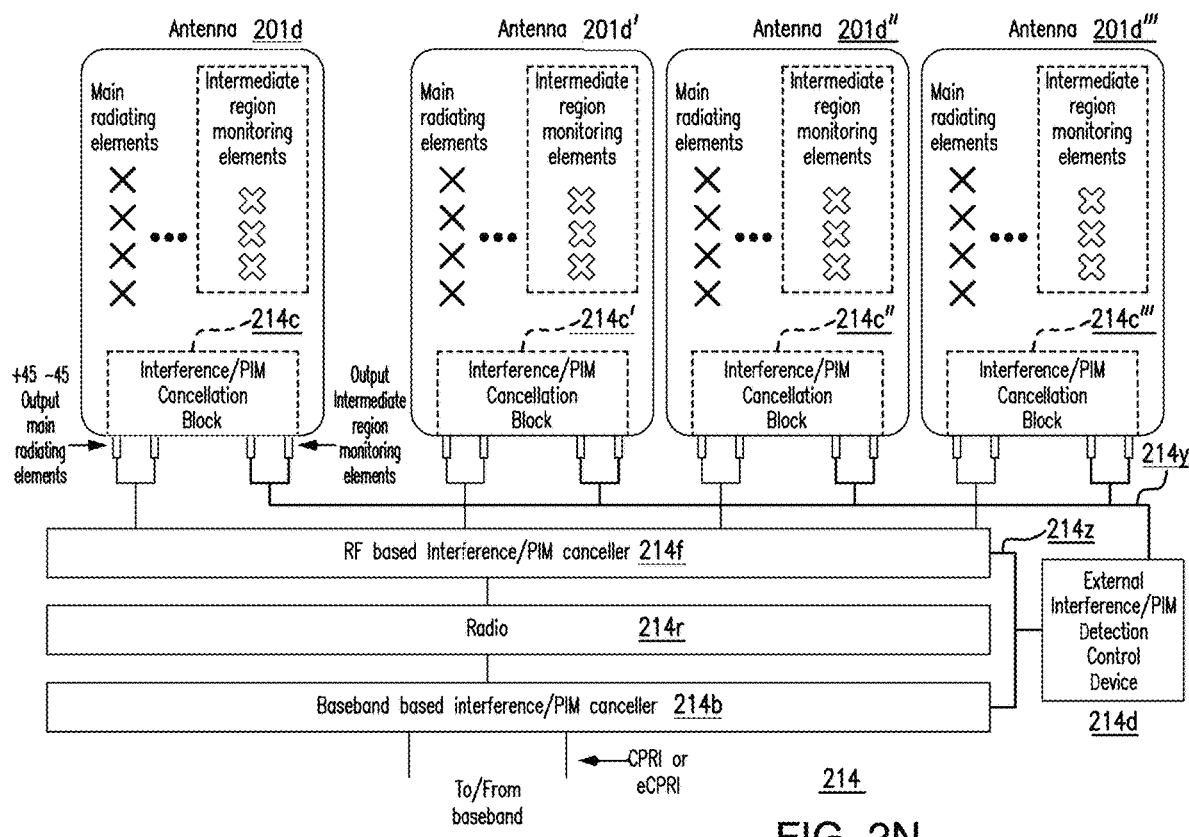
FIG. 2N is a block diagram illustrating an example, non-limiting embodiment of a communications system having multiple antennas each with monitoring port(s) for interference/PIM detection, where the system functions within, or is operatively overlaid upon, the communications network of FIG. 1A and/or the communications system of FIG. 1B in accordance with various aspects described herein.

FIG. 2N is a block diagram illustrating an example, non-limiting embodiment of a communications system 214, in which multiple antennas 201*d*, 201*d'*, 201*d''*, and 201*d'''* (each with monitoring port(s) for interference/PIM detection) are deployed, functioning within, or operatively overlaid upon, the communications network 100 of FIG. 1A and/or the communications system 180 of FIG. 1B in accordance with various aspects described herein. In one or more embodiments, the multiple antennas 201*d*, 201*d'*, 201*d''*, and 201*d'''* (e.g., as a combination) may correspond to the antenna 201 of FIG. 2A. In various embodiments, one or more of the antennas 201*d*, 201*d'*, 201*d''*, and 201*d'''* may be similar to one or more of the antenna 201*a* of FIG. 2C and the antenna 201*b* of FIG. 2E. For example, in certain embodiments, one or more of the antennas 201*d*, 201*d'*, 201*d''*, and 201*d'''* may include multiple columns of (e.g., main) radiating elements and (e.g., optionally) one or more columns of monitoring antenna elements (e.g., similar to the monitoring elements 203*m* of FIG. 2C).

As shown in FIG. 2N, the communications system 214 may include a radio 214*r* (e.g., a remote radio head or unit), an interference/PIM detection control device 214*d*, a baseband-based interference/PIM canceller 214*b*, and an RF-based interference/PIM canceller 214*f*. As depicted, one or more of the antennas 201*d*, 201*d'*, 201*d''*, and 201*d'''* may include a first set of output(s) communicatively coupled to the radio 214*r* via the RF-based interference/PIM canceller 214*f*, and a second set of output(s) interconnected with one another and communicatively coupled to the interference/PIM detection control device 214*d*. Here, for example, the antennas 201*d*, 201*d'*, 201*d''*, and 201*d'''* may be configured to "share" a PIM detection module.

Exemplary embodiments of the communications system 214 may operate in multiple bands (e.g., two or more frequency bands). In various embodiments, signals in a certain frequency (or range of frequencies) may be transmitted in certain polarization(s) and other signals in another frequency (or range of frequencies) may be transmitted in different polarization(s), where the signals at different frequencies may interact (or mix) with one another when various techniques described herein are implemented. This can involve, for example, polarization adjusting and/or phase shifting/delaying, where one or more component(s) of the antennas 201*d*, 201*d'*, 201*d''*, and 201*d'''*, such as radiating elements, structural portions of radiating elements (e.g., feed port(s), ground plane(s), and/or the like), etc. are adjusted and/or signals associated with radiating elements are manipulated/processed. For instance, adjustment(s) can be performed via physical/electronic rotation/shifting of the radiating elements (or signals associated therewith) in certain columns of one or more of the antennas 201*d*, 201*d'*, 201*d''*, and 201*d'''* and/or between antennas that operate/react together, resulting in interference/PIM being picked up by some radiating elements of the communications system 214 and not by other radiating elements of the communications system 214. Polarization adjusting and/or phase shifting/delaying can be generally applied or can be applied for the particular frequencies (or ranges of frequencies) that interact with one another. In various embodiments, the interference/PIM detection control device 214*d* may detect interference/PIM (e.g., received by the radiating elements and/or by any monitoring elements included in the antennas) over lines 214*y*, and may provide data/controls via lines 214*z* to the RF-based interference/PIM canceller 214*f* and/or the baseband-based interference/PIM canceller 214*b* to enable such polarization adjusting and/or phase shifting/delaying by the RF-based interference/PIM canceller 214*f* and/or the baseband-based interference/PIM canceller 214*b*. For example, the RF-based interference/PIM canceller 214*f* and/or the baseband-based interference/PIM canceller 214*b* may provide feedback that effects polarization adjusting and/or phase shifting/delaying for select radiating elements of select antennas—e.g., for the uplink and/or the downlink. In certain embodiments, the feedback (which may, for example, be based on, or include, information from collected near-field, intermediate-field, and/or far field energy) may cause radiating elements/antennas to be remotely tilted (e.g., down or up) and/or emit beams in certain directions, such as the azimuth direction, etc. In one or more embodiments, one or more of the antennas 201*d*, 201*d'*, 201*d''*, and 201*d'''* may be configured to adjust signal transmission and reception based on instructions/communications with cancellation systems/devices included in, or associated with, the radio 214*r*, the baseband processing unit, as well as other system(s) positioned on a CPRI link, an eCPRI link, and/or the like.

In various embodiments, and as shown in FIG. 2N, some or all of the antennas 201*d*, 201*d'*, 201*d''*, and 201*d'''* may (e.g., optionally) include an interference/PIM cancellation block (e.g., interference/PIM cancellation blocks 214*c*, 214*c'*, 214*c''*, and 214*c'''*) integrated therein and configured to provide mitigation or cancellation of undesired interference/PIM signals. In some of these embodiments, the interference/PIM detection control device 214*d* may provide data/controls to one of more of these interference/PIM cancellation blocks (e.g., similar to that described above with respect to FIG. 2C) to facilitate activation of certain interference/PIM mitigation/cancellation measures (e.g., polarization adjusting and/or phase shifting/delaying via electronic/RF processing of signals associated with radiating elements, controlling of physical movements of radiating elements and/or structural portions thereof, such as by physically rotating radiating elements, shifting radiating elements, etc., as described herein). In one or more embodiments, an interference/PIM cancellation block may include some or all of the functionalities of the RF-based interference/PIM canceller 214*f* and/or the baseband-based interference/PIM canceller 214*b*, in which case one or more of the RF-based interference/PIM canceller 214*f* and/or the baseband-based interference/PIM canceller 214*b* may or may not be included or needed. In certain embodiments, an interference/PIM cancellation block may include some or all of the functionalities of the interference/PIM detection control device 214*d*, in which case the interference/PIM detection control device 214*d* may or may not be included or needed. In some embodiments, the interference/PIM detection control device 214*d* may be integrated in the baseband unit, the radio 214*r*, and/or one or more of the antennas 201*d*, 201*d'*, 201*d''*, and 201*d'''*.

In this way, even in multi-antenna communications systems (where pre-coding is used to map modulation symbols onto the different antennas to achieve the best possible data reception at the receiver, and where the type of pre-coding may depend on the multi-antenna technique employed as well as on the numbers of layers/antenna ports), various embodiments described herein relating to polarization adjusting and/or phase shifting/delaying can be applied to improve overall system performance and coverage.

Certain implementations are provided herein using Coordinated Multi-Point (CoMP) transmission/reception. This method is considered by 3GPP as a tool to improve coverage, cell-edge throughput, and/or spectral efficiency. Depending on the location of a UE, the UE may be able to receive signals from multiple cell sites and the UE's transmissions may be received at multiple cell sites regardless of the system load. If the transmissions from the multiple cell sites are coordinated for the downlink, the performance can be significantly increased. This coordination can be simple, as in the techniques that focus on interference or PIM avoidance, or more complex, as in the case where the same data is transmitted from multiple cell sites. In exemplary embodiments, for the uplink, various polarization adjusting-based and/or phase shifting/delaying-based interference/PIM cancellation techniques described herein (e.g., with an emphasis on the near field and the intermediate field) can be employed to take advantage of reception at multiple cell sites so as to significantly improve the link performance.

Certain implementations enhance the requirement reference points at which core RF requirements are specified based on the 3GPP. The two main approaches used today include defining the requirements at the boundary of the transceiver and defining the requirements at the far field of the antenna. Exemplary embodiments enable incorporation of additional requirements at the intermediate field and the near field of the antenna as well. Downlink MIMO Rel-12 features two CSI enhancements: 4Tx Precoding Matrix Index (PMI) feedback codebook enhancement and aperiodic feedback Physical Uplink Shared Channel (PUSCH) mode 3-2. The CSI enhancements enable the eNB to complete delivery of data packets earlier than with legacy CSI feedback, thus improving spectral efficiency. The Rel-12 4Tx codebook enhancement mainly targets cross-polarized antennas and, thus, reuse of the 8Tx dual codebook structure. In addition to the enhanced codebook, a new aperiodic CSI feedback PUSCH mode 3-2 is introduced in Rel-12 with increased CSI accuracy, since it provides both sub-band Channel Quality Indication (CQI) and sub-band performance management (PM). The addition of PIM and interference parameters (e.g., relating to various embodiments described herein, such as those that implement polarization adjusting and/or phase shifting/delaying) can further enhance the codebook.

Dynamic spectrum sharing (DSS) is a technique where LTE spectrum allocation is dynamically shared between 5G and LTE users. Depending on the load and traffic demand from both technologies, the base station dynamically changes the spectrum allocation to use more of the spectrum for 5G or LTE. As a result, the split between LTE and 5G New Radio (NR) in the spectrum changes over time. DSS is especially appealing to operators given that its rollout is possible through a software upgrade on existing base station hardware. The 3GPP only provides guidance on how to configure systems to enable efficient spectrum sharing for standalone (SA) and non-standalone (NSA) deployments. In exemplary embodiments, antenna(s) can be controlled to optimize for both 4G/LTE and 5G services by reducing PIM and interference generated from the 4G/LTE and 5G requirements so as to enable smooth/seamless DSS operation.

Figure 2P:
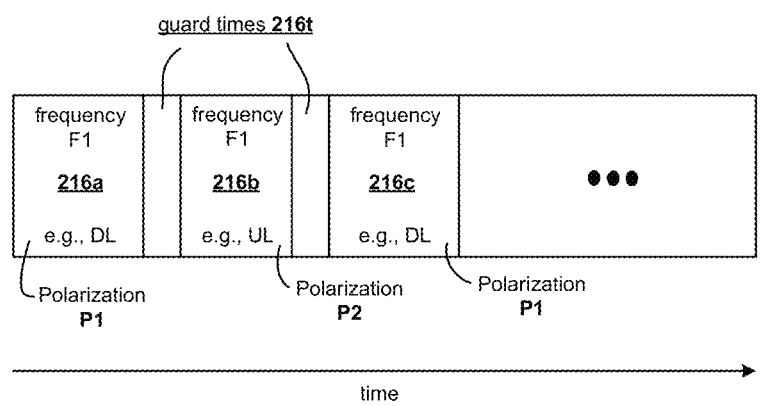
FIG. 2P is a block diagram illustrating an example time frame in a time-division duplexing (TDD) communications system in accordance with various aspects described herein.

In TDD, time, rather than frequency, is used to separate the transmission and reception of signals, and thus a single frequency is assigned to a UE for both the uplink and the downlink. In TDD, two time slots-one for the uplink and one for the downlink may be assigned to each UE, with a short data burst in each direction. FIG. 2P is a block diagram illustrating an example time frame 216 in a TDD communications system in accordance with various aspects described herein. In various embodiments, one or more of the antennas described herein (e.g., the antenna 201 of FIG. 2A, the antenna 201a of FIG. 2C, the antenna 201b of FIG. 2E, etc.) can be employed in the TDD communications system and operated in a frequency F1. As depicted in FIG. 2P, the TDD time frame 216 may include a time slot 216a for downlink operations, a time slot 216b for uplink operations, a time slot 216c for downlink operations, and so on. A guard time/band 216t between transmit and receive streams may generally be needed in TDD. Time split between the forward and reverse channels is sufficiently small that the transmission and reception appear to be simultaneous and continuous to users. The guard time in TDD is intended as a time allowance for round-trip propagation delay. This time interval may need to be sufficiently long in order to prevent the transmit and receive signals from clashing. TDD is thus generally employed where the distance between the transmitter and receiver is generally small; otherwise, the channel efficiency may drop and the time guard may need to be rather long.

Since TDD typically permits a higher number of time slots in favor of one direction of transmission over the other (e.g., usually in favor of the downlink), various techniques described herein for polarization adjusting may be applied to the uplink and/or downlink in a TDD communications system in order to reduce or eliminate the guard band. In exemplary embodiments, for example, techniques described above with respect to FIGS. 2C, 2E, 2F, 2M, etc. can be employed in a TDD system (e.g., as an additional way) to separate the downlink and the uplink. Here, the downlink and the uplink may be deployed in different (e.g., orthogonal) polarizations, P1 and P2, respectively. In exemplary embodiments, the polarization of the uplink can be adjusted relative to the polarization of the downlink, or vice versa, such that the uplink polarization P1 and the downlink polarization P2 are different from one another.

For instance, in cases where one or more MIMO antennas that provide parallel transmissions are employed in a TDD system, polarization adjusting may be applied for some or all of the radiating elements utilized during downlink operations such that the polarization thereof is in the polarization P1, and may be similarly applied for some or all of the radiating elements utilized during uplink operations such that the polarization thereof is in the polarization P2. Doing so creates an additional dimension of separation that permits a smaller guard band to be used, which can provide improved network speeds. In extreme cases, guard bands can even be eliminated, where downlink and uplink transmissions may overlap or coexist without interference by virtue of the use of different, orthogonal polarizations P1 and P2.

TDD systems may be deployed in frequency bands that are about 2.5 GHz and higher in order to address guard band delay constraints. However, a TDD system may coexist, or otherwise have overlapping operative ranges, with FDD systems (e.g., in other regions, such as nearby countries) at the same frequency, which can result in direct interference. In other cases, such FDD systems may operate at lower frequencies, but signals from those FDD systems can mix and generate PIM in the TDD band(s), which can negatively impact the uplink in the TDD system. In exemplary embodiments, various techniques described herein for polarization adjusting may be applied to the uplink in a TDD communications system in order to address any direct interference with FDD system signals and/or any PIM generated by mixing of FDD system signals. In exemplary embodiments, techniques described above with regard to processing of signals or adjustment(s) for component(s) of an antenna system (e.g., as described above with respect to FIGS. 2C, 2E, 2M, etc.) can be employed in the TDD system to separate the TDD uplink from FDD system signals. Here, the TDD uplink may be deployed in particular polarization (s) that enable the TDD uplink to avoid receiving signals from the FDD systems and/or any PIM generated by mixing of FDD system signals.

FDD operates the uplink and the downlink in two different frequencies (e.g., frequency $F_a$ in the uplink and $F_b$ in the downlink), which enables simultaneous transmit and receive. Generally, physical duplexers may be employed on both the transmit and receive of an FDD-based antenna system to ensure that residual frequency transmissions in the uplink do not overlap or leak into the downlink, and vice versa. Because massive MIMO involves antennas with numerous radiating elements, it can be challenging to implement massive MIMO in FDD since it would require a large number of duplexers to be employed on both the transmit and receive (e.g., a duplexer on the transmit and a duplexer on the receive for each radiating element of the antenna). As duplexers generally include multiple stages, where frequency separation is a function of the number of stages, incorporation and management of all of these devices for optimal frequency separation can be challenging.

Figure 2Q:
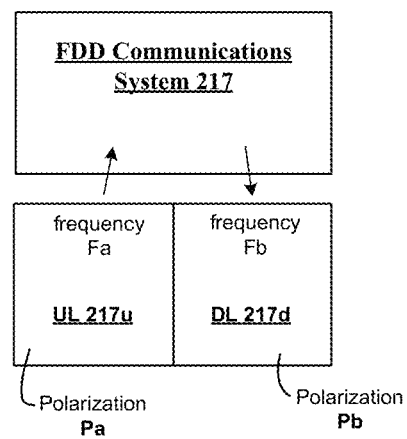
FIG. 2Q is a block diagram illustrating an example frequency-division duplexing (FDD) communications system in accordance with various aspects described herein.

Various techniques described herein for polarization adjusting may be applied to the uplink and/or the downlink in an FDD communications system in order to reduce or eliminate the need for duplexers (e.g., by relaxing or loosening duplexer requirements). FIG. 2Q is a block diagram illustrating an example FDD communications system 217 in accordance with various aspects described herein. In exemplary embodiments, techniques described above with respect to polarization adjusting, such as those involving processing of signals or adjustment(s) for component(s) of an antenna system (e.g., as described above with respect to FIGS. 2C, 2E, 2M, etc.) can be employed in the FDD communications system 217 (e.g., as an additional way) to separate the uplink and downlink frequencies $F_a$ and $F_b$. Here, the uplink and the downlink may be deployed in different (e.g., orthogonal) polarizations, $P_a$ and $P_b$, respectively. Doing so creates an additional dimension of separation that permits the use of fewer or less sophisticated duplexers (e.g., duplexers with fewer stages), since signal gain (in dB) that might otherwise be offered through the use of more duplexer stages can instead be provided via polarization adjusting. This can advantageously enable massive MIMO implementations in FDD. In extreme cases, duplexers can even be eliminated altogether by virtue of the use of different, orthogonal polarizations $P_a$ and $P_b$.

Based on parameters of detected interference/PIM and/or based on condition(s) relating to TDD/FDD communications, there may be optimal or desired directions or polarizations for receiving communications (the uplink) and transmitting communications (the downlink). In various embodiments, polarization adjusting can be effected by performing one or more techniques described herein, such as by physically rotating or electronically rotating one or both elements of an orthogonally-polarized element pair and/or by altering one or more structural properties of an orthogonally-polarized element pair, such that an uplink polarization is different from (e.g., is orthogonal to) a downlink polarization.

In a case where physical rotation is employed, for a given orthogonally-polarized element pair, one element of the orthogonally-polarized element pair may need to be utilized for the uplink and the other element of the orthogonally-polarized element pair may need to be utilized for the downlink. Referring to FIG. 2M merely as an example, dipole element 213u can be operated in the uplink (or, alternatively, the downlink) and dipole element 213v can be operated in the downlink (or, alternatively, the uplink). Here, polarization adjusting can involve causing dipole element 213u to physically rotate by a certain angle in a certain direction, causing dipole element 213v to physically rotate by a certain angle in a certain direction, or both, which can result in the uplink and downlink polarizations being different from one another. Where crossed-dipole radiating element 213u, 213v is included as one of the radiating elements of an antenna, such as, for example, the antenna 201b of FIG. 2E or the like, polarization adjusting via physical rotation can, for one or more columns of radiating elements, be effected such that one or more dipole elements (e.g., each dipole element) in one of the orientations (e.g., the dipole elements oriented in −45 degrees) is rotated by a certain angle in a certain direction, one or more dipole elements (e.g., each dipole element) in another physical orientation (e.g., the dipole elements oriented in +45 degrees) is rotated by a certain angle in a certain direction, or both.

In a case where rotation of radiating elements is applied electronically, for a given orthogonally-polarized element pair, each element of the orthogonally-polarized element pair may be operated in both the uplink and the downlink. Referring to FIG. 2M merely as an example, dipole element 213u can be operated in both the uplink and the downlink, and dipole element 213v can be operated in both the uplink and the downlink. Here, polarization adjusting can involve gain mixing (e.g., similar to that described above with respect to FIG. 2M) that results in the uplink polarization and the downlink polarization for a particular dipole element being different from (e.g., orthogonal to) one another. This can be achieved, for example: by determining and applying/feeding a signal for an uplink of dipole element 213u (e.g., a signal $s_1'(t)$-uplink) based on some angle, such as angle 213w; by determining and applying/feeding a signal for a downlink of dipole element 213u (e.g., a signal $s_1'(t)$-downlink) based on a different angle or a 0 degree angle; by determining and applying/feeding a signal for an uplink of dipole element 213v (e.g., a signal $s_2'(t)$-uplink) based on some angle; by determining and applying/feeding a signal for a downlink of dipole element 213v (e.g., a signal $s_2'(t)$-downlink) based on a different angle or a 0 degree angle; or the like. In other words, any combination of zero and non-zero angles can be applied amongst the uplinks and downlinks for a given orthogonally-polarized element pair to arrive at uplink/downlink polarization differentiation. Where crossed-dipole radiating element 213u, 213v is included as one of the radiating elements of an antenna (e.g., a MIMO antenna), such as, for example, the antenna 201b of FIG. 2E or the like, polarization adjusting via electronic-based rotation can, for one or more columns of radiating elements, be effected in a similar manner such that uplink and downlink polarizations are different.

It is to be appreciated and understood that different configurations can be employed to provide physical rotation and/or electronic rotation of radiating elements and/or altering of one or more structural properties of radiating elements. As an example, in various embodiments, an antenna system may include one port for elements of a set (e.g., a column) of orthogonally-polarized element pairs oriented in a first manner (e.g., dipole elements oriented in −45 degrees), another port for elements of the set (e.g., column) of orthogonally-polarized element pairs oriented in a second manner (e.g., dipole elements oriented in +45 degrees), and similar ports for one or more other columns of orthogonally-polarized element pairs (if any). In this example, polarization adjusting (such as, for example, to achieve different uplink and downlink polarizations) can be effected electronically by determining and applying/feeding a respective signal (including, for example, respective uplink and downlink signals) to each of the ports.

As another example, in various embodiments, an antenna system may include an individual port for each element of an orthogonally-polarized element pair (e.g., 16 ports for 8 orthogonally-polarized element pairs). In this example, polarization adjusting (such as, for example, to achieve different uplink and downlink polarizations) can be effected electronically by determining and applying/feeding a respective signal (including, for example, respective uplink and downlink signals), via a respective port, for each element of the orthogonally-polarized element pairs (e.g., 32 uplink/downlink signals for 16 elements of 8 orthogonally-polarized element pairs).

It is to be appreciated and understood that polarization adjusting via electronic rotation can be effected or controlled by a BBU, a radio, or a system integrated in an antenna. In one or more embodiments, an antenna may include a respective device or circuitry for each orthogonally-polarized element pair or for each element of each orthogonally-polarized element pair. The device or circuitry may include, for example, polarization shifter component(s) or device(s) (e.g., analog polarization rotator(s)) operatively coupled to each orthogonally-polarized element pair or to each element of each orthogonally-polarized element pair. In various embodiments, the respective device or circuitry may obtain signals (e.g., $s_1(t)$, $s_1'(t)$, $s_2(t)$, or the like, etc.) determined or generated by a BBU, a radio, or other system, and may apply/feed such signals to the respective orthogonally-polarized element pairs or to the respective elements of the orthogonally-polarized element pairs. In this way, appropriate angle(s) of rotation (if applicable) can be applied for select orthogonally-polarized element pairs or select elements of orthogonally-polarized element pairs, such that even elements that are physically oriented in the same manner (e.g., physically oriented at −45 degrees) can be selectively electronically polarized at different angles as desired.

In various embodiments, an antenna may include a respective device or circuitry and/or associated motor or set of motors for each orthogonally-polarized element pair or for each element of each orthogonally-polarized element pair, which enables polarization adjusting via physical rotation(s).

In one or more embodiments, one or more AISG interfaces or control lines can be leveraged to provide command(s) relating to polarization adjusting, where the commands can, for example, be embedded in a control port (e.g., operating at a different frequency from signal frequencies) and used by the above-described circuitry or devices to apply/feed appropriate signals to respective orthogonally-polarized element pairs or to respective elements of the orthogonally-polarized element pairs or to cause physical rotation of respective orthogonally-polarized element pairs or respective elements of the orthogonally-polarized element pairs.

As described above with respect to FIG. 2F, phase shifting/delaying can be implemented via physical displacement of radiating element(s). In one or more embodiments, and similar to embodiments relating to physical rotation of radiating elements, an antenna may include a respective device or circuitry and/or associated motor or set of motors for each orthogonally-polarized element pair or for each element of each orthogonally-polarized element pair, which enables polarization adjusting via physical displacement/shifting of radiating elements. It is to be appreciated and understood that phase shifting/delaying can be additionally, or alternatively, effected electronically. For example, in various embodiments, an antenna may include a respective phase shift/delay device or circuitry, for each orthogonally-polarized element pair or for each element of each orthogonally-polarized element pair, that enables introduction of phase delays for signals associated with select elements or element pairs.

In certain embodiments, phase adjusting can be employed in a communications system, such as a TDD or FDD communications system, to arrive at a difference between the uplink and the downlink (e.g., similar to polarization differences provided via polarization adjusting). In these embodiments, phase shifts/delays can be provided electronically or physically in antenna configurations and manner(s) similar to those described above with respect to electronic/physical rotation of orthogonally-polarized element pairs or individual elements of orthogonally-polarized element pairs. As with embodiments involving polarization adjusting via physical rotation, in a case where phase adjusting is implemented via physical displacement of radiating elements, for a given orthogonally-polarized element pair in which a difference between the uplink and the downlink is desired, one element of the orthogonally-polarized element pair may need to be utilized for the uplink and the other element of the orthogonally-polarized element pair may need to be utilized for the downlink. Further, as with embodiments involving polarization adjusting via electronic rotation of radiating elements, in a case where phase adjusting is implemented electronically, for a given an orthogonally-polarized element pair, each element of the orthogonally-polarized element pair may be operated in both the uplink and the downlink.

It is to be appreciated and understood that the quantity and arrangement of communications systems, antennas, UEs, radiating elements, monitoring elements, outputs, radios, interference/PIM cancellation systems, interference/PIM detection control devices, AISG interfaces, motors, RF baseband interference/PIM cancellers, and/or baseband-based interference/PIM cancellers shown in FIGS. 2A, 2C, 2D, 2E, 2F, 2G, 2M, 2N, 2P, and/or 2Q are provided as an example. In practice, there may be additional communications systems, antennas, UEs, radiating elements, monitoring elements, outputs, radios, interference/PIM cancellation systems, interference/PIM detection control devices, AISG interfaces, motors, RF baseband interference/PIM cancellers, and/or baseband-based interference/PIM cancellers than those shown in FIGS. 2A, 2C, 2D, 2E, 2F, 2G, 2M, 2N, 2P, and/or 2Q. For example, various embodiments may include more or fewer communications systems, antennas, UEs, radiating elements, monitoring elements, outputs, radios, interference/PIM cancellation systems, interference/PIM detection control devices, AISG interfaces, motors, RF baseband interference/PIM cancellers, and/or baseband-based interference/PIM cancellers. Furthermore, two or more communications systems, antennas, UEs, radiating elements, monitoring elements, outputs, radios, interference/PIM cancellation systems, interference/PIM detection control devices, AISG interfaces, motors, RF baseband interference/PIM cancellers, or baseband-based interference/PIM cancellers shown in FIGS. 2A, 2C, 2D, 2E, 2F, 2G, 2M, 2N, 2P, and/or 2Q may be implemented within a single communications system, antenna, UE, radiating element, monitoring element, output, radio, interference/PIM cancellation system, interference/PIM detection control device, AISG interface, motor, RF baseband interference/PIM canceller, or baseband-based interference/PIM canceller shown in FIGS. 2A, 2C, 2D, 2E, 2F, 2G, 2M, 2N, 2P, and/or 2Q or a single communications system, antenna, UE, radiating element, monitoring element, output, radio, interference/PIM cancellation system, interference/PIM detection control device, AISG interface, motor, RF baseband interference/PIM canceller, or baseband-based interference/PIM canceller shown in FIGS. 2A, 2C, 2D, 2E, 2F, 2G, 2M, 2N, 2P, and/or 2Q may be implemented as multiple, distributed communications systems, antennas, UEs, radiating elements, monitoring elements, outputs, radios, interference/PIM cancellation systems, interference/PIM detection control devices, AISG interfaces, motors, RF baseband interference/PIM cancellers, or baseband-based interference/PIM cancellers. Additionally, or alternatively, a set of communications systems, antennas, UEs, radiating elements, monitoring elements, outputs, radios, interference/PIM cancellation systems, interference/PIM detection control devices, AISG interfaces, motors, RF baseband interference/PIM cancellers, and/or baseband-based interference/PIM cancellers (e.g., one or more communications systems, antennas, UEs, radiating elements, monitoring elements, outputs, radios, interference/PIM cancellation systems, interference/PIM detection control devices, AISG interfaces, motors, RF baseband interference/PIM cancellers, and/or baseband-based interference/PIM cancellers) may perform one or more functions described as being performed by another set of communications systems, antennas, UEs, radiating elements, monitoring elements, outputs, radios, interference/PIM cancellation systems, interference/PIM detection control devices, AISG interfaces, motors, RF baseband interference/PIM cancellers, and/or baseband-based interference/PIM cancellers.

Figure 2R:
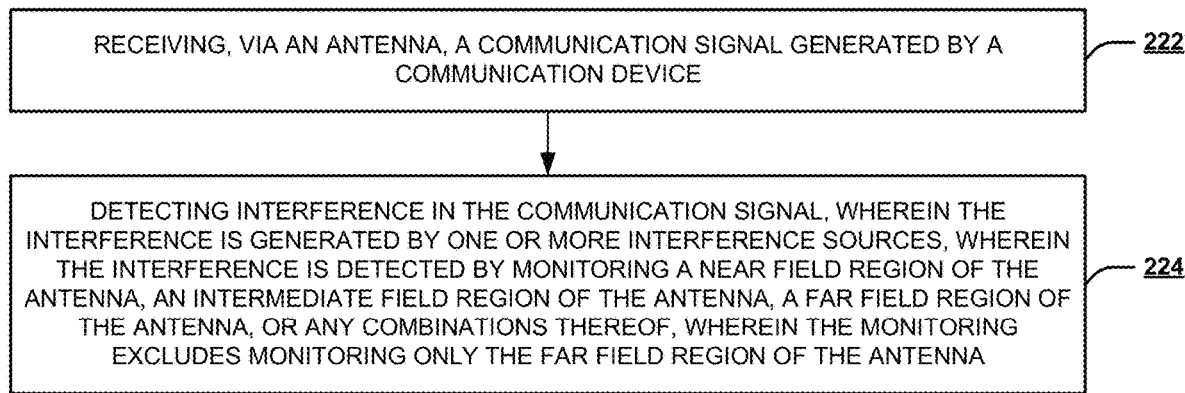
FIGS. 2R-2X each depicts an illustrative embodiment of a method in accordance with various aspects described herein.

FIG. 2R depicts an illustrative embodiment of a method 220 in accordance with various aspects described herein. In some embodiments, one or more process blocks of FIG. 2R can be performed by an interference/PIM cancellation system, such as one or more of the interference/PIM cancellation systems described herein. In certain embodiments, one or more process blocks of FIG. 2R may be performed by another device or a group of devices separate from or including the interference/PIM cancellation system, such as a radio (e.g., an RRH), a baseband unit (BBU), an antenna or antenna system, an interference/PIM detection control device, and/or an AISG interface.

At 222, the method can include receiving, via an antenna, a communication signal generated by a communication device. For example, step 222 can be performed in a manner similar to that described elsewhere herein.

At 224, the method can include detecting interference in the communication signal, wherein the interference is generated by one or more interference sources, wherein the interference is detected by monitoring a near field region of the antenna, an intermediate field region of the antenna, a far field region of the antenna, or any combinations thereof, wherein the monitoring excludes monitoring only the far field region of the antenna. For example, step 224 can be performed in a manner similar to that described elsewhere herein.

In some implementations of these embodiments, the intermediate field region comprises a region that spans a portion of the near field region of the antenna and a portion of the far field region of the antenna.

In some implementations of these embodiments, the method further comprises identifying an antenna resource for mitigating the interference, and performing by the antenna resource conditioning on the communication signal to reduce the interference.

In some implementations of these embodiments, the antenna comprises a plurality of radiating elements, wherein the antenna is configured to operate the plurality of radiating elements in bands that mix and interfere together. In some implementations of these embodiments, the interference detected includes mixing and interference of the bands, wherein the interference detected comprises passive intermodulation (PIM) interference.

In some implementations of these embodiments, the interference comprises intercell interference.

In some implementations of these embodiments, the interference is generated from dynamic spectrum sharing between transmitters.

In some implementations of these embodiments, the interference comprises leakage interference generated by another base station.

In some implementations of these embodiments, a polarization of the interference enables detection of the interference. In some implementations of these embodiments, the polarization of the interference is detectable separately from other signals received by the antenna.

In some implementations of these embodiments, the antenna is integrated with a remote radio head.

In some implementations of these embodiments, the antenna operates in a communication system utilizing time division multiple access.

In some implementations of these embodiments, the antenna operates in a communication system utilizing frequency division multiple access.

In some implementations of these embodiments, a signaling protocol used by one or more transmitters unassociated with the antenna comprises an orthogonal frequency-division multiple access protocol. In some implementations of these embodiments, the interference is further detected by detecting the signaling protocol used by the one or more transmitters.

While for purposes of simplicity of explanation, the respective processes are shown and described as a series of blocks in FIG. 2R, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device comprises a circuit coupled to an antenna. The circuit facilitates operations, including receiving, via the antenna, a signal generated by a communication device, and detecting interference in the signal, wherein the interference is generated by one or more sources, wherein the interference is detected by monitoring a near field region of the antenna, an intermediate field of the antenna, a far field region of the antenna, or any combinations thereof, wherein the monitoring excludes monitoring only the far field region of the antenna.

In some implementations of these embodiments, the operations further include identifying a resource for mitigating the interference.

In some implementations of these embodiments, the circuit is configured to detect a polarization of the interference.

In various embodiments, a non-transitory machine-readable medium comprises executable instructions that, when executed by a processing system including a processor, facilitate performance of operations. The operations comprise receiving, via an antenna, a communication signal generated by a communication device, and detecting interference in the communication signal, wherein the interference is generated by one or more interference sources, wherein the interference is detected by monitoring a near field region of the antenna, an intermediate field region of the antenna, or both with or without monitoring a far field region of the antenna.

In some implementations of these embodiments, the operations further comprise controlling, by a remote radio unit, the antenna to perform one or more actions for mitigating or cancelling the interference.

Figure 2S:
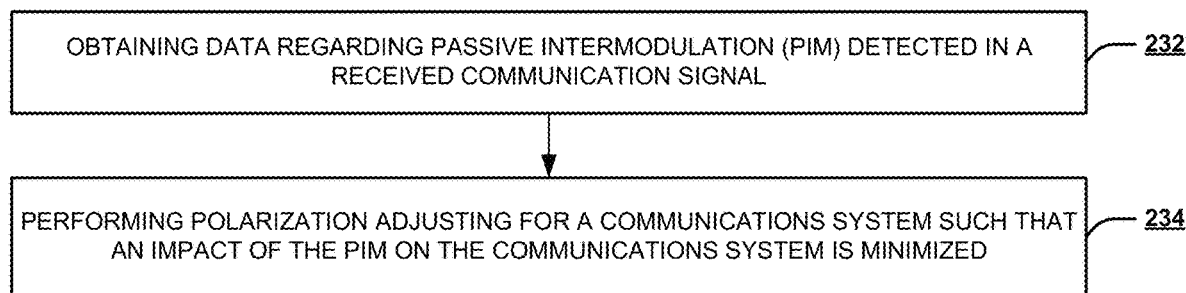

FIG. 2S depicts an illustrative embodiment of a method 230 in accordance with various aspects described herein. In some embodiments, one or more process blocks of FIG. 2S can be performed by an interference/PIM cancellation system, such as one or more of the interference/PIM cancellation systems described herein. In certain embodiments, one or more process blocks of FIG. 2S may be performed by another device or a group of devices separate from or including the interference/PIM cancellation system, such as a radio (e.g., an RRH), a baseband unit (BBU), an antenna or antenna system, an interference/PIM detection control device, and/or an AISG interface. In one or more embodiments, the method can include operations. For example, a device may comprise a processing system including a processor and associated with a communications system, and a memory that stores executable instructions that, when executed by the processing system, facilitate performance of such operations.

At 232, the method can include obtaining data regarding passive intermodulation (PIM) detected in a received communication signal. For example, step 232 can be performed in a manner similar to that described elsewhere herein.

At 234, the method can include performing polarization adjusting for a communications system such that an impact of the PIM on the communications system is minimized. For example, step 234 can be performed in a manner similar to that described elsewhere herein.

In some implementations of these embodiments, the PIM originates in a near field region of an antenna system of the communications system or an intermediate field region of the antenna system that spans a portion of the near field region and a portion of a far field region of the antenna system.

In some implementations of these embodiments, the performing the polarization adjusting results in no impact to a far field region of an antenna system of the communications system, as compared to a case where the polarization adjusting is not performed.

In some implementations of these embodiments, the performing the polarization adjusting comprises rotating one or more radiating elements of an antenna system of the communications system.

In some implementations of these embodiments, the performing the polarization adjusting comprises performing electronic adjustments for one or more radiating elements of an antenna system of the communications system.

While for purposes of simplicity of explanation, the respective processes are shown and described as a series of blocks in FIG. 2S, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a method comprises obtaining data regarding passive intermodulation (PIM) originating from one or more interference sources, and mitigating, by an adjusting mechanism associated with a communications system, the PIM by performing polarization adjusting for the communications system.

In some implementations of these embodiments, the PIM originates in a near field region of an antenna system of the communications system or an intermediate field region of the antenna system that spans a portion of the near field region and a portion of a far field region of the antenna system.

In some implementations of these embodiments, the performing the polarization adjusting results in no impact to a far field region of an antenna system of the communications system, as compared to a case where the polarization adjusting is not performed.

In some implementations of these embodiments, the performing the polarization adjusting comprises rotating one or more radiating elements of an antenna system of the communications system.

In some implementations of these embodiments, the performing the polarization adjusting comprises performing electronic adjustments for one or more radiating elements of an antenna system of the communications system.

In some implementations of these embodiments, the performing the polarization adjusting involves one or more adjustments for one or more orthogonally-polarized element pairs of an antenna system of the communications system.

In some implementations of these embodiments, the communications system comprises a multiple-input-multiple-output (MIMO) antenna.

In some implementations of these embodiments, the polarization adjusting is performed by a remote radio unit.

In some implementations of these embodiments, the polarization adjusting involves controlling one or more motors.

In some implementations of these embodiments, the obtaining is performed by a processing system including a processor, wherein the adjusting mechanism is included in or comprises the processing system.

In various embodiments, a non-transitory machine-readable medium comprises executable instructions that, when executed by a processing system including a processor and associated with a communications system, facilitate performance of operations. The operations comprise receiving data regarding interference present in a received communication signal, and performing polarization adjusting for the communications system such that the interference is mitigated.

In some implementations of these embodiments, the interference originates in a near field region of an antenna system of the communications system or an intermediate field region of the antenna system that spans a portion of the near field region and a portion of a far field region of the antenna system.

In some implementations of these embodiments, the performing the polarization adjusting results in no impact to a far field region of an antenna system of the communications system, as compared to a case where the polarization adjusting is not performed.

In some implementations of these embodiments, the performing the polarization adjusting involves one or more adjustments for one or more orthogonally-polarized element pairs of an antenna system of the communications system.

In some implementations of these embodiments, the communications system comprises a multiple-input-multiple-output (MIMO) antenna.

Figure 2T:
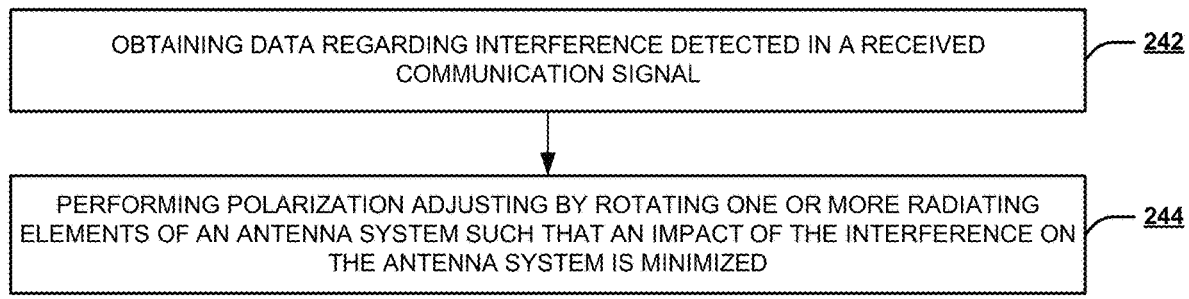

FIG. 2T depicts an illustrative embodiment of a method 240 in accordance with various aspects described herein. In some embodiments, one or more process blocks of FIG. 2T can be performed by an interference/PIM cancellation system, such as one or more of the interference/PIM cancellation systems described herein. In certain embodiments, one or more process blocks of FIG. 2T may be performed by another device or a group of devices separate from or including the interference/PIM cancellation system, such as a radio (e.g., an RRH), a baseband unit (BBU), an antenna or antenna system, an interference/PIM detection control device, and/or an AISG interface. In one or more embodiments, the method can include operations. For example, a device may comprise a processing system including a processor and associated with an antenna system, and a memory that stores executable instructions that, when executed by the processing system, facilitate performance of such operations.

At 242, the method can include obtaining data regarding interference detected in a received communication signal. For example, step 242 can be performed in a manner similar to that described elsewhere herein.

At 244, the method can include performing polarization adjusting by rotating one or more radiating elements of an antenna system such that an impact of the interference on the antenna system is minimized. For example, step 244 can be performed in a manner similar to that described elsewhere herein.

In some implementations of these embodiments, the interference originates in a near field region of the antenna system or an intermediate field region of the antenna system that spans a portion of the near field region and a portion of a far field region of the antenna system.

In some implementations of these embodiments, the performing the polarization adjusting results in no impact to a far field region of the antenna system, as compared to a case where the polarization adjusting is not performed.

In some implementations of these embodiments, the interference comprises passive intermodulation (PIM).

In some implementations of these embodiments, the polarization adjusting comprises rotating a subset of the radiating elements of the antenna system.

While for purposes of simplicity of explanation, the respective processes are shown and described as a series of blocks in FIG. 2T, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a method comprises obtaining data regarding interference originating from one or more interference sources, and mitigating, by an adjusting mechanism associated with an antenna system, the interference by performing polarization adjusting via rotation of radiating elements of the antenna system.

In some implementations of these embodiments, the interference originates in a near field region of the antenna system or an intermediate field region of the antenna system that spans a portion of the near field region and a portion of a far field region of the antenna system.

In some implementations of these embodiments, the performing the polarization adjusting results in no impact to a far field region of the antenna system, as compared to a case where the polarization adjusting is not performed.

In some implementations of these embodiments, the interference comprises passive intermodulation (PIM).

In some implementations of these embodiments, the radiating elements comprise orthogonally-polarized element pairs.

In some implementations of these embodiments, the antenna system comprises a plurality of antennas, wherein the radiating elements are included in one antenna of the plurality of antennas.

In some implementations of these embodiments, the antenna system comprises a single antenna having a plurality of radiating elements, wherein the radiating elements comprise a subset of the plurality of radiating elements.

In some implementations of these embodiments, the polarization adjusting comprises rotating a first set of radiating elements by a first angle of rotation and a second set of radiating elements by a second angle of rotation.

In some implementations of these embodiments, the polarization adjusting is performed by a remote radio unit.

In some implementations of these embodiments, the polarization adjusting involves controlling one or more motors.

In some implementations of these embodiments, the polarization adjusting is performed via one or more Antenna Interface Standards Group (AISG)-based interfaces.

In some implementations of these embodiments, the obtaining is performed by a processing system including a processor, wherein the adjusting mechanism is included in or comprises the processing system.

In various embodiments, a non-transitory machine-readable medium comprises executable instructions that, when executed by a processing system including a processor and associated with an antenna system, facilitate performance of operations. The operations comprise receiving data regarding interference present in a received communication signal, and performing polarization adjusting by causing one or more radiating elements of the antenna system to be rotated such that the interference is mitigated.

In some implementations of these embodiments, the performing the polarization adjusting results in no impact to a far field region of the antenna system, as compared to a case where the polarization adjusting is not performed.

In some implementations of these embodiments, the polarization adjusting comprises rotating a subset of the radiating elements of the antenna system.

Figure 2U:
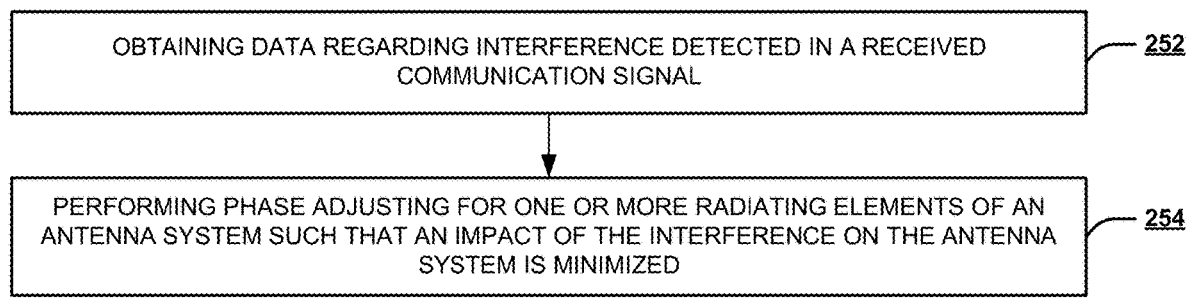

FIG. 2U depicts an illustrative embodiment of a method 250 in accordance with various aspects described herein. In some embodiments, one or more process blocks of FIG. 2U can be performed by an interference/PIM cancellation system, such as one or more of the interference/PIM cancellation systems described herein. In certain embodiments, one or more process blocks of FIG. 2U may be performed by another device or a group of devices separate from or including the interference/PIM cancellation system, such as a radio (e.g., an RRH), a baseband unit (BBU), an antenna or antenna system, an interference/PIM detection control device, and/or an AISG interface. In one or more embodiments, the method can include operations. For example, a device may comprise a processing system including a processor and associated with an antenna system, and a memory that stores executable instructions that, when executed by the processing system, facilitate performance of such operations.

At 252, the method can include obtaining data regarding interference detected in a received communication signal. For example, step 252 can be performed in a manner similar to that described elsewhere herein.

At 254, the method can include performing phase adjusting for one or more radiating elements of an antenna system such that an impact of the interference on the antenna system is minimized. For example, step 254 can be performed in a manner similar to that described elsewhere herein.

In some implementations of these embodiments, the interference originates in a near field region of the antenna system or an intermediate field region of the antenna system that spans a portion of the near field region and a portion of a far field region of the antenna system.

In some implementations of these embodiments, the performing the phase adjusting results in no impact to a far field region of the antenna system, as compared to a case where the phase adjusting is not performed.

In some implementations of these embodiments, the performing the phase adjusting comprises physically displacing the one or more radiating elements along an axis of the antenna system.

In some implementations of these embodiments, the performing the phase adjusting comprises electronically applying a phase shift or delay to one or more signals associated with the one or more radiating elements.

While for purposes of simplicity of explanation, the respective processes are shown and described as a series of blocks in FIG. 2U, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a method comprises obtaining data regarding interference originating from one or more interference sources, and mitigating, by an adjusting mechanism associated with an antenna system, the interference by performing phase adjusting of radiating elements of the antenna system.

In some implementations of these embodiments, the interference originates in a near field region of the antenna system or an intermediate field region of the antenna system that spans a portion of the near field region and a portion of a far field region of the antenna system.

In some implementations of these embodiments, the performing the phase adjusting results in no impact to a far field region of the antenna system, as compared to a case where the phase adjusting is not performed.

In some implementations of these embodiments, the interference comprises passive intermodulation (PIM).

In some implementations of these embodiments, the radiating elements comprise orthogonally-polarized element pairs.

In some implementations of these embodiments, the antenna system comprises a plurality of antennas, wherein the radiating elements are included in one antenna of the plurality of antennas.

In some implementations of these embodiments, the antenna system comprises a single antenna having a plurality of radiating elements, wherein the radiating elements comprise a subset of the plurality of radiating elements.

In some implementations of these embodiments, the performing the phase adjusting comprises physically displacing a subset of the radiating elements along an axis of the antenna system.

In some implementations of these embodiments, the performing the phase adjusting comprises electronically applying a phase shift or delay to one or more signals associated with a subset of the radiating elements of the antenna system.

In some implementations of these embodiments, the performing the phase adjusting comprises displacing a first set of radiating elements by a first amount in a first direction and a second set of radiating elements by a second amount in a second direction opposite the first direction.

In some implementations of these embodiments, the phase adjusting is performed by a remote radio unit, by controlling one or more motors, or a combination thereof.

In some implementations of these embodiments, the phase adjusting is performed via one or more Antenna Interface Standards Group (AISG)-based interfaces.

In some implementations of these embodiments, the obtaining is performed by a processing system including a processor, wherein the adjusting mechanism is included in or comprises the processing system.

In various embodiments, a non-transitory machine-readable medium comprises executable instructions that, when executed by a processing system including a processor and associated with an antenna system, facilitate performance of operations. The operations comprise receiving data regarding interference present in a received communication signal, and performing phase adjusting by causing one or more radiating elements of the antenna system to be displaced along an axis of the antenna system such that the interference is mitigated.

In some implementations of these embodiments, the performing the phase adjusting results in no impact to a far field region of the antenna system, as compared to a case where the phase adjusting is not performed.

Figure 2V:
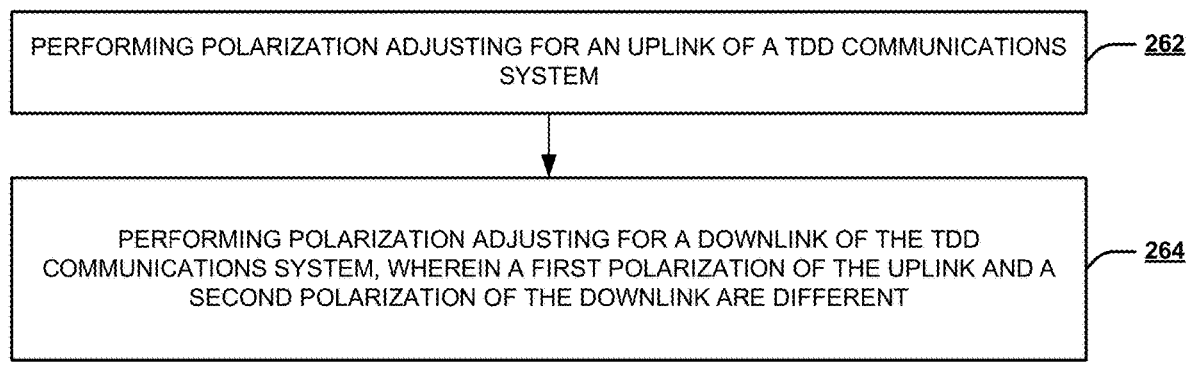

FIG. 2V depicts an illustrative embodiment of a method 260 in accordance with various aspects described herein. In some embodiments, one or more process blocks of FIG. 2V can be performed by an interference/PIM cancellation system, such as one or more of the interference/PIM cancellation systems described herein. In certain embodiments, one or more process blocks of FIG. 2V may be performed by another device or a group of devices separate from or including the interference/PIM cancellation system, such as a radio (e.g., an RRH), a baseband unit (BBU), an antenna or antenna system, an interference/PIM detection control device, and/or an AISG interface. In one or more embodiments, the method can include operations. For example, a device may comprise a processing system associated with a time-division duplexing (TDD) communications system and including a processor, and a memory that stores executable instructions that, when executed by the processing system, facilitate performance of such operations.

At 262, the method can include performing polarization adjusting for an uplink of a TDD communications system. For example, step 262 can be performed in a manner similar to that described elsewhere herein.

At 264, the method can include performing polarization adjusting for a downlink of the TDD communications system, wherein a first polarization of the uplink and a second polarization of the downlink are different. For example, step 264 can be performed in a manner similar to that described elsewhere herein.

In some implementations of these embodiments, the first polarization is orthogonal to the second polarization.

In some implementations of these embodiments, the TDD communications system comprises a multiple-input-multiple-output (MIMO) antenna.

In some implementations of these embodiments, the TDD communications system comprises an antenna system having a plurality of orthogonally-polarized element pairs.

In some implementations of these embodiments, the TDD communications system comprises an antenna system having a plurality of radiating elements, wherein the performing the polarization adjusting for the uplink or the performing the polarization adjusting for the downlink comprises causing a subset of the plurality of radiating elements to rotate.

While for purposes of simplicity of explanation, the respective processes are shown and described as a series of blocks in FIG. 2V, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a non-transitory machine-readable medium comprises executable instructions that, when executed by a processing system associated with a frequency-division duplexing (FDD) communications system and including a processor, facilitate performance of operations. The operations comprise performing polarization adjusting for an uplink of the FDD communications system, and performing polarization adjusting for a downlink of the FDD communications system, wherein a first polarization of the uplink and a second polarization of the downlink are different.

In some implementations of these embodiments, the first polarization is orthogonal to the second polarization.

In some implementations of these embodiments, the FDD communications system employs massive multiple-input-multiple-output (MIMO).

In some implementations of these embodiments, the FDD communications system comprises an antenna system having a plurality of orthogonally-polarized element pairs.

In some implementations of these embodiments, the FDD communications system comprises an antenna system having a plurality of radiating elements, wherein the performing the polarization adjusting for the uplink or the performing the polarization adjusting for the downlink comprises causing a subset of the plurality of radiating elements to become physically adjusted, electronically adjusted, or both physically and electronically adjusted.

In various embodiments, a method comprises performing, by an adjusting mechanism associated with a communications system, polarization adjusting for an uplink of the communications system, and performing, by the adjusting mechanism, polarization adjusting for a downlink of the communications system, wherein a first polarization of the uplink and a second polarization of the downlink are different.

In some implementations of these embodiments, the first polarization is orthogonal to the second polarization.

In some implementations of these embodiments, the communications system comprises a TDD communications system.

In some implementations of these embodiments, the communications system comprises an FDD communications system. In some implementations of these embodiments, the FDD communications system employs massive multiple-input-multiple-output (MIMO).

In some implementations of these embodiments, the communications system comprises an antenna system having a plurality of orthogonally-polarized element pairs.

In some implementations of these embodiments, the first polarization being different from the second polarization enables uplink transmissions and downlink transmissions to overlap with one another.

In some implementations of these embodiments, the performing the polarization adjusting for the uplink or the performing the polarization adjusting for the downlink enables the uplink to avoid detecting interference generated by multiple frequency-division duplexing (FDD) communications systems In some implementations of these embodiments, the performing the polarization adjusting for the uplink comprises adjusting a polarization associated with at least one radiating element of a plurality of radiating elements of an antenna.

In some implementations of these embodiments, the performing the polarization adjusting for the downlink comprises adjusting a polarization associated with at least one radiating element of a plurality of radiating elements of an antenna.

Figure 2W:
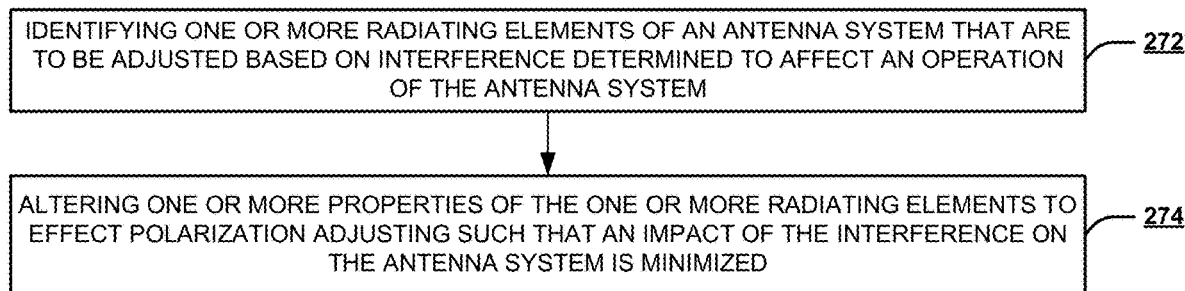

FIG. 2W depicts an illustrative embodiment of a method 270 in accordance with various aspects described herein. In some embodiments, one or more process blocks of FIG. 2W can be performed by an interference/PIM cancellation system, such as one or more of the interference/PIM cancellation systems described herein. In certain embodiments, one or more process blocks of FIG. 2W may be performed by another device or a group of devices separate from or including the interference/PIM cancellation system, such as a radio (e.g., an RRH), a baseband unit (BBU), an antenna or antenna system, an interference/PIM detection control device, and/or an AISG interface.

At 272, the method can include identifying one or more radiating elements of an antenna system that are to be adjusted based on interference determined to affect an operation of the antenna system. For example, step 272 can be performed in a manner similar to that described elsewhere herein.

At 274, the method can include altering one or more properties of the one or more radiating elements to effect polarization adjusting such that an impact of the interference on the antenna system is minimized. For example, step 274 can be performed in a manner similar to that described elsewhere herein.

In some implementations of these embodiments, the interference originates in a near field region of the antenna system or an intermediate field region of the antenna system that spans a portion of the near field region and a portion of a far field region of the antenna system.

In some implementations of these embodiments, the polarization adjusting results in no impact to a far field region of the antenna system, as compared to a case where the polarization adjusting is not performed.

In some implementations of these embodiments, the interference comprises passive intermodulation (PIM).

In some implementations of these embodiments, the one or more properties relate to physical shape.

In some implementations of these embodiments, the one or more properties relate to physical dimensions.

In some implementations of these embodiments, the one or more properties relate to electrical properties, magnetic properties, or a combination thereof.

In some implementations of these embodiments, the one or more radiating elements comprise a subset of the radiating elements of the antenna system.

In some implementations of these embodiments, the antenna system is associated with a frequency-division duplexing (FDD) communications system or a time-division duplexing (TDD) communications system.

In some implementations of these embodiments, the antenna system comprises a plurality of antennas, wherein the one or more radiating elements are included in one antenna of the plurality of antennas.

In some implementations of these embodiments, the antenna system comprises a single antenna having a plurality of radiating elements, wherein the one or more radiating elements comprise a subset of the plurality of radiating elements.

In some implementations of these embodiments, the antenna system comprises a plurality of radiating elements that includes the one or more radiating elements and other radiating elements, wherein the other radiating elements have one or more other properties.

While for purposes of simplicity of explanation, the respective processes are shown and described as a series of blocks in FIG. 2W, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device comprises a processing system including a processor and associated with an antenna system having a plurality of radiating elements, and a memory that stores executable instructions that, when executed by the processing system, facilitate performance of operations. The operations comprise operating the antenna system in a communications system, and mitigating interference via polarization adjusting, wherein the polarization adjusting is provided based on one or more of the plurality of radiating elements of the antenna system being adapted to exhibit one or more properties.

In some implementations of these embodiments, the polarization adjusting results in no impact to a far field region of the antenna system, as compared to a case where the polarization adjusting is not provided.

In some implementations of these embodiments, the one or more properties relate to physical shape, physical dimensions, or a combination thereof.

In some implementations of these embodiments, the one or more properties relate to electrical properties, magnetic properties, or a combination thereof.

In some implementations of these embodiments, the polarization adjusting is provided via one or more Antenna Interface Standards Group (AISG)-based interfaces.

In various embodiments, an antenna system comprises a first subset of radiating elements configured in a first manner, and a second subset of radiating elements configured in a second manner, wherein the first manner is different from the second manner, resulting in polarization adjusting that enables an impact of interference on the antenna system to be minimized when the antenna system is operated.

In some implementations of these embodiments, the interference comprises passive intermodulation (PIM).

In some implementations of these embodiments, the first manner is different from the second manner with respect to physical shape, physical dimensions, electromagnetic properties, or any combination thereof.

Figure 2X:
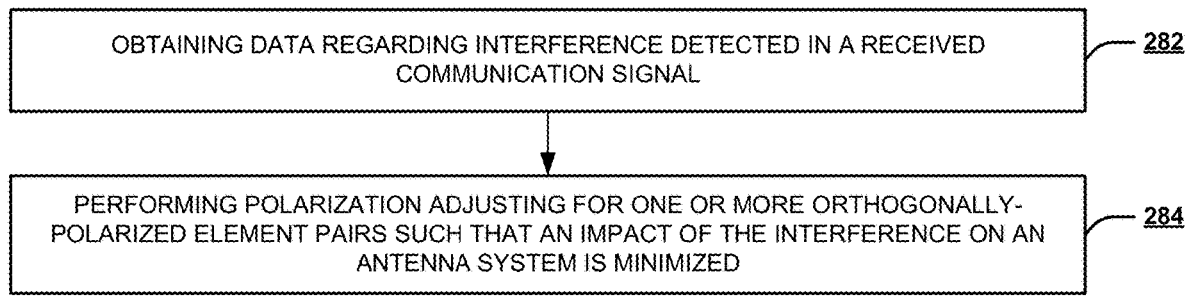

FIG. 2X depicts an illustrative embodiment of a method 280 in accordance with various aspects described herein. In some embodiments, one or more process blocks of FIG. 2X can be performed by an interference/PIM cancellation system, such as one or more of the interference/PIM cancellation systems described herein. In certain embodiments, one or more process blocks of FIG. 2X may be performed by another device or a group of devices separate from or including the interference/PIM cancellation system, such as a radio (e.g., an RRH), a baseband unit (BBU), an antenna or antenna system, an interference/PIM detection control device, and/or an AISG interface. In one or more embodiments, the method can include operations. For example, a device may comprise a processing system including a processor and associated with an antenna system having orthogonally-polarized element pairs, and a memory that stores executable instructions that, when executed by the processing system, facilitate performance of such operations.

At 282, the method can include obtaining data regarding interference detected in a received communication signal. For example, step 282 can be performed in a manner similar to that described elsewhere herein.

At 284, the method can include performing polarization adjusting for one or more orthogonally-polarized element pairs such that an impact of the interference on an antenna system is minimized. For example, step 284 can be performed in a manner similar to that described elsewhere herein.

In some implementations of these embodiments, the interference originates in a near field region of the antenna system or an intermediate field region of the antenna system that spans a portion of the near field region and a portion of a far field region of the antenna system.

In some implementations of these embodiments, the performing the polarization adjusting results in no impact to a far field region of the antenna system, as compared to a case where the polarization adjusting is not performed.

In some implementations of these embodiments, the interference comprises passive intermodulation (PIM).

In some implementations of these embodiments, the antenna system comprises a multiple-input-multiple-output (MIMO) antenna.

In some implementations of these embodiments, the polarization adjusting is performed by a radio device integrated with the antenna system.

While for purposes of simplicity of explanation, the respective processes are shown and described as a series of blocks in FIG. 2X, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a method comprises obtaining data regarding interference originating from one or more interference sources, and mitigating, by an adjusting mechanism associated with an antenna system that comprises orthogonally-polarized element pairs, the interference by performing polarization adjusting for the orthogonally-polarized element pairs.

In some implementations of these embodiments, the interference originates in a near field region of the antenna system or an intermediate field region of the antenna system that spans a portion of the near field region and a portion of a far field region of the antenna system.

In some implementations of these embodiments, the performing the polarization adjusting results in no impact to a far field region of the antenna system, as compared to a case where the polarization adjusting is not performed.

In some implementations of these embodiments, the interference comprises passive intermodulation (PIM).

In some implementations of these embodiments, the polarization adjusting is performed for both an uplink of the antenna system and a downlink of the antenna system.

In some implementations of these embodiments, the polarization adjusting is different for an uplink of the antenna system and a downlink of the antenna system.

In some implementations of these embodiments, the polarization adjusting is performed for an uplink of the antenna system but not a downlink of the antenna system.

In some implementations of these embodiments, the polarization adjusting is performed for a downlink of the antenna system but not an uplink of the antenna system.

In some implementations of these embodiments, the polarization adjusting comprises mixing of signals associated with the orthogonally-polarized element pairs, wherein the orthogonally-polarized element pairs comprise crossed-dipole elements.

In some implementations of these embodiments, the obtaining is performed by a processing system including a processor, wherein the adjusting mechanism is included in or comprises the processing system.

In various embodiments, a non-transitory machine-readable medium comprises executable instructions that, when executed by a processing system including a processor and associated with an antenna system comprising orthogonally-polarized element pairs, facilitate performance of operations. The operations comprise receiving data regarding interference present in a received communication signal, and performing polarization adjusting for one or more of the orthogonally-polarized element pairs such that the interference is mitigated.

In some implementations of these embodiments, the interference originates in a near field region of the antenna system or an intermediate field region of the antenna system that spans a portion of the near field region and a portion of a far field region of the antenna system.

In some implementations of these embodiments, the performing the polarization adjusting results in no impact to a far field region of the antenna system, as compared to a case where the polarization adjusting is not performed.

In some implementations of these embodiments, the antenna system comprises a multiple-input-multiple-output (MIMO) antenna.

Figure 3A:
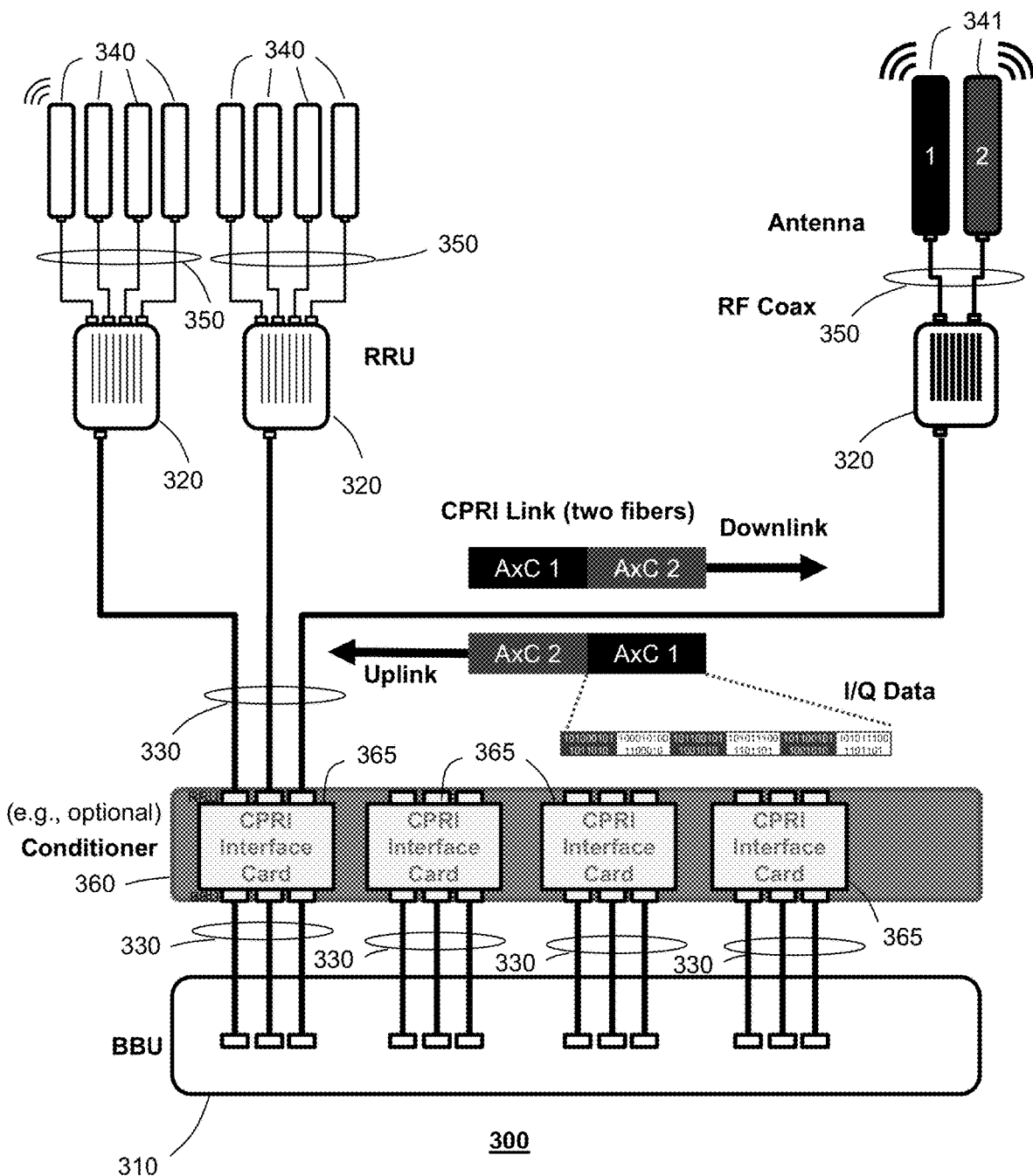
FIG. 3A depicts an exemplary, non-limiting embodiment of a system in accordance with various aspects described herein.

FIG. 3A depicts an exemplary, non-limiting embodiment of a system 300 in accordance with various aspects described herein. In various embodiments, the system 300 may be functioning within, or operatively overlaid upon, the communications network 100 of FIG. 1A and/or the communications system 180 of FIG. 1B. For example, portion(s) of system 300 can facilitate, in whole or in part, detection of interference/PIM in a communications system and performing of action(s), such as polarization adjusting and/or phase shifting/delaying, as described herein, that result in mitigation/cancellation of the interference/PIM. As illustrated in FIG. 3A, a baseband processor unit (BBU) 310 comprises a plurality of baseband processors and interfaces or connectors for connection to a remote radio unit (RRU) 320 through a plurality of fiber optic cables 330. BBU 310 processes downlink data signals for transmission to mobile or stationary UEs (not illustrated) and uplink data signals received from mobile or stationary UEs. BBU 310 integrates multiple lines of common public radio interface (CPRI) antenna carrier data in full duplex at high speed over the fiber optic cables 330.

RRU 320 transmits and receives radio frequency (RF) signals from one or more antennas 340 through RF coaxial cables 350. RRU 320 contains circuitry to convert the baseband digital signals received from BBU 310 to RF signals, and vice-versa.

Optionally, inserted between BBU 310 and RRU 320 is a conditioner 360. In an embodiment, conditioner 360 can be configured to output signals based on a predefined protocol such as a Gigabit Ethernet output, an open base station architecture initiative (OBSAI) protocol, or CPRI protocol, among others. Conditioner 360 can comprise an adaptive filter configured to execute signal processing algorithm(s). Conditioner 360 can receive digital signals, known as antenna carriers (denoted by A×C), from BBU 310 and RRU 320 via fiber optic cables 330. Each antenna carrier carries In-Phase and Quadrature (I/Q) data for one RF signal at one antenna element. In an embodiment illustrated in FIG. 3A, a 2×2 MIMO antenna 341 comprises two uplink antenna carriers on the uplink fiber and two downlink antenna carriers on the downlink fiber. I/Q data samples are interleaved and placed in a basic frame of the antenna carrier. Samples from multiple antennas are contained in each basic frame. The uplink information can include one or more system information blocks (SIBs) as defined by a protocol, such as, for example, an LTE protocol. The SIBs can include a physical resource block (PRB). From a PRB, the system can obtain uplink information, which can include among other things, an indication of how many communication devices will be transmitting wireless signals in uplink paths assigned by one or more base stations, power level(s) that will be used by each of the communication devices during uplink wireless communications, the resource blocks that are assigned to each communication device, and other useful parametric information utilized by each communication device when communicating via an uplink path.

In certain embodiments, the PRB can also be used by the system of the subject disclosure to create a signal profile. The signal profile can be, for example, an energy profile and/or a spectral profile, which can be determined from parametric information provided in the PRB (e.g., power level, resource blocks being used, radio access technology being used, etc.). The signal profile can be used to determine whether the wireless signal received is a standard signal (e.g., LTE signal), and if not standard, whether the wireless signal received causes signal interference. Accordingly, the signal profile can be used by the system of the subject disclosure to perform time domain and/or frequency domain analysis of measurements, which, in turn, can result in the detection of signal interferers.

The system of the subject disclosure can be adapted to perform, according to the uplink information, measurements on wireless signals transmitted by the communication devices via the uplink paths assigned to the communication devices. The wireless signals can be received via antennas (which, in some embodiments, may be configured as MIMO antennas). These antennas can be coupled to the system of the subject disclosure for performing measurements, processing and conditioning the signals received from the antennas according to such measurements, and for providing the conditioned signals to one or more base station processors. The measurements can be based on a sampling of analog signals supplied by an antenna receiving uplink wireless signals transmitted by the communication devices. In other embodiments, the measurements can be associated with measurements derived from digital signals supplied by one or more radio access networks (RANs) coupled to one or more corresponding antennas of a base station.

Optional conditioner 360 can provide support for 2×2 and 4×4 MIMO antenna configurations (or other MIMO configurations), diversity antenna configurations, and a variety of CPRI interfaces. In an embodiment, conditioner 360 supports up to 200 MHz carriers and all CPRI rates. In an embodiment, conditioner 360 interfaces with 3 to 12 CPRI fiber pairs providing coverage for multiple bands in, for example, a three sector site. Conditioner 360 can be located anywhere within fiber optic range of BBU 310 or RRU 320, e.g., off tower, or even off site (e.g., a central office remote from the RRU 320).

Conditioner 360 comprises a plurality of CPRI interface cards 365. In an embodiment, each CPRI interface card 365 supports a CPRI link comprising up to 4 antenna carriers at, for example, 5, 10, and 20 MHz bandwidths. Each CPRI link comprises either one or more frequency bands. Multiple CPRI links can comprise multiple frequency bands. Each CPRI link can further comprise signals associated with MIMO or diversity antenna configurations, and can comprise one or more sectors. For example, in one embodiment, the conditioner 360 can provide capacity for up to twelve RRUs, 48 antenna carriers, and 12 sectors. In other embodiments, the conditioner 360 can provide capacity for more or fewer RRUs, more or fewer antenna carriers, and more or fewer sectors.

Each CPRI interface card 365 can examine SIBs obtained from one or more downlink fibers to determine parameters of the uplink path signals received over the uplink fiber. In an embodiment, the CPRI interface card 365 can take SINR measurements of each uplink path according to information in the SIBs obtained from the one or more downlink fibers, and determine whether one or more SINR measurements fall below a threshold. In some embodiments, the CPRI interface card 365 can take corrective action to improve one or more SINR measurements falling below the threshold, such as moving an uplink path affected by interference to an available uplink path in the same sector, or in different sectors, as set forth in more detail below. In an embodiment, the CPRI interface card 365 can compare signals from different sectors to determine an approach for taking corrective action.

It will be appreciated that the threshold noted above can represent a minimally expected SINR measurement. It will be appreciated that the threshold compared against one or more SINR measurements can be a predetermined threshold. In other embodiments, the threshold can be determined empirically from measurements taken in a controlled setting to identify a desirable SINR measurement. In yet other embodiments, the threshold can be determined according to a running average of power levels within a resource block or among groupings of resource blocks. Other techniques for determining a threshold that is compared to a SINR measurement can be used. Similarly, correlation techniques can be used to identify circumstances that warrant corrective action of certain SINR measurements.

It is to be appreciated and understood that some or all of the aspects of detection of interference/PIM and/or polarization adjusting and/or phase shifting/delaying, described herein, can be performed in, or by, one or more of the antennas 340, one or more of the RRUs 320, one or more of the BBUs 310, and/or the optional conditioner 360.

Figure 3B:
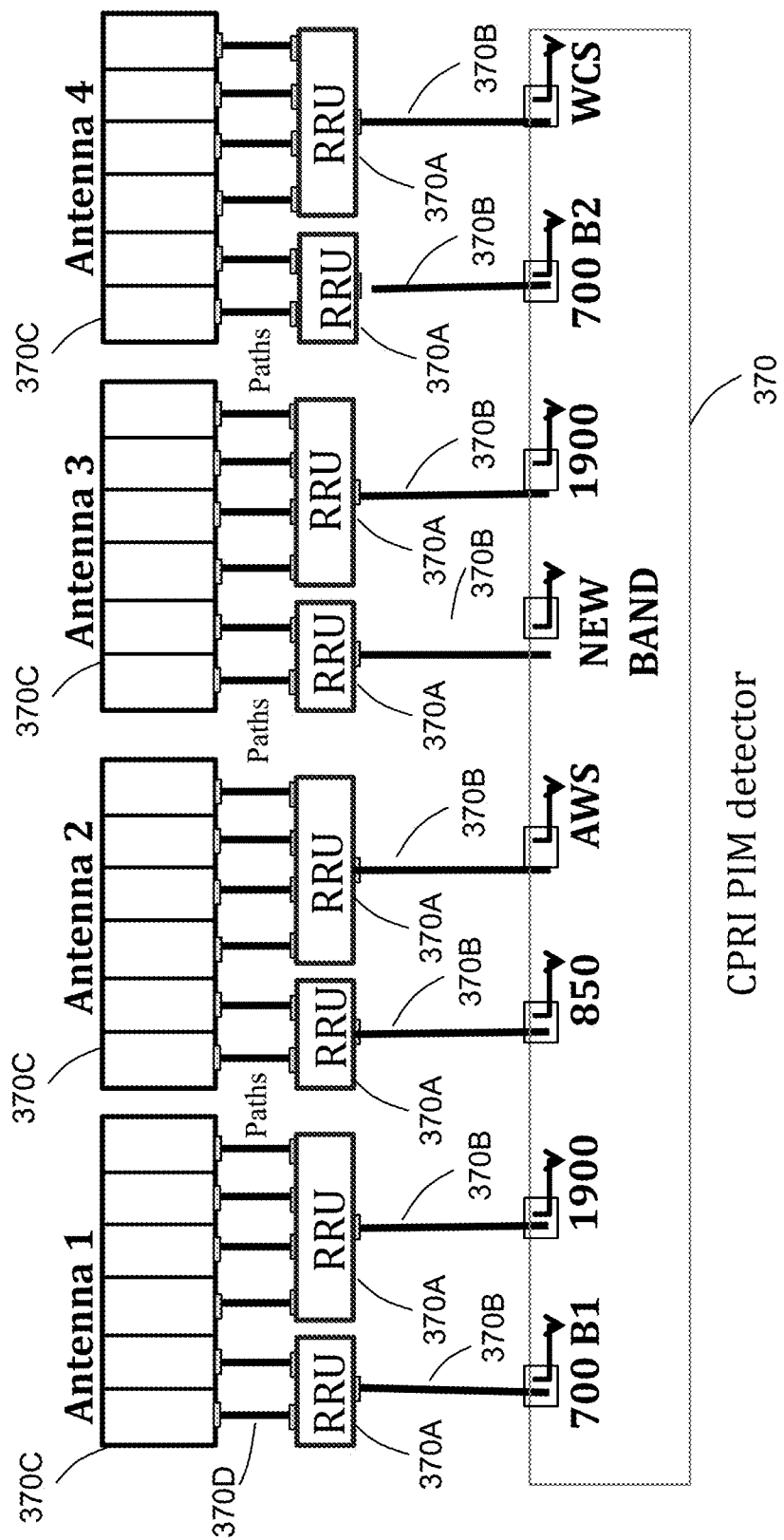
FIG. 3B depicts an exemplary, non-limiting embodiment of a system for detecting PIM interferences in uplink signals of a base station in accordance with various aspects described herein.

FIG. 3B depicts an exemplary, non-limiting embodiment of a system for detecting passive intermodulation (PIM) interferences in uplink signals of a base station in accordance with various aspects described herein. In various embodiments, this system may be functioning within, or operatively overlaid upon, the communications network 100 of FIG. 1A and/or the communications system 180 of FIG. 1B. For example, portion(s) of this system can facilitate, in whole or in part, detection of interference/PIM in a communications system and performing of action(s), such as polarization adjusting and/or phase shifting/delaying, as described herein, that result in mitigation/cancellation of the interference/PIM.

As illustrated in FIG. 3B, inserted between BBUs (not illustrated) and RRUs 370A is a PIM detector 370, which non-intrusively receives and supplies signals through a plurality of fiber optic cables 370B, which comprise multiple lines of CPRI antenna carrier data in full duplex at high speed over the fiber optic cables 370B. The PIM detector 370 can be installed remotely from the base station. RRUs 370A transmit and receive radio frequency (RF) signals from one or more antennas 370C through RF coaxial cables 370D, denoted as "paths."

PIM detector 370 illustrated in FIG. 3B measures the presence of PIM in one band and in one or multiple paths of an uplink based on detection algorithms applied to the measured signals. PIM detector 370 can rank the source of PIM due to a junction, cables or components, or an antenna. PIM detector 370 can quantify the PIM interference level, from low, moderate, to severe.

Knowing that a transmission signal on the same line is strong, if the line is duplexed, can indicate a PIM issue, and generally is an internal problem to the base station. Based on the level of PIM measured and correlation to received signal strength indicator (RSSI), a determination of the magnitude of the problem will be evaluated. For example, if the level of PIM on Path 1 and on Path 2 are correlated, then it is more likely an external PIM is present. If there is no correlation, it is likely an internal PIM is present due to a particular component of the base station. By assessing a signature of the PIM, PIM detector 370 can detect whether the source of interference is due to an LTE band signal, or due to other cellular technologies, or even non-cellular sources. As shown in FIG. 3B, if PIM is measured and is available on multiple bands that share the same cables and antenna, it is likely that a particular component or cable of a base station is the source of PIM.

Correlation with time can also be detected if PIM interference happens during a particular time when the system is heavily used and the PIM level can be correlated to another transmitter.

In an embodiment, a sequence of steps in a method are performed in which transmitters are turned on at different high power levels during a maintenance window and in certain combination(s) so that the PIM detector can determine if the PIM happens at certain target bands and under certain conditions. As illustrated in FIG. 3B, a cellular network carrier supplies 8 RF bands or services to a base station comprising four antennas 370C in the mobile network. Each band/service may comprise 2 paths, or possibly 4 paths. As illustrated in FIG. 3B, four antennas 370C comprise the 8 bands/services supplied by the carrier, over a total of 24 paths, two paths for the low frequency band, and four paths for the high frequency band on each antenna.

In the method, PIM detector 370 builds an array of 24 RSSI measurements, one RSSI measurement for each path, while transmission occurs on one path, preferably under a simulated high traffic condition. Such high traffic condition can be simulated with the help of an Air interface load generator (AILG) or an Orthogonal channel noise simulator (OCNS) that creates signals at different frequencies, so that the level of PIM can be detected and determined. Another array of 24 RSSI measurements is built by PIM detector 370 while transmission occurs only on the second path, and so forth. Each transmission path is used to create a row in a 24×24 matrix $M_i$ of RSSI measurements formed by the various transmissions:

$24[^{24}]=Mi$, where i denotes the power level.

Next, PIM detector 370 changes the power level of the transmissions, thereby forming a series of matrices. By comparing the RSSI in each matrix to the next one, PIM detector 370 can determine whether the transmissions are creating leakage, or possibly internal PIM from a particular transmission path. If increasing power with Mi has an impact on the RSSI reading, then the interference is PIM, and internal PIM in particular. If the change in RSSI when power is doubled is 2 dBc, then the interference can be characterized as a 3rd order PIM. If the increase is ≈3-8 dBc, then the interference can be characterized as 5th order PIM. If increasing power with Mi does not have an impact on the RSSI reading, then the interference is external.

In an embodiment, different combinations of bands and/or paths that can be impacted by PIM arise from multiple transmissions. From such combinations of bands and/or paths, PIM detector 370 can be configured to determine if the PIM is caused by an internal component of a base station or an external component that is not part of the base station (e.g., an external metallic object that reflects a signal transmission from the base station). PIM detector 370 can measure interference based on the detection algorithms in multiple bands and/or multiple paths based on the multiple transmissions. For example, consider that, if only two transmitters are transmitting in two bands out of the eight bands, there would be (8!/6!/2!) combinations, or 28 possible dual band transmission cases for the base station illustrated in FIG. 3B. If three transmitters out of the eight bands were transmitting at the same time to cause the PIM, there would be (8!/5!/3!) combinations, or 56 possible tri-band transmission cases for the base station of FIG. 3B. If four transmitters out of the eight bands were transmitting at the same time to cause the PIM, there would be (8!/4!/4!) combinations, or 70 possible quad-band transmission cases for the base station of FIG. 3B. If all 154 possible transmission combinations (28+56+70) are considered, then a matrix MCi can be formed by measuring the RSSI in each of the 24 paths:

$154[^{24}]=M\ C\ i$, where i denotes the power level.

By comparing the RSSI levels under different power levels and conditions, PIM detector 370 can determine whether there is a certain combination that creates PIM interference, whether the interference is a function of certain frequency bands, or whether the interference is a function of certain antenna proximity issues. By repeating the test transmissions at other sectors, further diagnosis can be performed.

Once PIM interference has been detected, corrective actions may include, for example, applying one or more polarization adjusting and/or phase shifting/delaying techniques described herein; resolving issues related to variability among sectors; or looking at MCi and evaluating the increase in RSSI at different levels to determine what order level PIM (3rd, 5th, etc.) is causing the interference. Additionally, the impact on performance under different loading conditions can be considered. For example, the delta increase in RSSI can be correlated to a certain power level, and as a result, the offending transmission should be reduced. Another case is when the optimum level of transmission is determined for a particular traffic condition on one of the 8 transmitters. This process may be repeated for each band.

In an embodiment, interference detection may be extended in several ways: the matrices of a particular sector may be correlated with that of another sector in the same site, and as a result, determine if there are issues in particular with antenna isolation, or more of a systemic issue; the matrix element of a particular sector can be correlated to determine the integrity of the RF environment and the quality of RF signals; or detection algorithms can determine the LTE quality. In an embodiment, the matrices of a particular site can be correlated with those of a neighboring site (taking into consideration that the other site may have a different antenna configuration or isolation but the same frequency bands). In this case, the information can help increase the confidence level in determining if the PIM is internal or external, and if it's external, what bands are targeted. The information can help detect if the PIM or interference is coming from another competitive carrier or is self-inflicted due to the multiple bands in operation. (For example, peak and quiet time tends to be the same for all carriers and therefore maintenance window testing can rule out or confirm the source.)

In another embodiment, RSSI elements in the matrices could be replaced with spectral pictures in which the information can be segmented further into an array of frequencies. This will give further insight and provide information on the mixing combinations and determine if there are leakages instead of PIM. Also, any correlation with power levels can be used to determine the order of the PIM. In an embodiment, the system can be automated to perform carrier testing at maintenance window, which will provide a wealth of information on the quality of the network.

Figure 3C:
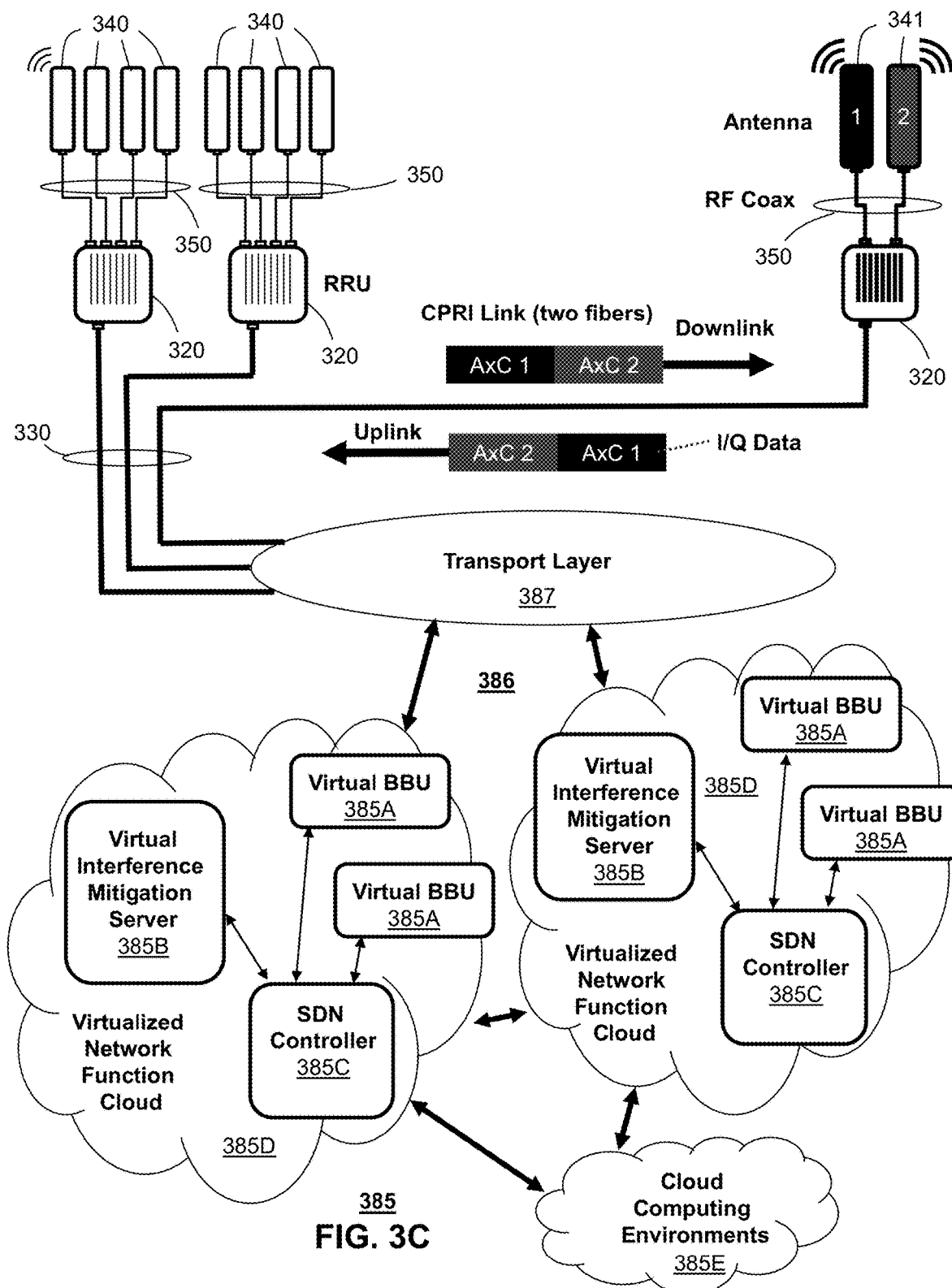
FIG. 3C depicts an exemplary, non-limiting embodiment of a communications system including a virtualized interference mitigation network in accordance with various aspects described herein.

FIG. 3C illustrates a block diagram depicting an example, non-limiting embodiment of a communication system 385 including a virtualized interference mitigation network in accordance with various aspects described herein. In various embodiments, the communications system 385 may be functioning within, or operatively overlaid upon, the communications network 100 of FIG. 1A and/or the communications system 180 of FIG. 1B.

As depicted in FIG. 3C, a virtualized interference mitigation network is presented that can be used to implement some or all of the methods for interference mitigation described herein. For example, portion(s) of this network can facilitate, in whole or in part, detection of interference/PIM in a communications system and performing of action(s), such as polarization adjusting and/or phase shifting/delaying, as described herein, that result in mitigation/cancellation of the interference/PIM. In one or more embodiments, communication system 385 may be configured to provide conditioning of uplink signals. Communication system 385 can include remote radio units (RRU) 320 and one or more antennas 340. The RRUs 320 can transmit and receive radio frequency (RF) signals to and from the one or more antennas 340 through RF coaxial cables 350. The RRUs 320 can include circuitry to convert the baseband digital signals to RF signals, and vice-versa. In one embodiment, the RRUs 320 can be coupled to fiber optic cables 330. In one embodiment, the fiber optic cables 330 can carry digital data to and from the RRUs. In one embodiment, a common public radio interface (CPRI) protocol can be used to carry digital data to and from the RRUs 320 via full duplex at high speed over the fiber optic cables 330.

The digital data, also known as antenna carriers (denoted by A×C), can originate from the RRUs 320 or from virtual BBUs 385A. In one embodiment, each antenna carrier can include I/Q data for an RF signal associated with an antenna element. I/Q data can describe an instantaneous state of an RF signal by providing magnitude and phase angle information based on sinusoidal modeling of the RF signal. If an RF signal is used for modulating a voice/data signal on a carrier wave, then I/Q data can effectively convey information about the data being carried. In addition, I/Q data can be provided in a Cartesian coordinate system (X, Y), where X=amplitude and Y=phase angle. In an embodiment illustrated in FIG. 3C, a 2×2 MIMO antenna 341 can include two uplink antenna carriers on the uplink fiber and two downlink antenna carriers on the downlink fiber. I/Q data samples can be interleaved and placed in a basic frame of the antenna carrier. Samples from multiple antennas are contained in each basic frame.

In one or more embodiments, the communication system 385 can include virtualized interference mitigation, where functions for interference detection, mitigation (e.g., via polarization adjusting and/or phase shifting/delaying as described herein), and baseband communications serving uplink and downlink paths can be implemented via a cloud networking architecture 386. In particular, a cloud networking architecture 386 is shown that can leverage cloud technologies and supports innovation and scalability. The cloud networking architecture 386 for virtualized interference mitigation can include a transport layer 387 and/or one or more virtualized network function clouds 385D. The cloud networking architecture 386 can also include one or more cloud computing environments 385E. In various embodiments, this cloud networking architecture 386 can be implemented via an open architecture that leverages application programming interfaces (APIs), which can seamlessly scale to meet evolving customer requirements including traffic growth, diversity of traffic types, and diversity of performance and reliability expectations.

In one or more embodiments, the cloud networking architecture 386 can employ virtualized network function clouds 385D to perform some or all of the functions of interference detection and mitigation (e.g., via polarization adjusting and/or phase shifting/delaying) described herein. The virtualized network function clouds 385D can include virtual network functions (VFN) or virtual network elements (VFE) to perform some or all of the functions for interference detection and mitigation (e.g., via polarization adjusting and/or phase shifting/delaying) as described herein. For example, the virtualized network function clouds 385D can provide a substrate of networking capability, often called Network Function Virtualization Infrastructure (NFVI) or simply infrastructure that is capable of being directed with software and Software Defined Networking (SDN) protocols. In one embodiment, the virtualized network function clouds 385D can include one or more a SDN Controllers 385C that can direct, control, and/or modify the operation of the virtualized network function clouds 385D and of the VFE and/or VFE that are instantiated in the virtualized network function clouds 385D. The virtualized network function clouds 385D can support Network Function Virtualization (NFV).

As an example, an interference mitigation function, such as an interference/PIM cancellation block (e.g., the interference/PIM cancellation block 203c of FIG. 2C or the like), an interference/PIM detection control device (e.g., interference/PIM detection control device 203d of FIG. 2C or the like), an adaptive front-end module, and/or the like can be implemented via a VNE composed of NFV software modules, merchant silicon, and/or associated controllers. The interference mitigation function can be in the form of a Virtual Interference Mitigation Service that is instantiated into the virtualized network function cloud 385D by the SDN Controller 385C. Various interference mitigation functions can be instantiated in the virtualized network function clouds 385D, such as, but not limited to, systems and/or methods for signal processing, interference detection, adaptive threshold determination, interference/PIM mitigation (e.g., via polarization adjusting and/or phase shifting/delaying, as described herein), network adaptation and optimization, and/or link analysis, optimization, and/or management. Other interference mitigation functions can be instantiated in the virtualized network function clouds 385D, such as, but not limited to, systems and/or methods for adapting inter-cell interference thresholds based on thermal noise, conditioning uplink signals, and general interference diagnosis and testing.

In one or more embodiments, software can be written so that increasing workload on the virtualized network function clouds 385D consumes incremental resources from a common resource pool, and moreover so that it's elastic: so the resources are only consumed when needed. In a similar fashion, virtual interference mitigation servers 385B, virtual BBUs 385A, and other network elements, such as other routers, switches, edge caches, and middle-boxes, can be instantiated from a common resource pool as directed by a SDN Controller 385C. Such sharing of infrastructure across a broad set of uses makes planning and growing infrastructure easier to manage.

In an embodiment, the cloud networking architecture 386 can include a transport layer 387. The transport layer 387 can include fiber, cable, wired and/or wireless transport elements, network elements and interfaces to transmit digital signals to and from the RRUs 320 to the virtualized network function clouds 385D. In one example, fiber optic cable 330 can transmit digital signals between the RRUs 320 and the virtualized network function cloud 385D, and the transport layer 387 simply be a continuation of the fiber optic cable and/or include repeating and/or buffering functions. In one example, the transport layer 387 can translate the digital signals between the fiber optic cable 330 and other transport media, such as wired or wireless connections. In one embodiment, a network element, such as a virtual BBU 385A, may need to be positioned at a specific location. For example, a bank of virtual BBUs 385A may be physically co-located to take advantage of common infrastructure. To optimally link digital signals between a client RRU 320 and a virtual BBU 385A that is in a remote location, the transport layer 387 may convert between a communication media, such as a fiber optic link to the RRU 320, and a long-haul media, such as the Internet or a cellular system. In one embodiment, a network element, such as a BBU, may include physical layer adapters that cannot be abstracted or virtualized, or that might require special DSP code and analog front-ends (AFEs), such that the network element cannot be completely virtualized. In this case, all or part of the network element may be included in the transport layer 387.

The virtualized network function clouds 385D can interface with the transport layer 387 to provide virtual network elements, such as virtual interference mitigation servers 385B and virtual BBUs 385A, that provide specific NFVs. In particular, the virtualized network function cloud 385D can leverage cloud operations, applications, and architectures to support communication loading and required interference mitigation. For example, virtual interference mitigation servers 385B and virtual BBUs 385A can employ network function software that provides either a one-for-one mapping of non-networked versions of these functions or, alternately, combines versions of these functions that are designed and/or optimized for cloud computing. For example, virtual interference mitigation servers 385B and virtual BBUs 385A, or other ancillary network devices, may be able to process digital data signals without generating large amounts of network traffic. As such, their workload can be distributed across a number of servers within and/or between each virtualized network function cloud 385D. Each of the virtual interference mitigation servers 385B and virtual BBUs 385A can add its portion of capability to the whole, so that the cloud networking architecture 386 exhibits an overall elastic function with higher availability than a strictly monolithic version. These virtual interference mitigation servers 385B and virtual BBUs 385A can be instantiated and managed by a SDN Controller 385C using an orchestration approach similar to those used in cloud compute services.

In one or more embodiments, the virtualized network function clouds 385D can further interface with other cloud computing environments 385E via application programming interfaces (API) that can expose functional capabilities of the virtual interference mitigation servers 385B and virtual BBUs 385A to provide flexible and expanded capabilities to the virtualized network function cloud 385D. In particular, interference mitigation workloads may have applications distributed across the virtualized network function clouds 385D and the cloud computing environment 385E (at third-party vendors). The SDN Controller 385C may orchestrate workloads supported entirely in NFV infrastructure from these third-party locations.

In one or more embodiments, a virtual interference mitigation server 385B at a virtualized network function cloud 385D can be configured to receive digital signals from RRUs 320 operating at a communications site, such as at a cellular tower. The virtual interference mitigation server 385B can rely on the digital nature of the digital signals (converted from the RF domain prior to transmission on the fiber optic cables 330), the transport layer 387, and the virtualized network function cloud 385D to facilitate remote processing of digital signals representing RF signals received at the RRUs 320. In one embodiment, the virtual interference mitigation server 385B can perform measurements on these digital signals for detecting interference on RF signals, and can initiate mitigation for detected interference.

In one or more embodiments, the virtual interference mitigation server 385B can perform measurements on digital data that it receives via the transport layer 387. The virtual interference mitigation server 385B can include interfaces capable of interfacing with the digital signals in a protocol, such as the common public radio interface (CPRI) protocol. In one embodiment, the virtual interference mitigation server 385B can include one or more protocol-capable interface cards. In one embodiment, the virtual interference mitigation server 385B can implement protocol compatibility via hardware, software, or a combination of hardware and software. In one embodiment, each virtual interference mitigation server 385B can support one or more data links (CPRI-capable links). Each data link can include one or more frequency bands. Multiple data links can include multiple frequency bands. Each data link can further include signals associated with multiple-input and multiple-output (MIMO) antennas 341 or diversity antenna configurations. Each data link can support one or more sectors. For example, a virtual interference mitigation server 385B can provide capacity for banks of RRUs 320, antenna carriers, and sectors at multiple cell locations.

In one or more embodiments, the virtual interference mitigation server 385B can examine system information blocks (SIBs) to determine parameters of the uplink path signals received over the transport layer 387. In an embodiment, the virtual interference mitigation server 385B can obtain SINR measurements of uplink paths according to digital signal information from SIBs. The virtual interference mitigation server 385B can determine whether one or more SINR measurements fall below a threshold and, in turn, can take corrective action to improve one or more SINR measurements that fall below the threshold. For example, the virtual interference mitigation server 385B can determine a corrective action, whereby an uplink path that is affected by interference is moved to an available uplink path in the same sector, or in different sectors. In an embodiment, the virtual interference mitigation server 385B can compare signals from different sectors to determine an approach for taking corrective action.

In one or more embodiments, the virtual interference mitigation server 385B can (e.g., optionally) include a conditioner function. The condition function can include an adaptive filter, and/or can execute signal processing algorithm(s). The conditioner of the virtual interference mitigation server 385B can receive digital signals from the transport layer 387, where these digital signals represent RF signals that are received at the RRU 320. The conditioner of the virtual interference mitigation server 385B can provide support for 2×2 and 4×4 MIMO antenna configurations (or other MIMO configurations), diversity antenna configurations, and a variety of CPRI interfaces. In one embodiment, the conditioner can be co-located at the virtual interference mitigation server 385B. In other embodiments, the conditioner can be located anywhere, including at the virtual BBU 385A, the RRU 320, the transport layer 387, and/or at a second virtualized network function cloud 385D or a cloud computing environment 385E.

In one or more embodiments, the virtual BBU 385A provides digital communications to the RRU 320. In one embodiment, a virtual BBU 385A that is directing a RRU 320 can be located in the same virtualized network function cloud 385D as a virtual interference mitigation server 385B that is performing interference measurements on digital signals from this same RRU 320. In this way, a SDN Controller 385C at the virtualized network function cloud 385D can coordinate instantiation, configuration, and, if needed, decommissioning of the virtual BBU 385A and the virtual interference mitigation server 385B. In one embodiment, the virtual BBU 385A and the virtual interference mitigation server 385B can be instantiated into different virtualized network function clouds 385D. In this situation, multiple SDN Controllers 385C and virtualized network function clouds 385D may be involved in managing these VNE.

Figure 3D:
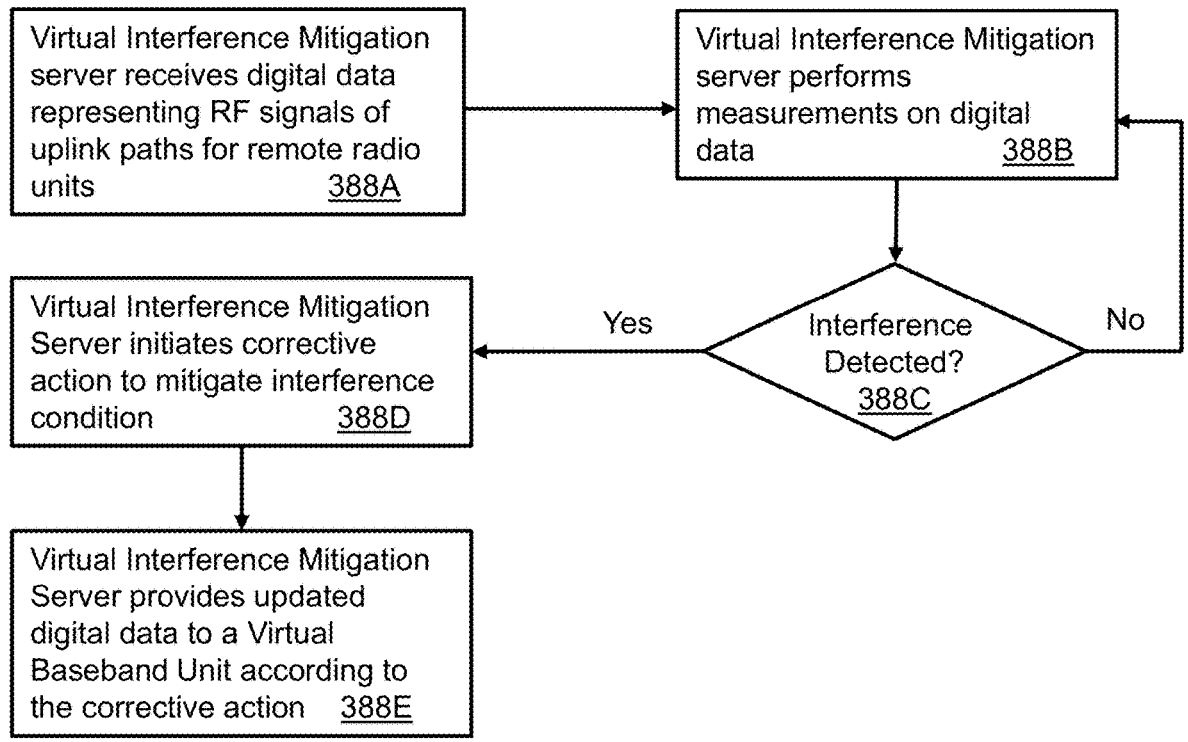
FIG. 3D depicts an illustrative non-limiting embodiment of a method for performing virtual interference mitigation in accordance with various aspects described herein.

FIG. 3D depicts an illustrative non-limiting embodiment of a method 388 for performing virtual interference mitigation. Method 388 can be combined or adapted in whole or in part with other embodiments of the subject disclosure including other methods described herein. Beginning with step 388A, a virtual interference mitigation server 385B of the subject disclosure can be adapted to obtain digital data representing RF signals of uplink paths associated with RRUs 320 in communication with communication devices (e.g., mobile phones, tablets, stationary communication devices, etc.) that transmit wireless signals on the uplink paths. Uplink instructions are generally sent to communication devices via downlink wireless signals to enable the communication devices to engage in uplink wireless communications. In other embodiments, the virtual interference mitigation server 385B can obtain uplink information based on information provided by a transport layer 387. The uplink instructions can include SIBs from which the system performing method 388 can obtain uplink information, including an indication of how many communication devices will be transmitting wireless signals in uplink paths assigned by one or more base stations, power level(s) that will be used by each of the communication devices during uplink wireless communications, the resource blocks that are assigned to each communication device, and other useful parametric information utilized by each communication device when communicating via an uplink path.

In one or more embodiments, at step 388B, the virtual interference mitigation server 385B of the subject disclosure can be adapted to perform measurements of the digital signals of the uplink paths assigned to the communication devices. Wireless signals from the communication devices can be received via antennas 340. These antennas 340 can be coupled to RRUs 320, which can generate the digital signals representing the RF signals that have been received. In one or more embodiments, the virtual interference mitigation server 385B can perform measurements, processing, and/or conditioning of the digital signals received from the transport layer 387.

At step 388C, the virtual interference mitigation server 385B can be adapted to detect signal interference in one or more of the measurements performed at step 388B based on such measurements that compare unfavorably to one or more thresholds. As noted earlier, the uplink information can include, but is not limited to, the number of communication devices that will be transmitting in uplink paths, the power level(s) used by each communication devices while transmitting during one or more assigned resource blocks, the resource blocks that have been assigned to each communication device, and other useful parametric information utilized by each communication device when communicating via an uplink path.

The number of communication devices transmitting wireless signals on uplink paths can be used to determine a density of spectral energy expected in certain resource blocks and at certain time slots. With prior knowledge of the transmission characteristics used by each communication device, the system can be adapted to determine a threshold per resource block based on an expected power level for each corresponding resource block, an overall threshold based on an expected average power level across groups of resource blocks, a timing of the use of the resource blocks by the communication devices, or combinations thereof. A threshold can be determined statically, or dynamically as a running average of power levels. In an embodiment, the measurements performed at step 388B can be based on SINR (or other) measurements. At step 388C, the system of the subject disclosure can be further adapted to identify one or more affected uplink paths based on one or more measurements that compare unfavorably to the one or more thresholds of step 388B.

Responsive to identifying the affected paths and thereby detecting signal interference in such paths based on the threshold(s), the virtual interference mitigation server 385B of the subject disclosure can be adapted to take corrective actions in step 388D to improve the measurements of the affected paths. The affected uplink path can be affected by interference signals as described in the subject disclosure. The corrective action can include without limitation, singly or in combination, locating unused uplink paths that are not affected by the interference, suppressing one or more interference signals on the affected uplink paths, adjusting the number of communication device allowed to transmit wireless signals on the affected uplink paths, and/or by performing other mitigation techniques (e.g., polarization adjusting and/or phase shifting/delaying techniques) described in the subject disclosure.

At step 388E, the virtual interference mitigation server 385B can be adapted to provide updated digital data to one or more virtual BBU 385A to implement a corrective action. The virtual interference mitigation server 385B of the subject disclosure can instruct one or more virtual BBUs 385A to effect one or more polarization adjusting and/or phase shifting/delaying techniques described herein. Additionally, or alternatively, the virtual interference mitigation server 385B can instruct one or more virtual BBUs 385A to move transmissions to one or more uplink paths different from the one or more affected uplink paths, instruct one or more of the plurality of communication devices to move to one or more uplink paths to uplink paths located in different sectors, or to move affected uplink paths to different uplink paths of a different base station, or any combinations thereof. The different uplink paths moved to can be unused, and thus, available uplink paths. In an embodiment, the virtual interference mitigation server 385B of the subject disclosure can check the noise and/or interference level of the available uplink paths to ensure that better communications can be provided as a result of moving from the affected uplink paths.

The foregoing embodiments can be adapted for other applications as well. For example, the uplink information can be used by the system of the subject disclosure to determine PRB utilization, which can be reported to a base station processor. Based on interference detection and mitigation across one or more resource blocks, the system of the subject disclosure can be further adapted to provide recommendations and/or direct a base station processor to modify SIBs to improve PRB utilization in one or more uplink paths.

While for purposes of simplicity of explanation, the respective processes are shown and described as a series of blocks in FIG. 3D, respectively, it is to be understood and appreciated that the claimed subject matter is not limited by the order of the blocks, as some blocks can occur in different orders and/or concurrently with other blocks from what is depicted and described herein. Moreover, not all illustrated blocks may be required to implement the methods described herein.

Figure 4:
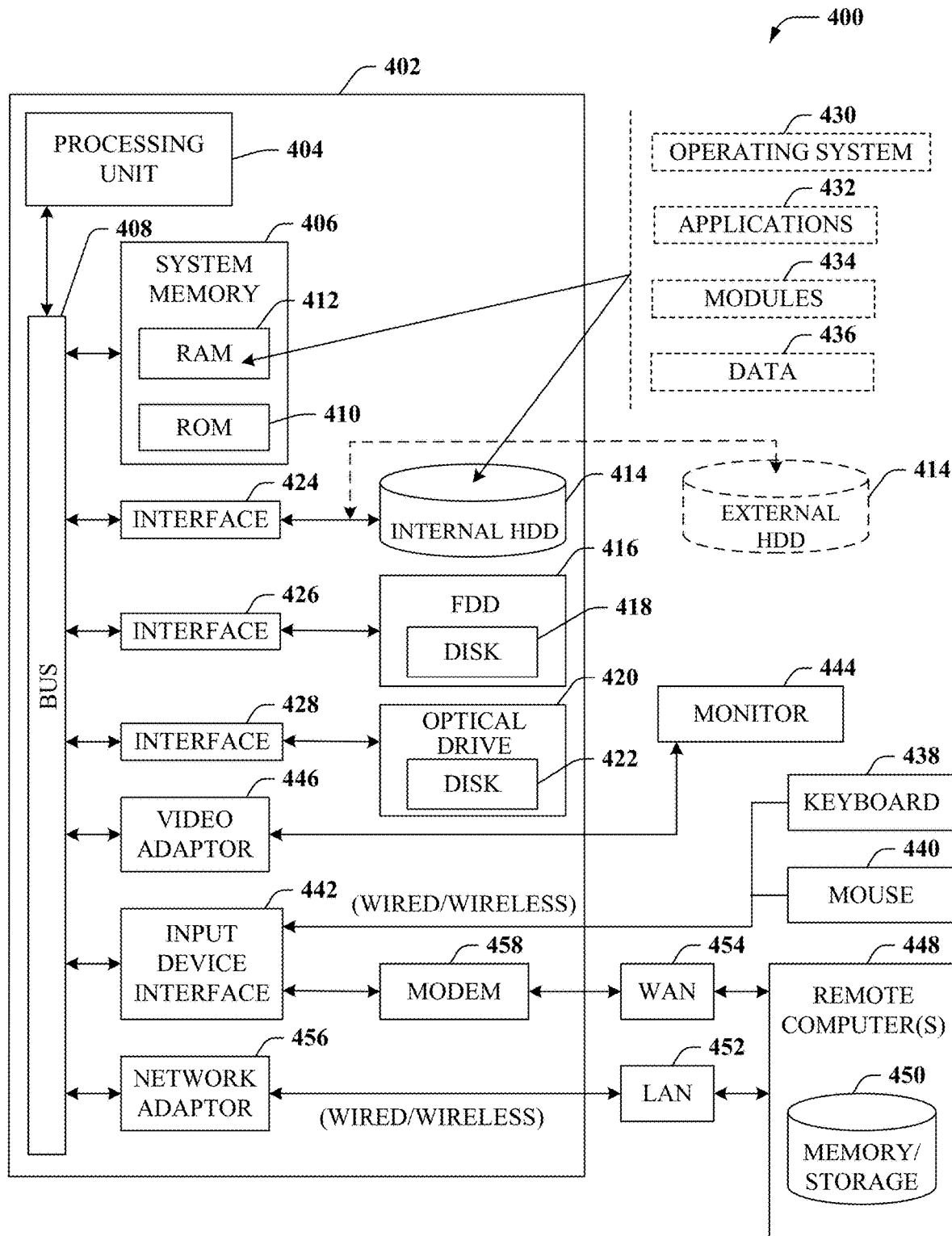
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or one or more devices/components/systems of FIGS. 3A-3C, etc. Each of these devices can be implemented via computer-executable instructions that can run on one or more computers, and/or in combination with other program modules and/or as a combination of hardware and software. For example, computing environment 400 can facilitate, in whole or in part, detection of interference/PIM in a communications system and performing of action(s), such as polarization adjusting and/or phase shifting/delaying, as described herein, that result in mitigation/cancellation of the interference/PIM.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
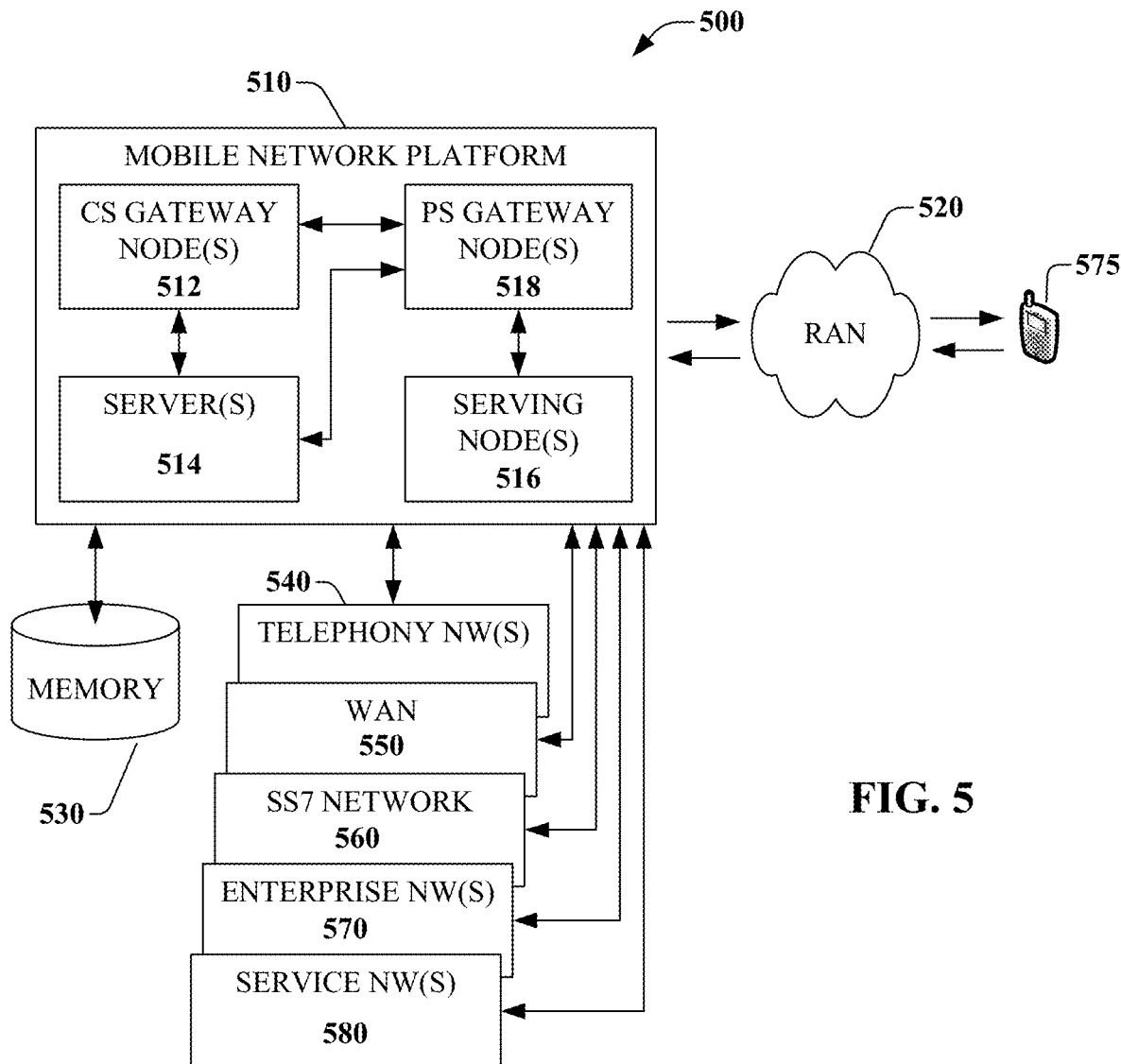
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or one or more devices/components/systems of FIGS. 3A-3C, etc. For example, platform 510 can facilitate, in whole or in part, detection of interference/PIM in a communications system and performing of action(s), such as polarization adjusting and/or phase shifting/delaying, as described herein, that result in mitigation/cancellation of the interference/PIM. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is to be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
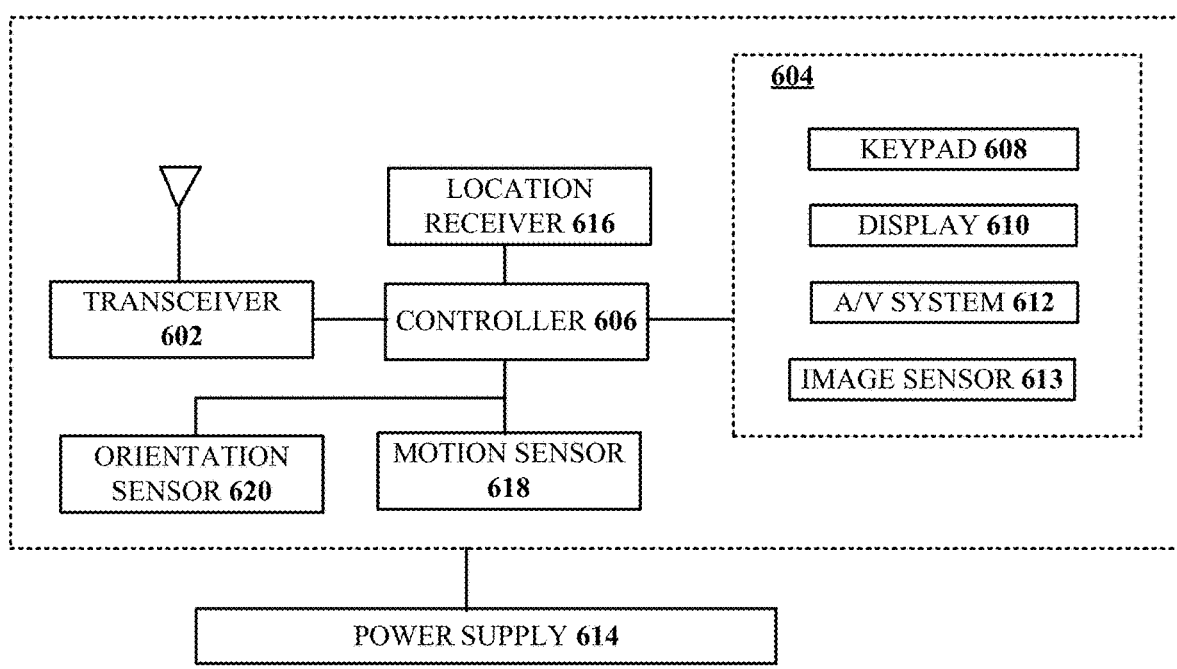
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of various devices and/or components described herein, such as base stations, RRHs, antenna systems, and/or the like; data terminals 114, mobile devices 124, vehicle 126, display devices 144, or other client devices for communication via communications network 125; etc. For example, computing device 600 can facilitate, in whole or in part, detection of interference/PIM in a communications system and performing of action(s), such as polarization adjusting and/or phase shifting/delaying, as described herein, that result in mitigation/cancellation of the interference/PIM.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth©. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, which may be used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. One or more embodiments can employ various AI-based schemes for carrying out various embodiments thereof. Moreover, a classifier can be employed. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to, training data. Other directed and undirected model classification approaches comprise, e.g., naïve Bayes, Bayesian networks, decision trees, neural networks, fuzzy logic models, and probabilistic classification models providing different patterns of independence. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The foregoing embodiments can be combined in whole or in part with the embodiments described in U.S. Pat. No. 10,284,313 (issued on May 7, 2019). For instance, embodiments of the aforementioned U.S. patent can be combined in whole or in part with embodiments of the subject disclosure. For example, one or more features and/or embodiments described in the aforementioned U.S. patent can be used in conjunction with (or as a substitute for) one or more features and/or embodiments described herein, and vice versa. Accordingly, all sections of the aforementioned U.S. patent are incorporated herein by reference in their entirety.

What is claimed is:

1. A method, comprising:
    receiving, via an antenna system that includes a first set of radiating elements associated with a first band and a second set of radiating elements associated with a second band, a communication signal generated by a communication device;
    detecting interference in the communication signal, wherein the interference is generated by one or more interference sources, wherein the interference is detected by monitoring a near field region of the antenna system, an intermediate field region of the antenna system, a far field region of the antenna system, or any combinations thereof, and wherein the monitoring excludes monitoring only the far field region of the antenna system; and
    based on the detecting, performing polarization adjusting for the first set of radiating elements while polarizations of the second set of radiating elements remain unchanged.

2. The method of claim 1, wherein the intermediate field region comprises a region that spans a portion of the near field region of the antenna system and a portion of the far field region of the antenna system.

3. The method of claim 1, further comprising:
    identifying an antenna resource for mitigating the interference; and
    performing by the antenna resource conditioning on the communication signal to reduce the interference.

4. The method of claim 1, wherein the first and second bands mix and interfere together.

5. The method of claim 4, wherein the interference detected includes mixing and interference of the first and second bands, and wherein the interference detected comprises passive intermodulation (PIM) interference.

6. The method of claim 1, wherein the interference comprises intercell interference.

7. The method of claim 1, wherein the interference is generated from dynamic spectrum sharing between transmitters.

8. The method of claim 1, wherein the interference comprises leakage interference generated by another base station.

9. The method of claim 1, wherein a polarization of the interference enables detection of the interference.

10. The method of claim 9, wherein the polarization of the interference is detectable separately from other signals received by the antenna system.

11. The method of claim 1, wherein the antenna system is integrated with a remote radio head.

12. The method of claim 1, wherein the antenna system operates in a communication system utilizing time division multiple access.

13. The method of claim 1, wherein the antenna system operates in a communication system utilizing frequency division multiple access.

14. The method of claim 1, wherein a signaling protocol used by one or more transmitters unassociated with the antenna system comprises an orthogonal frequency-division multiple access protocol.

15. The method of claim 14, wherein the interference is further detected by detecting the signaling protocol used by the one or more transmitters.

16. A device, comprising:
a circuit coupled to an antenna system that includes a first set of radiating elements associated with a first band and a second set of radiating elements associated with a second band, the circuit facilitating operations including:
receiving, via the antenna system, a signal generated by a communication device;
detecting interference in the signal, wherein the interference is generated by one or more sources, wherein the interference is detected by monitoring a near field region of the antenna system, an intermediate field region of the antenna system, a far field region of the antenna system, or any combinations thereof, and wherein the monitoring excludes monitoring only the far field region of the antenna system; and
based on the detecting, causing polarization adjusting to be performed for the first set of radiating elements while polarizations of the second set of radiating elements remain unchanged.

17. The device of claim 16, wherein the operations further include identifying a resource for mitigating the interference.

18. The device of claim 16, wherein the circuit is configured to detect a polarization of the interference.

19. A non-transitory machine-readable medium, comprising executable instructions that, when executed by a processing system including a processor, facilitate performance of operations, the operations comprising:
receiving, via an antenna system that includes a first set of radiating elements associated with a first band and a second set of radiating elements associated with a second band, a communication signal generated by a communication device;
detecting interference in the communication signal, wherein the interference is generated by one or more interference sources, and wherein the interference is detected by monitoring a near field region of the antenna system, an intermediate field region of the antenna system, or both with or without monitoring a far field region of the antenna system; and
based on the detecting, performing polarization adjusting for the first set of radiating elements while polarizations of the second set of radiating elements remain unchanged.

20. The non-transitory machine-readable medium of claim 19, wherein the operations further comprise controlling, by a remote radio unit, the antenna system to perform one or more actions for mitigating or cancelling the interference.

* * * * *